United States Patent [19]

DeClute et al.

[11] Patent Number: 5,053,948
[45] Date of Patent: Oct. 1, 1991

[54] FILE INDEX SYSTEM FOR MASS STORAGE DEVICE

[75] Inventors: Gary W. DeClute, Stoughton; Ann P. Varda; Murray A. Thompson, both of Madison, all of Wis.

[73] Assignee: Wisconsin Alumni Research Foundation, Madison, Wis.

[21] Appl. No.: 651,109

[22] Filed: Feb. 4, 1991

Related U.S. Application Data

[63] Continuation of Ser. No. 149,421, Jan. 29, 1988, abandoned.

[51] Int. Cl.$^5$ .................. G11B 17/04; G06F 13/00
[52] U.S. Cl. .................. 364/200; 364/248.1; 364/236.2; 364/249.4
[58] Field of Search ... 364/200 MS File, 900 MS File; 369/30, 36; 360/133

[56] References Cited

U.S. PATENT DOCUMENTS

| | | | |
|---|---|---|---|
| 4,286,790 | 9/1981 | Siryig et al. | 369/36 |
| 4,387,452 | 6/1983 | Bricot et al. | 369/32 |
| 4,608,679 | 8/1986 | Rudy et al. | 369/39 |
| 4,760,526 | 7/1988 | Takeda et al. | 364/300 |
| 4,766,581 | 8/1988 | Korn et al. | 364/900 |
| 4,827,462 | 5/1989 | Flannagan et al. | 369/32 |
| 4,928,245 | 5/1990 | Moy et al. | 364/478 |

OTHER PUBLICATIONS

Brochures from Commercial Technology Services relating to their "Archiver" and Systemaster products, and the User Guide for the Archiver product, Jul. 1985.
M. Thompson, A. Varda, G. DeClute, "Two Terabyte Optical Archival Store", Computer Physics Communications, vol. 45, pp. 403-407 (1987).
M. A. Thompson, A. P. Varda, G. DeClute, K. Kriesel, "The Design and Use of a 2 Terabyte Optical Archival Store", paper presented at IEEE conf., Oct. 21, 1987.
Program from the CHEP (Computing in High Energy Physics) conference, Feb. 2-6, 1987.

Primary Examiner—Lawrence E. Anderson
Attorney, Agent, or Firm—Quarles & Brady

[57] ABSTRACT

An optical archive storage system includes a large number of off-line optical disks which are selectively transported to read/write units by a robotic manipulator. Access to the data files on the disks is maintained and controlled through the use of a token file on a magnetic storage device on a controller computer for each data file on each disk. The file attributes which the operating system of the computer assigns to the token file are used to control access and ownership of the data files on the disks.

10 Claims, 1 Drawing Sheet

FILE INDEX SYSTEM FOR MASS STORAGE DEVICE

This application is a continuation, of application Ser. No. 07/149,421, filed Jan. 29, 1988, now abandoned.

FIELD OF THE INVENTION

The present invention relates to the organization and indexing of files in general, and relates, in particular, to the easy and convenient indexing and retrieval of files from mass storage devices in which the files themselves may not be on-line.

BACKGROUND OF THE INVENTION

There exists many forms of data storage devices for use with digital computers. It has now become appropriate, for some applications which require particularly intensive use of storage capability, to design mass storage devices which can maintain and store indefinitely large quantities of data. One form in which such a mass storage device can be implemented is an optical disk system. Commercially available write-once, read-many (WORM) systems are available. For example a two sided 30 centimeter diameter glass optical disk of the type developed by the Philips Corporation can be read and write on a Lazer Magnetic Storage International 1200 Read/Write Unit, with each WORM optical disk having a storage capability of 1 gigabyte ($2^{30}$) bytes of data.

The overall storage capacity of an optical reader based mass storage device can be improved by using many optical disks with a small number of units for reading and writing on the disks. Unfortunately, the use of such a strategy means that the information on most of the disks is, at all times, off-line. This complicates the user interface to the disks and also makes more complicated functions which a user may normally expect, such as access to disk directories and searches of various file attributes.

SUMMARY OF THE INVENTION

The present invention is summarized in that a mass storage device includes a library of discrete file storage units, at least one reader to read the file storage units and a digital computer to control access to the file storage units, the digital computer having a magnetic memory and being programmed to create in that magnetic memory a token file for each file on each mass storage unit, each token file including specifications of the actual file on the mass storage device including file specification and name, the mass storage unit on which the file is located, the identification and location of the file on the mass storage device and the size of the file and the computer also being programmed so that the utility programs for transferring data to or from the mass storage device continually update the token files on the magnetic storage device so that at all times the token files on the magnetic storage device represent a complete and accurate catalog of the contents and status of all of the files in the mass storage devices whether or not the individual mass storage units are on-line.

It is an object of the present invention to provide an efficient and economical system for handling a mass storage device consisting of a large number of individual mass storage units such as optical disks.

It is another object of the present invention to provide an easy manner for gaining access to a large mass storage device and the files therein without all of the files having to be on-line at any one instant.

It is another object of the present invention to provide a mass optical archive system storage device in which users can gain access to the storage to archive and restore files without having to have any particular knowledge about the organization or structure of the files themselves within the mass storage unit.

Other objects, advantages, and features of the present invention will become apparent from the following specification when taken in conjunction with the accompanying drawings.

DESCRIPTION OF THE PREFERRED EMBODIMENT

Figure 1:
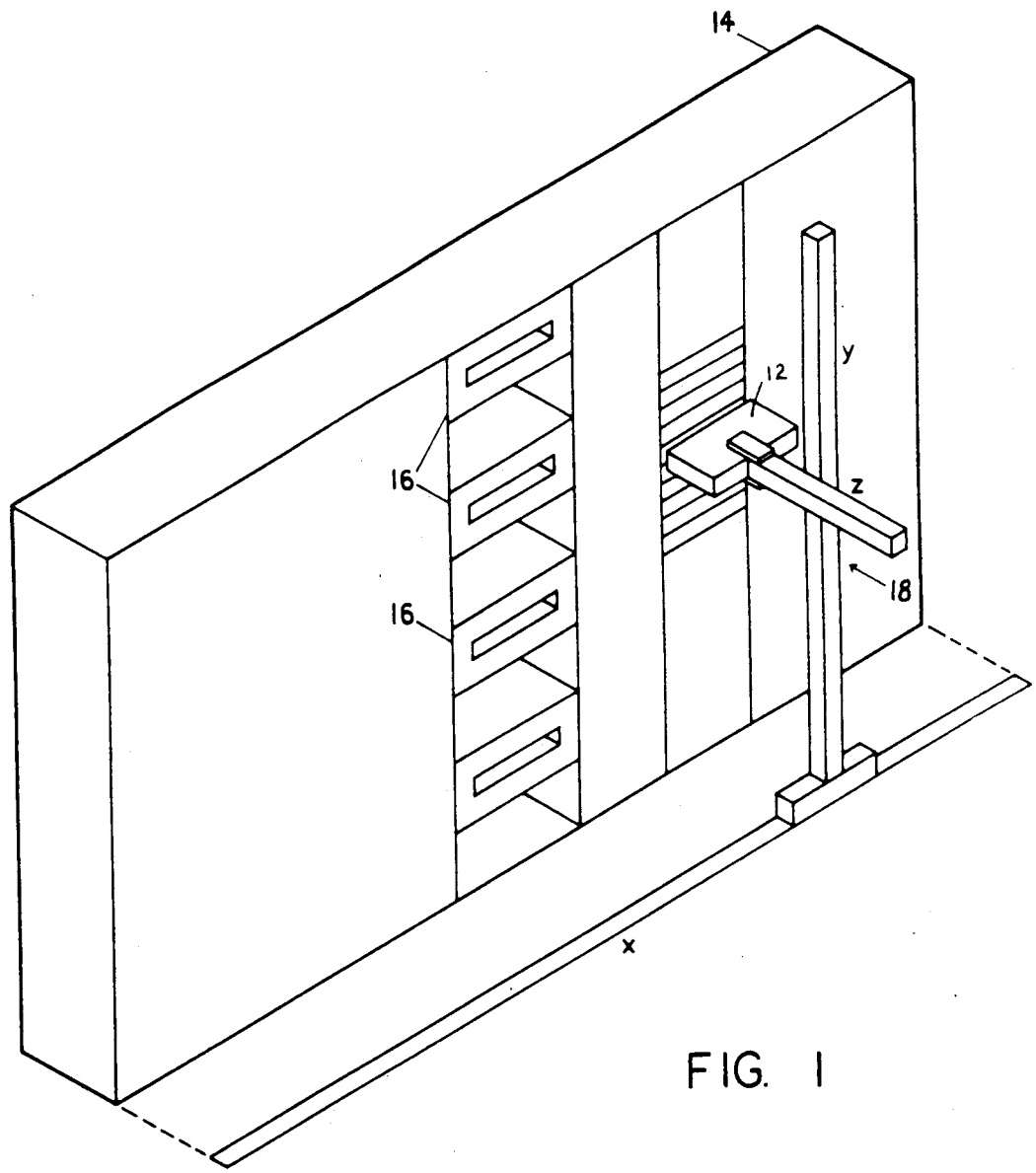
FIG. 1 is a schematic illustration of the concept of an optical archive storage constructed in accordance with the present invention.

Shown in FIG. 1 is the principal physical manifestation of an optical archival storage system constructed in accordance with the present invention. The archival storage system of FIG. 1 includes a large number of two-sided optical disks 12 which are housed in a large cabinet 14. The disks 12 are each two-sided one gigabyte optical disk cartridges. The cabinet 14 includes a plurality of vertical rows of racks which are vertically arranged to receive a number of the optical disk cartridges 12. A number of read/write units 16 are located in the middle of the rack 14. The read/write units are capable of writing one time into each location in each optical disk carried in each optical disk cartridge and then reading many times from the same location. A robot, generally indicated at 18 is provided to retrieve a particular optical disk cartridge 12 and to transport it and insert it into an appropriate one of the four read and write units 16. The control of the entire unit as illustrated in FIG. 1, including both the indexing for location and file structure in each of the optical disk cartridges, the date of transfer to and from each of the read/write units 16, and the operation of the robot 18, is all under the control of a separate digital computer, in this case a VAX 11/750, not shown in FIG. 1. The controlling digital computer has the responsibility of selecting an appropriate optical disk cartridge 12 for transportation by the robot 18 into an unused one of the read/write units 16. The controlling computer therefore must have a directory of the files on each of the optical disks and be able to properly select disk cartridges for transport to and from the read/write unit 16. It is also advantageous for the computer to have information about the files contained in each individual disk on an on-line basis so that indexing and searches for particular files can be conducted without the necessity for transporting each disk cartridge individually to the read/write units to find the contents thereof. A related objective is that the access to files in each of the optical disks must be convenient to the users, and in particular to casual users, so that extensive training or instruction is not required for users to make access of the optical archive storage.

These objectives are implemented in the optical archive store in accordance with the present invention through the use of a "token" file contained in the magnetic memory of the controlling computer. The attributes of the token file itself are determined by the operating system of the operating computer. In the case of a VAX computer as used within the embodiment of the present invention described here, the VAX computer utilizes an operating system known as VMS, for virtual memory system, which implements a standard file system known as RMS. Each of the token files on the magnetic memory of the VAX system would therefore be stored as an RMS file and have associated with it all of the normal overhead components for any other RMS file under the operating system of the VAX computer. Within the token file itself, there may be placed additional information specific to the data requirements of handling the optical disks in the optical archival store. Together, the relevant attributes of the controlling computer operating system and the additional data contained within the token file provide all of the information reasonably necessary to the users to learn about, search, and determine ownership and access rights to any given file contained on an optical disk which is not on line at a given instant. In this way, swift and efficient maintenance of information about files is maintained at all times. In addition, since many attributes of the token file are maintained in the context of the environment of the operating system of the controlling computer, many casual users who simply have a knowledge about the operating system of such a computer will be able to use the optical archive storage without the need for great additional knowledge or information.

Therefore, the purpose of the token data base system is to provide an index to all of the files located on the optical archive system. The index is intended to provide the following capabilities:

The index should provide fast lookup of a file when the name of the file or other primary key information is known.

The index should provide search capability when the name of the file is not known. The optical archive system is an archival system, therefore it is expected that many years may elapse between the time a file is written and the time it is again needed. A user may be able to remember only bits and pieces of the information needed to retrieve the file.

The index should provide security services, so that only authorized persons will have access to the index information or to the data.

The index should provide facilities for auditing the number of files and size of each file stored, so that storage costs can be billed to the owner.

Within each optical disk of the optical archive system there is an index log. The index log serves the purpose of an index file on a conventional magnetic disk except that it is constructed as a log since erasures cannot be made to it. Thus, for example, file headers cannot be erased from the log but newer versions can be written thereon superseding older versions. A sequence number field in the index log indicates the most recent version of the file header. The file header format on the optical disk itself contains information about the actual files contained on that disk and contains all the appropriate information for the files which are there. This information is contained in the large index file which includes such information as the serial numbers, the logical names, the physical locations, and individual attributes (access, owner, etc.) of all of the files on the disk. It is a block of this information that is written into the token file located in the magnetic storage of the controlling computer.

The token data base consists of a single small RMS file stored on magnetic disk for each individual file stored on optical disk. The RMS file on magnetic disk is a "token" that points to the corresponding optical file written on optical disk. The token file creates an illusion that the optical file resides on magnetic disk rather than optical disk. A subset of the RMS attributes of the token file are interpreted by the optical archive storage system to be the attributes of the corresponding optical file. Additional information abort the optical file is contained as data within the token file.

The optical disks of the optical archive storage system are grouped into logical volumes. Each volume consists of one or more optical disks. For this purpose each side of a double-sided cartridge is considered a separate optical disk, but both sides are generally placed within the same volume. There can be an arbitrary number of optical disks in any given volume. Under each volume, the files stored on the OAS system are arranged in directories and subdirectories up to seven levels deep.

The complete token file specification consists of "store::volume:[directory]name.ext;version" where store is the name of the optical archive storage system (if multiple systems exist on the same network,) volume is the name of the logical volume, and the remainder is equivalent to an ordinary RMS file specification. The entire token file specification uniquely identifies a token file. From the point of view of the RMS operating system, a token file is in all respects an ordinary RMS sequential text file, usually less than 512 bytes in length. In this way the optical archive system can make use of all standard RMS facilities for manipulating the token files. This greatly reduces the amount of programming needed to create an on-line data base with equivalent capability, because the system utilizes the effort that has already been placed into the RMS file system and the RMS operating system. For example, the RMS directory command can be used to display directory information about the token files, and the RMS file ownership and protection facilities can be used to enforce file ownership and protection.

The attributes of an RMS file under the RMS operating system that are relevant to the optical archive storage system are:

File specification, of the form "store::volume:[directory]name.ext;version", which is the name of the file. This is an ordinary RMS file specification. The name of the token file is interpreted by the optical archive storage system as the name of the file on optical disk. This is the primary key into the token data base.

Creation date, of the form "dd-mmm-yyyy hh:mm:ss.cc", which is the date on which the file was created. The creation date of the token file is interpreted by the system as the date the optical file was created on optical disk.

Modification date, of the form "dd-mmm-yyyy hh:mm:ss.cc", which is the date on which the attributes of the file were last changed. The modification date of the token file is interpreted by the system as the modification date of the optical file on optical disk.

File protection, of the form "(system,owner,group,world)", which is the user identification code based protection mask of the file. This is an ordinary RMS file protection. It is interpreted as the protection of the file on optical disk for purpose of determining access rights to the optical file.

User identification code, of the form [group,id] that identifies the owner of the file. This is an ordinary RMS user identification code. It is interpreted as the ownership of the file on optical disk for the purpose of determining access rights, and for allocating storage charges to a particular user of the OAS system.

Additional information stored within the token file consists of:

Optical disk serial number, is the serial number of the optical disk on which the file is located. This uniquely identifies the optical disk and serves as the key for discovering any other attributes of the optical disk which are needed in order to process a file request. It also identifies which optical disk of a volume the file is actually written on.

Optical file id, is the file id number of the file on the optical disk. Each file on an optical disk has a unique optical file id. The serial number and the optical file id can be used in combination as a key to find information on the optical file that is cached on magnetic disk. Information on the most frequently used optical disks is cached on magnetic disk in order to speed up the process of mounting an optical disk in a read/write unit.

Optical file id address, is the logical address on the optical disk where the optical file header of the optical file is located. The optical file header contains all information about the optical file. The optical file id address is used to speed the process of looking up optical file information when the file is to be modified or restored to magnetic disk.

Size, is the size of the file on optical disk in units of 512 byte blocks. This information is of interest to the owner of the file, and is also used in charging for the storage costs of the optical file.

Original file specification, of the form "node::-device:[directory]name.ext;version", is the original file specification of the magnetic disk file that was copied to optical disk to create the optical file. This is maintained on-line in order to assist the user in finding a file based upon components of the original name.

Description, is a textual description of the optical file. It is maintained on-line in order to assist the user in finding a file based upon key words within the description. The description is optional, but it is preferred that all users of the optical archive storage system include a description with each file. Thus the actual data portion of the token file will consistently be rather modest in length. Because a large portion of the attributes of the optical archive file which are necessary to be stored is stored as part of the overhead of the RMS operating system, the data portion of the RMS file needs contain only the relatively modest amount of information referred to above which is additive to the other overhead RMS information. Illustrated just below is an example of the data portion of a sample token file. B14024 FID=00000403, FID ADDR=000F560F 0000000504 blocks written This file was archived from d13:[APVOAS]PDP.SAV; 1 save set of rt-Δ1 oas drive code. In the example shown above the first numeral, B14024, refers to the serial number of the optical disk on which the file is stored. The second value which begins with "FID=" is the file ID of the optical file on the particular optical disk identified by the serial number. The third parameter, identified by "FIDADDR=" refers to the address of.the optical file 403 identified in the previous file ID parameter. This is the logical address of the optical file as referred to above. The next line contains the file size which is indicated to ˜ 504 blocks. The last two lines are the comments or narrative description of the file and contained therein is the original file specification indicating where the file was archived from. This is the entire contents of a token file data portion. All the remaining other attributes of the file necessary for data manipulations, search, and handling, as described in further detail below, are all contained within the overhead portion of the RMS file organization and do not require specific manipulation or handling or organization of file structure to maintain proper organization of the optical archive storage system.

The addition of the relevant RMS file attributes and the data portion of each token file provides all of the necessary information for each file contained on the optical archive system to uniquely determine the name of each optical file, determine which optical disk any given optical file resides on, to determine the ownership and access rights to any given optical file, to quickly look up relevant access information concerning any optical file, to quickly determine where on the optical disk the optical file header is located, to search for a particular optical file based on the original name of the file, to search for any optical file based upon key words in a text description, and to generate charging information as to the storage charges accrued for the storage of any particular optical file. The token data base structure allows all of these operations to be performed without the need to load any optical disk whatsoever into any of the read/write units contained in the optical archive storage system. The speed of the entire system is facilitated and efficient search of the entire token data base is practical for any file based on some combination of information that a user may remember.

The amount of programming required to create and maintain the token data base is minimized by the fact that standard RMS and RMS facilities are available to perform all the necessary operations. The optical archive storage system software should automatically maintain the token data base as each optical file operation is performed. There are five primary optical file operations:

Archive. Copy a file from magnetic disk to optical disk. This operation automatically creates a token file for the corresponding optical file. Access rights to archive a file can be determined by the user's access rights to create a file in the RMS directory where the token file will be located.

Restore. Copy a file from magnetic disk to magnetic disk. This operation uses the token file to quickly locate the optical file on the optical disk. In all cases the user need not know which optical disk the optical file resides upon. It is sufficient to know the name of the optical file, which is identical to the name of the corresponding token file. Access rights to restore a file can be determined by the user's access rights to read the token file.

Change. Change the ownership, protection, or other attributes of an optical file. This does not affect the date stored within the optical file. The file receives a new optical file header. The attributes and/or data of the corresponding token file are also changed. Access rights to change an optical file can be determined by the user's access rights to "control" the token file.

Rename. Change the name of the optical file. This does not affect the data stored within the optical file. The file receives a new optical file header. The name of the corresponding token file is also changed. Access rights to rename an optical file can be determined by the user's access rights to "control" the token file. If the directory location of the optical file is to be changed as part of the rename operation, the user must also have write access to the destination token file directory.

Retire. Mark an optical file as deleted. This is the equivalent of deleting an optical file, since the data is not actually erased. The optical file receives a new optical file header. The corresponding token file is deleted. Access rights to delete an optical file can be determined by the user's access rights to delete the token file.

There are a number of desirable auxiliary operations that involve the use of the token data base:

Directory. Perform a directory search on selected portions of the token data base. This is done by the optical archive storage system software using the RMS directory command and other RMS facilities. Only directory information relevant to the optical archive storage system is displayed. Special handling of the data stored in the token file is performed so that a user may request the size, original name, description or other information about the optical file which is not directly available to the RMS directory command.

Search. Perform a fast search of selected portions of the token data base in order to locate an optical file based upon some known items of information such as keywords in a description or components of the original file name. This is done directly by the user using the RMS search command.

Create/directory and other directory manipulations. Create, modify or delete a directory in the token data base. This is done by the optical archive storage system software or directly by the user using the corresponding RMS facilities.

Accounting. Account for storage charges of each optical file. This is done by sequentially processing all token data base files to determine the number of optical files and total size of all optical files owned by each user. The token file ownership and the size data within the token file are used for this purpose.

Exceptional operations. A token file can be "temporarily" changed to allow different access rights to an optical file without actually making a change on optical media. This is useful for one time operations where the original attributes are to be restored when the operation is completed. It may be desirable for a user to allow another user to have temporary access to his or her files. If every such instance required giving an optical file a new optical file header (to make the change permanent), an unnecessary waste of optical disk space would occur. Temporary changes to the token files can be made using standard RMS commands.

Rebuild token files. In the event that token files are accidentally lost or corrupted, they can be rebuilt from information contained on the optical disk. The token data base is preferably protected against loss or corruption by ordinary magnetic tape backup of the magnetic disk(s) on which it resides. Backup may be done using the RMS backup command.

Renaming, binding and unbinding optical disk volumes. The "store::volume:" portion of the token file specification is not recorded on optical media. This allows a volume to be renamed. An optical disk can be added or removed from a volume. A volume can be moved from one optical archive storage system to another. All these operations can be done without changing anything actually written on the optical media. These operations are performed using standard RMS commands.

Thus, it is possible relatively simply to program an optical archive storage system control program which makes use principally of the overhead of the VMS and RMS operating system and which requires only a few routines and special programs to properly handle and make available all of the file attributes for the files on the optical archive system. Thus, a user may need to know as few as five commands to do all of the things necessary to archive a file to the optical archive system and retrieve it. A first operation would be required to begin communication with the program and control of the optical archive storage system. A second command would be necessary to archive a given file onto the optical archive system and to assign it a name on the system. This second command would implement the archive operation described above and automatically result in the creation of an appropriate token file. A third command would be a retrieve or restore command which would read a file from the optical archive storage system and restore it in a given location on a magnetic disk. A fourth command would be a directory which would allow the user to obtain a directory of the users files located on the optical archive storage system. This would make use of the directory operation referred to above and would not require the system to access any of the optical disks. Lastly, the user would have to know the exit command to leave communication with the optical archive system. The use of the token file system as described herein makes the implementation of such a simple communication protocol with a casual user both practical and relatively efficient to implement.

Attached hereto is Appendix A and incorporated herewith by reference is a source code listing of the routines and sub-routines necessary to implement the optical archive storage operations referred to above. Also contained are printouts of the source code listings for the operations as to checking user access for various file operations. All of these routines are implemented in Fortrand and make extensive use of the VMS routines contained in the overheaded operating system implemented on a VAX computer of the type used for the implementation of the present invention by the inventors. One of ordinary skill in programming and familiar with the implementation of the VMS operating system may readily scan this code, which is fully commented, to understand in detail the operation of the functions described above and the manner in which those operations are implemented through the use of VMS utilities. One of ordinary skill in the art will also be able to ascertain from these code listings how to implement similar functions in other programming environments and with other machines.

In summary, the use of a token file data base as an index to access files contained on an optical archival storage system provides for a full range of indexing functions for a large mass storage device with a minimum of programming and maintenance. These objectives are accomplished by creating an illusion to the user that the optical file resides on a magnetic disk rather than on an optical disk so that the format and attributes of the file will be familiar to the casual user. Standard functions contained within the operating system of the controlling computer and the use of the utilities provided by that computer are utilized whenever possible. This allows for efficient searches of the index data base to the entire archival storage unit by searching the token data base and thereby avoiding the necessity for loading each individual optical disk onto a read/write unit during such searches. Thus the token data base is a strategy which reduces the cost of implementation of the optical archive storage unit and which enhances its index, particularly for very large storage units.

It is to be understood that the present invention is not limited to the particular arrangement and construction of parts as discussed above, but embraces all such modified forms thereof as come within the scope of the following claims.

```
OAS_USER_RMS.FOR

Copyright 1987, University of Wisconsin Physical Sciences Laboratory. This
software contains valuable and proprietary information and cannot be dis-
closed, copied or used by others unless prior written permission is obtained.

This package contains six routines that use the caller's context to check various types of access to a file.
As a side effect, each routine fully parses the original filespec. A seventh routine scans any filespec for correct
syntax.

oas$chk_create (filespec, default, related, result, resultlen, fields, protection, uic, status)
oas$chk_read   (filespec, default, related, result, resultlen, fields, protection, uic, status)
oas$chk_change (filespec, default, related, result, resultlen, fields, protection, uic, status)
oas$chk_rename (oldfilespec, newfilespec, default, related, oldresult, oldresultlen, oldfields,
                newresult, newresultlen, newfields, protection, uic, status)
oas$chk_delete (filespec, default, related, result, resultlen, fields, protection, uic, status)
oas$chk_file   (filespec, default, related, result, resultlen, fields, cdt, rdt, edt, bdt, protection, uic,
                records, recordlens, context, status)
oas$filescan   (filespec,fields,status)

NOTE: default protection is 'FFFF'x, default uic is 0
      The internal routine oas$$check_protection needs to be called on the node where the file resides. This
means that change, rename, and delete can actually handle remote file specifications if special care is taken
to submit oas$check_protection as a task in the user's context on the remote node.

RETURN: fully parsed filespec and length, array of pointers into fields of filespec, protection and uic of result file,
        and status.

Two internal routines are also defined:
oas$$check_protection (caller_access, protection, caller_owner, status)
oas$$parse_result_name (result, resultlen, fields, nam, rsnam)
```

INTERFACE ROUTINES

```
!
! OAS$CHK_CREATE creates a temporary file with the specified name.  It maximizes version number if no version number
! is specified in the name.  An RMS open with xab's is performed to read back the protection and owner of the file.
!
! There is a choice as to whether to pass the version number to the drive process.  OAS$CHK_CREATE does return the
! version number.  To be correct, the drive should only see a version number when the user explicitly specified one.

subroutine oas$chk_create (filespec, default, related, result, resultlen, fields, protection, uic, status)

implicit none include '($FABDEF)'
        include '($NAMDEF)'
        include '($XABPRODEF)'
        include '($SYSSRVNAM)'
        include '($RMSDEF)' record /fabdef/ fab, openfab
        record /namdef/ nam, rlfnam
        record /xabprodef1/ xabpro character*(*) filespec, default, related, result
        character esnam*255, rsnam*255
        integer*2 resultlen, fields(2,6), protection, word(2)
        integer*4 uic, status, long, i
        byte bytes(4)
        equivalence (long, word(1), bytes(1))
        logical use_rlfnam result = ' '
        resultlen = 0 if (related .ne. ' ') then
            use_rlfnam = .TRUE.
            call oas$$_parse_related_file (related, rlfnam, status)
            if (.not. status) use_rlfnam = .FALSE.       ! or return
        else
            use_rlfnam = .FALSE.
        end if ! set up fab fields for create
        fab.fab$b_bid = fab$c_bid
        fab.fab$b_bln = fab$c_bln word(1) = len (filespec)
        fab.fab$b_fns = bytes(1)
        fab.fab$l_fna = %loc (filespec)
        if (default .ne. ' ') then
            word(1) = len (default)
            fab.fab$b_dns = bytes(1)       ! use equivalence of word and byte to truncate filespec length
            fab.fab$l_dna = %loc (default) ! use equivalence of word and byte to truncate filespec length
```

```
else                                    ! since a 'null' default is passed as '', don't confuse $create by using ' ' as an actual default string
    fab.fab$l_dna = 0
    fab.fab$b_dns = 0
end if word(1) = ibset (0, FAB$V_PUT)          ! indicate that read access is desired
fab.fab$b_fac = bytes(1)
fab.fab$l_fop = FAB$M_DLT               ! delete on close, maximize version, temporary-marked for delete
fab.fab$w_ifi = 0                       ! (must be zero)
fab.fab$b_org = 0

! use update file sharing on create so that concurrent open can read actual protection
! NOTE:: VMS4.4 needs only SHRUPD, but VMS4.2 insists on more then SHRUPD and SHRGET
word(1) = FAB$M_SHRGET+FAB$M_SHRPUT+FAB$M_SHRUPD+FAB$M_SHRDEL+FAB$M_UPI
fab.fab$b_shr = bytes(1)

fab.fab$l_alg = 0                       ! miscellaneous creation attributes -- for a 'phony' file
fab.fab$w_deq = 0
fab.fab$w_mrs = 0
fab.fab$b_org = FAB$C_SEQ fab.fab$l_nam = %loc (nam)              ! nam block will return resultant file spec
fab.fab$l_xab = %loc (xabpro)           ! protection block will provide actual protection and uic ! set up name block fields to receive final filespec information
nam.nam$b_bid = nam$c_bid
nam.nam$b_bln = nam$c_bln nam.nam$b_ess = fab.fab$b_fns
nam.nam$l_esa = fab.fab$l_fna do i=1, 3                               ! clear fid and did of any possible misleading information
    nam.nam$w_did(i) = 0
    nam.nam$w_fid(i) = 0
end do nam.nam$l_esa = %loc (esnam)
nam.nam$b_ess = 255
nam.nam$l_rsa = %loc (rsnam)
nam.nam$b_rss = 255 nam.nam$b_nop = 0                       ! keep concealed logical names concealed, don't disclose password if (use_rlfnam) then
    nam.nam$l_rlf = %loc (rlfnam)
else
    nam.nam$l_rlf = 0
end if ! set up xab protection block to specify protection and owner
xabpro.xabprodef$$_fill_1 = xab$c_pro
xabpro.xabprodef$$_fill_2 = xab$c_prolen
xabpro.xab$l_aclbuf = 0                 ! no acl's for now !!!!!!
```

```
xabpro.xabprodef$$_fill_4 = 0
xabpro.xab$w_pro = protection        ! either explicit or zero....
long = uic
xabpro.xab$w_mbm = word(1)
xabpro.xab$w_grp = word(2)

status = sys$create (fab, , )
if (.not. status) RETURN

! load resultant file specification from the name block
call oas$$parse_result_name (result, resultlen, fields, nam, rsnam)

! need to open file again in order to read back the file's owner and protection
openfab = fab
openfab.fab$w_ifi = 0

! technically, no i/o -- vms 4.2 glarches STV, but looks like it will take this
! the honest alternative is to use FAB$M_GET -- but that implies read access, which isn't necessarily true
openfab.fab$b_fac = 0 openfab.fab$l_fop = 0
openfab.fab$l_fna = $loc (rsnam)
openfab.fab$b_fns = nam.nam$b_rsl
openfab.fab$l_nam = 0
openfab.fab$l_xab = $loc(xabpro)
call sys$open (openfab, , )

! load actual protection and uic from xab protection block --
protection = xabpro.xab$w_pro
word(1) = xabpro.xab$w_mbm
word(2) = xabpro.xab$w_grp
uic = long call sys$close (openfab, , )

fab.fab$l_fop = FAB$M_DLT               ! (just in case rms forgot....)
call sys$close (fab, , )
return end             ! oas$chk_create ! OAS$CHK_READ simply opens the file for read access. A successful open indicates that the user has at
! least execute access to the directory path for the file.

subroutine oas$chk_read (filespec, default, related, result, resultlen, fields, protection, uic, status)

implicit none include '($FABDEF)'
include '($NAMDEF)'
include '($XABPRODEF)'
include '($SYSSRVNAM)'
include '($RMSDEF)' record /fabdef/ fab
record /namdef/ nam, rlfnam
record /xabprodef1/ xabpro
```

```
      character*(*) filespec, default, related, result
      character esnam*255, rsnam*255
      integer*2 resultlen, fields(2,6), protection, word(2)
      integer*4 uic, status, long, i
      byte bytes(4)
      equivalence (long, word(1), bytes(1))
      logical use_rlfnam result = ' '
      resultlen = 0 if (related .ne. ' ') then
         use_rlfnam = .TRUE.
         call oas$$_parse_related_file (related, rlfnam, status)
         if (.not. status) use_rlfnam = .FALSE.           ! or return
      else
         use_rlfnam = .FALSE.
      end if ! set up fab fields for open
      fab.fab$b_bid = fab$c_bid
      fab.fab$b_bln = fab$c_bln word(1) = len (filespec)
      fab.fab$b_fns = bytes(1)
      fab.fab$l_fna = %loc (filespec)
      if (default .ne. ' ') then
         word(1) = len (default)
         fab.fab$b_dns = bytes(1)     ; use equivalence of word and byte to truncate filespec length
         fab.fab$l_dna = %loc (default)
      else
         ; since a 'null' default is passed as ' ', don't confuse $open by using ' ' as an actual default string
         fab.fab$l_dna = 0
         fab.fab$b_dns = 0
      end if word(1) = ibset (0, FAB$V_GET)   ; indicate that read access is desired
      fab.fab$b_fac = bytes(1)

fab.fab$l_fop = 0                ; no special file-processing options    (experiment with FAB$V_UFO)
      fab.fab$w_ifi = 0                ; (must be zero)
      fab.fab$b_org = 0

; either allow any file sharing, or harass user by insisting on no file sharing (FAB$M_NIL)
      word(1) = FAB$M_SHRGET+FAB$M_SHRPUT+FAB$M_SHRUPD+FAB$M_SHRDEL+FAB$M_UPI
      word(1) = FAB$M_NIL fab.fab$b_shr = bytes(1)

fab.fab$l_nam = %loc (nam)       ; nam block will return resultant file spec
      fab.fab$l_xab = %loc (xabpro)    ; protection block will provide actual protection and uic ! set up name block fields to receive final filespec information
      nam.nam$b_bid = nam$c_bid
      nam.nam$b_bln = nam$c_bln
```

```
nam.nam$b_name = fab.fab$b_fns
nam.nam$l_name = fab.fab$l_fna do i=1, 3          ! clear fid and did of any possible misleading information
    nam.nam$w_did(i) = 0
    nam.nam$w_fid(i) = 0
end do nam.nam$l_esa = %loc (esnam)
nam.nam$b_ess = 255
nam.nam$l_rsa = %loc (rsnam)
nam.nam$b_rss = 255 nam.nam$b_nop = 0      ! keep concealed logical names concealed, don't disclose password if (use_rlfnam) then
    nam.nam$l_rlf = %loc (rlfnam)
else
    nam.nam$l_rlf = 0
end if ! set up xab protection block to receive actual uic and owner
xabpro.xabprodef$$_fill_1 = xab$c_pro
xabpro.xabprodef$$_fill_2 = xab$c_prolen
xabpro.xab$l_aclbuf = 0              ! no acl's for now !!!!!!
xabpro.xabprodef$$_fill_4 = 0
xabpro.xab$w_pro = protection        ! either explicit or zero.....
long = uic
xabpro.xab$w_mbm = word(1)
xabpro.xab$w_grp = word(2)

status = sys$open (fab, , )
if (.not. status) RETURN

! load resultant file specification from the name block
call oas$$parse_result_name (result, resultlen, fields, nam, rsnam)

! load actual protection and uic from xab protection block --
protection = xabpro.xab$w_pro
word(1) = xabpro.xab$w_mbm
word(2) = xabpro.xab$w_grp
uic = long call sys$close (fab, , )
return end        ! oas$chk_read OAS$CHK_CHANGE opens the file in order to find the file's protection and owner and implicitly check
execute access to the file's directory path. It then calls oas$check_protection to test the caller's
ability to 'control' the file.

NOTE: 'control' access is not an explicit bit in the VMS protection word (YET). It only exists as
a bit in access control fields. Consequently, oas$check_protection actually clears the control bits
(grants control access) for system and owner in a second protection word it supplies.
```

```
        subroutine oas$chk_change (filespec, default, related, result, resultlen, fields, protection, uic, status)

implicit none include '($FABDEF)'
        include '($NAMDEF)'
        include '($XABPRODEF)'
        include '($SYSSRVNAM)'
        include '($RMSDEF)'
        include '($ARMDEF)' record /fabdef/ fab
        record /namdef/ nam, rlfnam
        record /xabprodef1/ xabpro character*(*) filespec, default, related, result
        character esnam*255, rsnam*255
        integer*2 resultlen, fields(2,6), protection, word(2)
        integer*4 uic, status, long, i
        byte bytes(4)
        equivalence (long, word(1), bytes(1))
        logical use_rlfnam result = ' '
        resultlen = 0 if (related .ne. ' ') then
            use_rlfnam = .TRUE.
            call oas$$_parse_related_file (related, rlfnam, status)
            if (.not. status) use_rlfnam = .FALSE.       ! or return
        else
            use_rlfnam = .FALSE.
        end if ! set up fab fields for open
        fab.fab$b_bid = fab$c_bid
        fab.fab$b_bln = fab$c_bln word(1) = len (filespec)
        fab.fab$b_fns = bytes(1)
        fab.fab$l_fna = %loc (filespec)
        if (default .ne. ' ') then
            word(1) = len (default)
            fab.fab$b_dns = bytes(1)
            fab.fab$l_dna = %loc (default)
        else
            ! since a 'null' default is passed as ' ', don't confuse $open by using ' ' as an actual default string
            fab.fab$l_dna = 0
            fab.fab$b_dns = 0
        end if fab.fab$b_fac = 0 fab.fab$l_fop = 0
        fab.fab$w_ifi = 0                ! (must be zero)
```

```
fab.fab$b_org = 0
! either allow any file sharing, or harass user by insisting on no file sharing (FAB$M_NIL)
word(1) = FAB$M_SHRGET+FAB$M_SHRPUT+FAB$M_SHRUPD+FAB$M_SHRDEL+FAB$M_UPI
word(1) = FAB$M_NIL
fab.fab$b_shr = bytes(1)

fab.fab$l_nam = %loc (nam)          ! nam block will return resultant file spec
fab.fab$l_xab = %loc (xabpro)       ! protection block will provide actual protection and uic ! set up name block fields to receive final filespec information
nam.nam$b_bid = nam$c_bid
nam.nam$b_bln = nam$c_bln nam.nam$b_name = fab.fab$b_fns
nam.nam$l_name = fab.fab$l_fna do i=1,3    ! clear fid and did of any possible misleading information
  nam.nam$w_did(i) = 0
  nam.nam$w_fid(i) = 0
end do nam.nam$l_esa = %loc (esnam)
nam.nam$b_ess = 255
nam.nam$l_rsa = %loc (rsnam)
nam.nam$b_rss = 255 nam.nam$b_nop = 0    ! keep concealed logical names concealed, don't disclose password if (use_rlfnam) then
  nam.nam$l_rlf = %loc (rlfnam)
else
  nam.nam$l_rlf = 0
end if ! set up xab protection block to receive actual uic and owner
xabpro.xabpro def$$_fill_1 = xab$c_pro
xabpro.xabpro def$$_fill_2 = xab$c_prolen
xabpro.xab$l_aclbuf = 0              ! no acl's for now !!!!!
xabpro.xabpro def$$_fill_4 = 0
xabpro.xab$w_pro = protection        ! either explicit or zero....
long = uic
xabpro.xab$w_mbm = word(1)
xabpro.xab$w_grp = word(2)

status = sys$open (fab, , )          ! if user can't open it, then can't change it
if (.not. status) RETURN ! load resultant file specification from the name block
call oa$$parse_result_name (result, resultlen, fields, nam, rsnam)

! load actual protection and uic from xab protection block --
protection = xabpro.xab$w_pro
word(1) = xabpro.xab$w_mbm
word(2) = xabpro.xab$w_grp
```

```
        uic = long
        fab.fab$l_xab = 0
        call sys$close (fab,,)
        call oas$check_protection (ARM$M_CONTROL, protection, uic, status)
        return
        end     ! oas$chk_change ! OAS$CHK_RENAME  check for ability to rename an oas file and change to specified uic and protection
!
! It appears that rename works with simply control access to file, and write access to directory...
!
! This version of rename actually checks for read and control access to oldfilespec and the ability
! to create the newfilespec (implicitly checking writeability of directory).
!
! The first call to read will change the value of the arguments protection and uic to the protection
! and owner of the oldfilespec.  The second call to create will use the explicit protection and uic
! to create the newfilespec.  This is what VMS rename would do.  Unfortunately, OAS rename permits
! changing protection and uic.  Consequently, I've added code (in comments) to interpret what OAS
! should do.

subroutine oas$chk_rename (oldfilespec, newfilespec, default, related, oldresult, oldresultlen, oldfields,
     1    newresult, newresultlen, newfields, protection, uic, status)

implicit none include '($ARMDEF)' character*(*) oldfilespec, newfilespec, default, related, oldresult, newresult
        integer*2 oldresultlen, oldfields(2,6), newresultlen, newfields(2,6), protection, temp_protection
        integer*4 uic, status, temp_uic temp_uic = uic                                          !save user specified uic and protection
        temp_protection = protection
        if (uic .ne. 0) then                                    !<-GWD  User must control specified uic
            call oas$check_protection (ARM$M_CONTROL, protection, uic, status) !<-GWD
            if (.not. status) RETURN                            !<-GWD
        end if
        call oas$chk_read (oldfilespec, default, related, oldresult, oldresultlen, oldfields, protection, uic, status) !<-GWD User must be able to read existing file
        if (.not. status) RETURN                                !<-GWD
        call oas$check_protection (ARM$M_CONTROL, protection, uic, status) !<-GWD User must control uic of existing file
        if (.not. status) RETURN                                !<-GWD !GWD> on create, use user specified protection and uic.  If null, use those of existing file if (temp_uic .eq. 0) temp_uic = uic
        if (temp_protection .eq. -1) temp_protection = protection
        call oas$chk_create (newfilespec, default, related, newresult, newresultlen, newfields, temp_protection, temp_uic, status)
        return end     ! oas$chk_rename
```

```
! OAS$CHK_DELETE opens the file to get protection and owner.  It calls oas$$check_protection to verify delete access to
! the file.  It then verifies write access to the directory path by creating and deleting a temporary file.

subroutine oas$chk_delete (filespec, default, related, result, resultlen, fields, protection, uic, status)

implicit none include '($FABDEF)'
      include '($NAMDEF)'
      include '($XABPRODEF)'
      include '($SYSSRVNAM)'
      include '($ARMDEF)' record /fabdef/ fab
      record /namdef/ nam, rlfnam
      record /xabprodef1/ xabpro character*(*) filespec, default, related, result
      character    esnam*255, rsnam*255
      integer*2    resultlen, fields(2,6), protection, word(2)
      integer*4    uic, status, long, i
      byte         bytes(4)
      equivalence  (long, word(1), bytes(1))
      logical      use_rlfnam result = ' '
      resultlen = 0 if (related .ne. ' ') then
        use_rlfnam = .TRUE.
        call oas$$_parse_related_file (related, rlfnam, status)
        if (.not. status) use_rlfnam = .FALSE.     ! or return
      else
        use_rlfnam = .FALSE.
      end if ! set up fab fields for open
      fab.fab$b_bid = fab$c_bid
      fab.fab$b_bln = fab$c_bln word(1) = len (filespec)
      fab.fab$b_fns = bytes(1)
      fab.fab$l_fna = %loc (filespec)                 ! use equivalence of word and byte to truncate filespec length
      if (default .ne. ' ') then
        word(1) = len (default)
        fab.fab$b_dns = bytes(1)                      ! use equivalence of word and byte to truncate filespec length
        fab.fab$l_dna = %loc (default)
      else
        ! since a 'null' default is passed as ' ', don't confuse $open by using ' ' as an actual default string
        fab.fab$l_dna = 0
        fab.fab$b_dns = 0
      end if fab.fab$b_fac = 0
```

```
fab.fab$l_fop = 0
fab.fab$w_ifi = 0                    ! (must be zero)
fab.fab$b_org = 0

! either allow any file sharing, or harass user by insisting on no file sharing (FAB$M_NIL)
word(1) = FAB$M_SHRGET+FAB$M_SHRPUT+FAB$M_SHRUPD+FAB$M_SHRDEL+FAB$M_UPI
word(1) = FAB$M_NIL
fab.fab$b_shr = bytes(1)

fab.fab$l_nam = %loc (nam)           ! nam block will return resultant file spec
fab.fab$l_xab = %loc (xabpro)        ! Protection block will provide actual protection and uic ! set up name block fields to receive final filespec information
nam.nam$b_bid = nam$c_bid
nam.nam$b_bln = nam$c_bln nam.nam$b_name = fab.fab$b_fns
nam.nam$l_name = fab.fab$l_fna do i=1, 3      ! clear fid and did of any possible misleading information
    nam.nam$w_did(i) = 0
    nam.nam$w_fid(i) = 0
end do nam.nam$l_esa = %loc (esnam)
nam.nam$b_ess = 255
nam.nam$l_rsa = %loc (rsnam)
nam.nam$b_rss = 255 nam.nam$b_nop = 0      ! keep concealed logical names concealed, don't disclose password if (use_rlfnam) then
.   nam.nam$l_rlf = %loc (rlfnam)
else
    nam.nam$l_rlf = 0
end if ! set up xab protection block to receive actual uic and owner
xabpro.xabprodef$$_fill_1 = xab$c_pro
xabpro.xabprodef$$_fill_2 = xab$c_prolen
xabpro.xab$l_aclbuf = 0              ! no acl's for now !!!!!!
xabpro.xabprodef$$_fill_4 = 0
xabpro.xab$w_pro = protection        ! either explicit or zero.....
long = uic
xabpro.xab$w_mbm = word(1)
xabpro.xab$w_grp = word(2)

status = sys$open (fab, , )
if (.not. status) RETURN

! load resultant file specification from the name block
call oas$$parse_result_name (result, resultlen, fields, nam, rsnam)
```

```
! load actual protection and uic from xab protection block --
protection = xabpro.xab$w_pro
word(1) = xabpro.xab$w_mbm
word(2) = xabpro.xab$w_grp
uic = long call sys$close (fab, , )

call oas$$check_protection (ARM$M_DELETE, protection, uic, status)
if (.not. status) RETURN ! now try to create and delete a temporary file to check for write access to the directory fab.fab$w_ifi = 0
if (fields(2,4) .gt. 1) then    ! borrow pathname
    fab.fab$b_fns = 15+(fields(2,4)-1)
    rsnam = result(1:fields(2,4)-1)//'oas$$$temp.dat'
    fab.fab$l_fna = %loc (rsnam)
else
    fab.fab$l_fna = %loc ('oas$$$temp.dat')
    fab.fab$b_fns = 15
end if
fab.fab$l_nam = 0
fab.fab$b_org = 0
fab.fab$l_fop = FAB$M_DLT+FAB$M_MXV
fab.fab$b_shr = 0
fab.fab$l_alq = 0                ! miscellaneous creation attributes -- for a 'phony' file
fab.fab$w_deq = 0
fab.fab$w_mrs = 0
fab.fab$b_org = FAB$C_SEQ
fab.fab$l_xab = %loc (xabpro)    ! protection block will provide actual protection and uic
xabpro.xab$w_pro = 0             ! world everything
status = sys$create (fab, , )    ! don't even have enough privilege to write on the directory
if (.not. status) RETURN
! now try to delete this temporary file
fab.fab$l_fop = FAB$M_DLT
call sys$close (fab, , )

return end         ! oas$chk_delete

! OAS$CHK_FILE opens the file for read with several xab blocks.  It loads protection, uic, cdt, rdt, edt, and bdt
! from the xab blocks.  It then loops reading the file into the records array until either RECORDS_MAX is hit,
! EOF, or an error (overflow) occurs on reading a record.
!
! NOTE: context is ignored.  It's presence is merely a reminder of the desireability of future wild card capabilities.
!       ... it's not clear that a wild card context should be reflected at such a low level.  it would be better to use
!       find_file to supply full filespecs -- and then call oas$read_full_dbentry (filespec, records, recordlens, status)

subroutine oas$chk_file (filespec, default, related, result, resultlen, fields, cdt, rdt, edt, bdt, protection, uic,
1    records, recordlens, context, status)

implicit none
```

```
include '($FABDEF)'
include '($NAMDEF)'
include '($RABDEF)'
include '($XABDEF)'
include '($XABDATDEF)'
include '($XABRDTDEF)'
include '($XABPRODEF)'
include '($SYSSRVNAM)'
include '($RMSDEF)' record /fabdef/ fab
record /namdef/ nam, rlfnam
record /rabdef/ rab
record /xabdatdef/ xabdat
record /xabdef/ xabrdt  ! note: the rdt fields are actually contained in xabdef, rather than xabrdtdef
record /xabprodef1/ xabpro

PARAMETER RECORDS_MAX=10 character*(*) filespec, default, related, result, records(RECORDS_MAX)
character esnam*255, rsnam*255
integer*2 resultlen, fields(2,6), protection, word(2), recordlens(RECORDS_MAX)
integer*4 uic, status, long, i, cdt(2), rdt(2), bdt(2), context
byte bytes(4)
equivalence (long, word(1), bytes(1))
logical use_rlfnam result = ' '
resultlen = 0 if (related .ne. ' ') then
    use_rlfnam = .TRUE.
    call oas$$_parse_related_file (related, rlfnam, status)
    if (.not. status) use_rlfnam = .FALSE.   ! or return
else
    use_rlfnam = .FALSE.
end if ! set up fab fields for open
fab.fab$b_bid = fab$c_bid
fab.fab$b_bln = fab$c_bln word(1) = len (filespec)
fab.fab$b_fns = bytes(1)
fab.fab$l_fna = %loc (filespec)   ! use equivalence of word and byte to truncate filespec length
if (default .ne. ' ') then
    word(1) = len (default)
    fab.fab$b_dns = bytes(1)       ! use equivalence of word and byte to truncate filespec length
    fab.fab$l_dna = %loc (default)
else
    ! since a 'null' default is passed as ' ', don't confuse $open by using ' ' as an actual default string
    fab.fab$l_dna = 0
    fab.fab$b_dns = 0
end if
```

```
word(1) = ibset (0, FAB$V_GET)    ! indicate that read access is desired
fab.fab$b_fac = bytes(1)

fab.fab$l_fop = 0                 ! no special file-processing options    (experiment with FAB$V_UFO)
fab.fab$w_ifi = 0                 ! (must be zero)
fab.fab$b_org = 0

! either allow any file sharing, or harass user by insisting on no file sharing (FAB$M_NIL)
word(1) = FAB$M_SHRGET+FAB$M_SHRPUT+FAB$M_SHRUPD+FAB$M_SHRDEL+FAB$M_UPI
word(1) = FAB$M_NIL
fab.fab$b_shr = bytes(1)

fab.fab$l_nam = %loc (nam)        ! nam block will return resultant file spec
fab.fab$l_xab = %loc (xabdat)     ! link up xab blocks, leaving protection at the end ! set up name block fields to receive final filespec information
nam.nam$b_bid = nam$c_bid
nam.nam$b_bln = nam$c_bln nam.nam$b_name = fab.fab$b_fns
nam.nam$l_name = fab.fab$l_fna do i=1, 3                         ! clear fid and did of any possible misleading information
    nam.nam$w_did(i) = 0
    nam.nam$w_fid(i) = 0
end do nam.nam$l_esa = %loc (esnam)
nam.nam$b_ess = 255
nam.nam$l_rsa = %loc (rsnam)
nam.nam$b_rss = 255 nam.nam$b_nop = 0                 ! keep concealed logical names concealed, don't disclose password if (use_rlfnam) then
    nam.nam$l_rlf = %loc (rlfnam)
else
    nam.nam$l_rlf = 0
end if ! set up xab dat block to receive cdt, edt, and bdt
xabdat.xabdat$$_fill_1 = xab$c_dat
xabdat.xabdat$$_fill_2 = xab$c_datlen
xabdat.xabdat$$_fill_4 = %loc (xabrdt)

! set up xab 'rdt' block to receive rdt...
xabrdt.xab$b_cod = xab$c_rdt
xabrdt.xab$b_bln = xab$c_rdtlen
xabrdt.xab$l_nxt = %loc (xabpro)
```

```
                                                                ! set up xab protection block to receive actual uic and owner
xabpro.xabprodef$$_fill_1 = xab$c_pro
xabpro.xabprodef$$_fill_2 = xab$c_prolen
xabpro.xab$l_aclbuf = 0                                         ! no acl's for now !!!!!
xabpro.xabprodef$$_fill_4 = 0
xabpro.xab$w_pro = protection                                   ! either explicit or zero.....
long = uic
xabpro.xab$w_mbm = word(1)
xabpro.xab$w_grp = word(2)

status = sys$open (fab, , )
if (.not. status) RETURN

! load resultant file specification from the name block
call oas$$parse_result_name (result, resultlen, fields, nam, rsnam)

! load cdt, bdt, and edt from xabdat
cdt(1) = xabdat.xab$q_cdt(1)
cdt(2) = xabdat.xab$q_cdt(2)
edt(1) = xabdat.xab$q_edt(1)
edt(2) = xabdat.xab$q_edt(2)
bdt(1) = xabdat.xab$q_bdt(1)
bdt(2) = xabdat.xab$q_bdt(2)

! load rdt from xabrdt
rdt(1) = xabrdt.xab$q_rdt(1)
rdt(2) = xabrdt.xab$q_rdt(2)

! load actual protection and uic from xab protection block --
protection = xabpro.xab$w_pro
word(1) = xabpro.xab$w_mbm
word(2) = xabpro.xab$w_grp
uic = long ! now, read in all the records from the db file ! first, connect a record stream to the file
rab.rab$l_fab = %loc(fab)
rab.rab$b_bid = rab$c_bid
rab.rab$b_bln = rab$c_bln
rab.rab$w_isi = 0
rab.rab$b_krf = 0
rab.rab$b_mbc = 0                 ! not supported for decnet operations
rab.rab$b_mbf = 0                 ! not supported for decnet operations
rab.rab$l_rop = 0                 ! not supported for decnet operations
rab.rab$l_pbf = 0
rab.rab$b_psz = 0
rab.rab$b_rac = RAB$C_SEQ
rab.rab$l_rhb = 0
rab.rab$l_xab = 0 status = sys$connect (rab)
```

```
! clear recordlens array of former information
do i=1, RECORDS_MAX
    recordlens(i) = 0
end do ! loop reading records
i = 1
do while (status .eq. RMS$_SUC)
    rab.rab$l_ubf = %loc (records(i))
    rab.rab$w_usz = len (records(i))
    status = sys$get (rab)

if (status .eq. RMS$_SUC) recordlens(i) = rab.rab$w_rsz
    i = i + 1
    if (i .gt. RECORDS_MAX) status = 0
end do
status = RMS$_SUC       ! restore status to indicate successful completion ! sys$close does an implicit disconnect on the file
call sys$close (fab,,)
return end             ! oas$chk_file ! OAS$FILESCAN  Returns all the fields of the filespec, checks for valid syntax
!
! This routine calls sys$filescan and returns the resulting field in an array compatable with the OAS_HEAP module
! routines.  In the array, (1,*) is a field length and (2,*) is a field position.  If the field is not present both will
! be zero.  It is assumed that the filespec contains no leading blank space.  Trailing blank space is permissable.  If
! the filescan service succeeds, but the filespec was illegal, those fields that were discovered before the error are
! returned.

subroutine oas$filescan (filespec,fields,status)

implicit none
character*(*) filespec                  !Input filespec
integer*2 fields(2,6)                   !output field pointers
integer*4 status                        !Return status
include '($FSCNDEF)'
integer*4 sys$filescan
structure /item_2/
    integer*2 length
    integer*2 code
    integer*4 position
end structure
structure /item_list_2/
    record /item_2/ item(6)
    integer*4 terminator /0/
end structure
record /item_list_2/ items
integer i,j,k
character*255 file
integer*2 length ! Trim filespec and call SYS$FILESCAN
```

```
      file = filespec
      length = len(filespec)
      call str$trim(file(1:length),file(1:length),length)
      items.item(1).code = fscn$_node
      items.item(2).code = fscn$_device
      items.item(3).code = fscn$_directory
      items.item(4).code = fscn$_name
      items.item(5).code = fscn$_type
      items.item(6).code = fscn$_version
      status = sys$filescan(file(1:length),items,)
      if (.not. status) then
          do i = 1,6
              fields(1,i) = 0
              fields(2,i) = 0
          end do
          status = 0
          return
      end if ! Return the fields as found.  Check if the sum of the lengths .eq. the
! trimmed length of filespec.  If not, an illegal filespec was specified.

j = 0
      do i = 1,6
          j = j + items.item(i).length
          fields(1,i) = items.item(i).length
          if (items.item(i).position .ne. 0) then
              fields(2,i) = items.item(i).position - %loc(file) + 1
          else
              fields(2,i) = 0
          end if
      end do
      if (j .ne. length) then
          status = 0
      end if
      return
      end
```

These two routines commented out are related to the automatic creation of directories upon archive. The first, OAS$FILEPARSE, is
believed to be complete and correct, but is untested. The second, OAS$DIRPARSE is not complete, and is called from OAS$FILEPARSE
in certain cases. They must be completed and tested before automatic dir creation is possible.

```
! OAS$FILEPARSE Combines filespec, default and related strings into a resultant filespec and returns all the fields.
!
! This routine calls oas$filescan to scan each input filespec. The resultant filespec is then built using rules
! that attempt to simulate rms defaulting. The resultant filespec is then scanned and returned. It is assumed that
! filespecs contain no leading spaces, unless they are null (consisting entirely of spaces.)
!
! IMPORTANT NOTE: This routine intentionally does NOT exactly mimic rms parsing, particularly in regard to the treatment
! of filespecs containing node names, and the defaulting of type and version fields. Logical name translation is NOT
! performed; Omitted type does not default to "." and omitted version does not default to ";".
!
      subroutine oas$fileparse (filespec,defaultspec,relatedspec,resultantspec,resultantlen,fields,status)
```

```fortran
      implicit none
      character*(*) filespec              !Input filespec
      character*(*) defaultspec           !Input default filespec
      character*(*) relatedspec           !Input related filespec
      character*(*) resultantspec         !Output resultant filespec
      integer*2 resultantlen              !Output resultant length
      integer*2 fields(2,6)               !Output field pointers
      integer*4 status                    !Return status
      include '($RMSDEF)'
      integer*4 sys$fileparse
      integer i,j,k
      character*255 file,default,related,result,temp
      integer*2 flen,dlen,rlen,length,tlen
      parameter ln = 1,ps = 2
      parameter nd = 1,dv = 2,dr = 3,nm = 4,ty = 5,vr = 6
      integer*2 fflds(2,6),dflds(2,6),rflds(2,6)

!     Trim input filespecs and scan file = filespec
      flen = len(filespec)
      call str$trim(file(1:flen),file(1:flen),flen)
      if (flen .gt. 0) then
          call oas$filescan(file(1:flen),fflds,status)
          if (.not. status) return
      else
          do i = ln,ps
              do j = nd,vr
                  fflds(i,j) = 0
              end do
          end do
      end if
      default = defaultspec
      dlen = len(defaultspec)
      call str$trim(default(1:dlen),default(1:dlen),dlen)
      if (dlen .gt. 0) then
          call oas$filescan(default(1:dlen),dflds,status)
          if (.not. status) return
      else
          do i = ln,ps
              do j = nd,vr
                  dflds(i,j) = 0
              end do
          end do
      end if
      related = relatedspec
      rlen = len(relatedspec)
      call str$trim(related(1:rlen),related(1:rlen),rlen)
      if (rlen .gt. 0) then
          call oas$filescan(related(1:rlen),rflds,status)
          if (.not. status) return
      else
          do i = ln,ps
              do j = nd,vr
                  rflds(i,j) = 0
```

```
        end do
      end if

Build resultant filespec, one field at a time.

length = 0

Node. If no node then include no node.

if (fflds(ln,nd) .ne. 0) then
    result(length+1:length+1+fflds(ln,nd)-1) = file(fflds(ps,nd):fflds(ps,nd)+fflds(ln,nd)-1)
    fields(ln,nd) = fflds(ln,nd)
    fields(ps,nd) = length + 1
    length = length + fflds(ln,nd)
else if (dflds(ln,nd) .ne. 0) then
    result(length+1:length+1+dflds(ln,nd)-1) = file(dflds(ps,nd):dflds(ps,nd)+dflds(ln,nd)-1)
    fields(ln,nd) = dflds(ln,nd)
    fields(ps,nd) = length + 1
    length = length + dflds(ln,nd)
else if (rflds(ln,nd) .ne. 0) then
    result(length+1:length+1+rflds(ln,nd)-1) = file(rflds(ps,nd):rflds(ps,nd)+rflds(ln,nd)-1)
    fields(ln,nd) = rflds(ln,nd)
    fields(ps,nd) = length + 1
    length = length + rflds(ln,nd)
else
    fields(ln,nd) = 0
    fields(ps,nd) = 0
end if Device. If no device then include no device.

if (fflds(ln,dv) .ne. 0) then
    result(length+1:length+1+fflds(ln,dv)-1) = file(fflds(ps,dv):fflds(ps,dv)+fflds(ln,dv)-1)
    fields(ln,dv) = fflds(ln,dv)
    fields(ps,dv) = length + 1
    length = length + fflds(ln,dv)
else if (dflds(ln,dv) .ne. 0) then
    result(length+1:length+1+dflds(ln,dv)-1) = file(dflds(ps,dv):dflds(ps,dv)+dflds(ln,dv)-1)
    fields(ln,dv) = dflds(ln,dv)
    fields(ps,dv) = length + 1
    length = length + dflds(ln,dv)
else if (rflds(ln,dv) .ne. 0) then
    result(length+1:length+1+rflds(ln,dv)-1) = file(rflds(ps,dv):rflds(ps,dv)+rflds(ln,dv)-1)
    fields(ln,dv) = rflds(ln,dv)
    fields(ps,dv) = length + 1
    length = length + rflds(ln,dv)
else
    fields(ln,dv) = 0
    fields(ps,dv) = 0
end if Directory. If no directory then include no directory. If [.dir], [-.dir] or [-] type syntax in filespec then
attempt to resolve using default and related as the basis.
```

```
           if (fflds(ln,dr) .ne. 0) then
           if (index(file(fflds(ps,dr)+fflds(ps,dr):fflds(ps,dr)+fflds(ln,dr)-1),'[.')  .ne. 0 .or.
        2      index(file(fflds(ps,dr)+fflds(ps,dr):fflds(ps,dr)+fflds(ln,dr)-1),'[-')  .ne. 0) then
               if (dlen .gt. 0) then
                   temp = default(dflds(ps,dr):dflds(ps,dr)+dflds(ln,dr)-1)
                   tlen = dflds(ln,dr)
               else if (rlen .gt. 0) then
                   temp = related(rflds(ps,dr):rflds(ps,dr)+rflds(ln,dr)-1)
                   tlen = rflds(ln,dr)
               else
                   temp = ' '
                   tlen = 0
               end if
               if (tlen .gt. 0) then
                   call oas$dirparse(file(fflds(ps,dr):fflds(ps,dr)+fflds(ln,dr)-1),
        2              temp(1:tlen),result(length+1:),fields(ln,dr),status)
                   if (.not. status) return
                   fields(ps,dr) = length + 1
                   length = length + fields(ln,dr)
               else
                   status = rms$_syn
                   return
               end if
           else
               result(length+1:length+1+fflds(ln,dr)-1) = file(fflds(ps,dr):fflds(ps,dr)+fflds(ln,dr)-1)
               fields(ln,dr) = fflds(ln,dr)
               fields(ps,dr) = length + 1
               length = length + fflds(ln,dr)
           end if
           else if (dflds(ln,dr) .ne. 0) then
               result(length+1:length+1+dflds(ln,dr)-1) = file(dflds(ps,dr):dflds(ps,dr)+dflds(ln,dr)-1)
               fields(ln,dr) = dflds(ln,dr)
               fields(ps,dr) = length + 1
               length = length + dflds(ln,dr)
           else if (rflds(ln,dr) .ne. 0) then
               result(length+1:length+1+rflds(ln,dr)-1) = file(rflds(ps,dr):rflds(ps,dr)+rflds(ln,dr)-1)
               fields(ln,dr) = rflds(ln,dr)
               fields(ps,dr) = length + 1
               length = length + rflds(ln,dr)
           else
               fields(ln,dr) = 0
               fields(ps,dr) = 0
           end if ! Name. If no name then include no name.

if (fflds(ln,nm) .ne. 0) then
               result(length+1:length+1+fflds(ln,nm)-1) = file(fflds(ps,nm):fflds(ps,nm)+fflds(ln,nm)-1)
               fields(ln,nm) = fflds(ln,nm)
               fields(ps,nm) = length + 1
               length = length + fflds(ln,nm)
           else if (dflds(ln,nm) .ne. 0) then
               result(length+1:length+1+dflds(ln,nm)-1) = file(dflds(ps,nm):dflds(ps,nm)+dflds(ln,nm)-1)
               fields(ln,nm) = dflds(ln,nm)
               fields(ps,nm) = length + 1
               length = length + dflds(ln,nm)
```

```
else if (rflds(ln,nm) .ne. 0) then
    result(length+1:length+1+rflds(ln,nm)-1) = file(rflds(ps,nm):rflds(ps,nm)+rflds(ln,nm)-1)
    fields(ln,nm) = rflds(ln,nm)
    fields(ps,nm) = length + 1
    length = length + rflds(ln,nm)
else
    fields(ln,nm) = 0
    fields(ps,nm) = 0
end if Type.  If no type then include no type.

if (fflds(ln,ty) .ne. 0) then
    result(length+1:length+1+fflds(ln,ty)-1) = file(fflds(ps,ty):fflds(ps,ty)+fflds(ln,ty)-1)
    fields(ln,ty) = fflds(ln,ty)
    fields(ps,ty) = length + 1
    length = length + fflds(ln,ty)
else if (dflds(ln,ty) .ne. 0) then
    result(length+1:length+1+dflds(ln,ty)-1) = file(dflds(ps,ty):dflds(ps,ty)+dflds(ln,ty)-1)
    fields(ln,ty) = dflds(ln,ty)
    fields(ps,ty) = length + 1
    length = length + dflds(ln,ty)
else if (rflds(ln,ty) .ne. 0) then
    result(length+1:length+1+rflds(ln,ty)-1) = file(rflds(ps,ty):rflds(ps,ty)+rflds(ln,ty)-1)
    fields(ln,ty) = rflds(ln,ty)
    fields(ps,ty) = length + 1
    length = length + rflds(ln,ty)
else
    fields(ln,ty) = 0
    fields(ps,ty) = 0
end if Version.  If no version then include no version.

if (fflds(ln,vr) .ne. 0) then
    result(length+1:length+1+fflds(ln,vr)-1) = file(fflds(ps,vr):fflds(ps,vr)+fflds(ln,vr)-1)
    fields(ln,vr) = fflds(ln,vr)
    fields(ps,vr) = length + 1
    length = length + fflds(ln,vr)
else if (dflds(ln,vr) .ne. 0) then
    result(length+1:length+1+dflds(ln,vr)-1) = file(dflds(ps,vr):dflds(ps,vr)+dflds(ln,vr)-1)
    fields(ln,vr) = dflds(ln,vr)
    fields(ps,vr) = length + 1
    length = length + dflds(ln,vr)
else if (rflds(ln,vr) .ne. 0) then
    result(length+1:length+1+rflds(ln,vr)-1) = file(rflds(ps,vr):rflds(ps,vr)+rflds(ln,vr)-1)
    fields(ln,vr) = rflds(ln,vr)
    fields(ps,vr) = length + 1
    length = length + rflds(ln,vr)
else
    fields(ln,vr) = 0
    fields(ps,vr) = 0
end if Return as much of the result as possible, with appropriate status
```

```
            if (len(resultantspec) .le. length) then
                resultantspec = result(1:length)
                resultantlen = length
                status = rms$_suc
            else
                resultantspec = result(1:len(resultantspec))
                resultantlen = len(resultantspec)
                status = 0
            end if
            return
            end
!
! OAS$DIRPARSE  Returns the resultant directory spec from an input directory spec involving [.dir], [-.dir] or [-]
!
! This routine produces the resultant directory when the input directory spec involve relative directory specifiers.
! If the input directory spec does not involve relative specifiers, it is returned.  If the input directory spec
! is null, the default is returned.  If both are null, null is returned.  The input specs may not have leading space.
! Trailing space is ok.

subroutine oas$dirparse(dirspec,defaultspec,resultantspec,resultantlen,status)

implicit none
            character*(*)   dirspec              !Input dirspec
            character*(*)   defaultspec          !Input default filespec
            character*(*)   resultantspec        !Output resultant filespec
            integer*2       resultantlen         !Output resultant length
            integer*4       status               !Return status
            include '($RMSDEF)'
            integer i,j,k
            character*255 file,default
            integer*2 flen,dlen,length return
            end
```

IMPLEMENTATION ROUTINES

```
! OAS$$CHECK_PROTECTION packages sys$chkpro -- it also 'defines' control access as a right given to users with
! owner or system access to a file subroutine oas$$check_protection (caller_access, protection, caller_owner, status)
implicit none include '($SYSSRVNAM)'
include '($CHPDEF)' integer*4 caller_access, caller_owner, status, itmlist(10), access, raccess, owner, rowner, rprot
integer*2 protection, itmword(20), prot_vect(2)

equivalence (itmlist(1), itmword(1))

itmword(1)  = 4
itmword(2)  = CHP$_ACCESS
itmlist(2)  = %loc (access)
itmlist(3)  = %loc (raccess)

itmword(7)  = 4
itmword(8)  = CHP$_OWNER
itmlist(5)  = %loc(owner)
itmlist(6)  = %loc(rowner)

itmword(13) = 4
itmword(14) = CHP$_PROT
itmlist(8)  = %loc(prot_vect(1))
itmlist(9)  = %loc (rprot)

itmlist(10) = 0
access      = caller_access
owner       = caller_owner
prot_vect(1) = protection
prot_vect(2) = 'FFEE'x              !!!!! indicate that only system and owner have control access status = sys$chkpro (itmlist)

return
end        ! oas$$check_protection

! OAS$$PARSE_RESULT_NAME packages the loading of 'fields' from nam blocks subroutine oas$$parse_result_name (result, resultlen, fields, nam, rsnam)

implicit none include '($NAMDEF)'
```

```fortran
      character*(*) result, rsnam
      integer*2 resultlen, fields(2,6), word
      record /namdef/ nam
      byte bytes(2)
      equivalence (word, bytes(1))

parameter len=1, pos=2, node=1, dev=2, dir=3, name=4, type=5, ver=6

! avoid sign extension when loading resultlen from a byte field
      word = 0
      bytes(1) = nam.nam$b_rsl
      resultlen = word
      result = rsnam(1:resultlen)

! load fields array from nam$b_node ... nam$b_ver
      fields(len, node) = nam.nam$b_node
      if (fields(len, node) .ne. 0) then
        fields(pos, node) = nam.nam$l_node - nam.nam$l_rsa + 1
      else
        fields(pos, node) = 0
      end if fields(len, dev) = nam.nam$b_dev
      if (fields(len, dev) .ne. 0) then
        fields(pos, dev) = nam.nam$l_dev - nam.nam$l_rsa + 1
      else
        fields(pos, dev) = 0
      end if fields(len, dir) = nam.nam$b_dir
      if (fields(len, dir) .ne. 0) then
        fields(pos, dir) = nam.nam$l_dir - nam.nam$l_rsa + 1
      else
        fields(pos, dir) = 0
      end if fields(len, name) = nam.nam$b_name
      if (fields(len, name) .ne. 0) then
        fields(pos, name) = nam.nam$l_name - nam.nam$l_rsa + 1
      else
        fields(pos, name) = 0
      end if fields(len, type) = nam.nam$b_type
      if (fields(len, type) .ne. 0) then
        fields(pos, type) = nam.nam$l_type - nam.nam$l_rsa + 1
      else
        fields(pos, type) = 0
      end if fields(len, ver) = nam.nam$b_ver
      if (fields(len, ver) .ne. 0) then
        fields(pos, ver) = nam.nam$l_ver - nam.nam$l_rsa + 1
      else
        fields(pos, ver) = 0
      end if
      return                    ! oas$$parse_result_name
      end
```

Copyright 1987, University of Wisconsin Physical Sciences Laboratory. This
software contains valuable and proprietary information and cannot be dis-
closed, copied or used by others without prior written permission.

---

```
CALLER VERIFIES THAT CORRECT PLATTER IS MOUNTED!!!

restore.for — uses request packet to:
        1) extract vms database entry  (for fid)
        2) check vms protection rights
        3) read oas_header
        4) create/write vms file
returns finishing information in reply packet NOTE: doesnot verify directory tree access — on source!!  change to check_access ASAP
```

---

```
        subroutine restore (req_pkt, reply_pkt, errcode)

implicit none
        integer*4 i, j, k include 'OAS_FILE_STRUCT: packet.inc'
        include 'OAS_FILE_STRUCT: drvsts.inc'
        include 'OAS_FILE_STRUCT: strmap.inc'
        include 'OAS_FILE_STRUCT: vms_header.inc'
        include 'OAS_FILE_STRUCT: oas_header.inc'
        include 'OAS_FILE_STRUCT: data.inc'
        include 'OAS_FILE_STRUCT: file_names.inc'
        include 'OAS_FILE_STRUCT: storage_names.inc'
        include 'OAS_FILE_STRUCT: rms_io_sync.inc' include '($FABDEF)'
        include '($RABDEF)'
        include '($RMSDEF)'
        include '($ARMDEF)'
        include '($SYSSRVNAM)'
        include '($SSDEF)' structure /long_word_struct/
            union
                map
                    integer*4 long
                end map
                map
                    integer*2 low_word, high_word
                endmap
                map
                    byte byte1, byte2, byte3, byte4
                endmap
            end union
        end structure record /oas_request_block/ req_pkt
        record /reply_packet/ reply_pkt
        record /vms_header_block/ vmsentry
        record /oas_header_block/ oasheader
        record /long_word_struct/ temp record /fabdef/ fab
        record /rabdef/ rab integer*4 errcode, ABORT_CLEANUP, num_sectors, start_block, end_block, cleanup_flags, error_array(26), start_time(2),
     1   stop_time(2), num_headers, rms_io_completion, buffer_optical, buffer_rms, current_buffer, efn_state, access_code integer*4 OAS$_NO_RESTORE, DRV$_SUCCESS, OAS$_RESTORED, DRV$_USER_ERROR_TRACE, DRV$_ABORT_TRNSFR, DRV$_DEV_STS
        external OAS$_NO_RESTORE, DRV$_SUCCESS, OAS$_RESTORED, DRV$_USER_ERROR_TRACE, DRV$_ABORT_TRNSFR, DRV$_DEV_STS,
     1   rms_io_completion parameter VMS_FAB = 0, VMS_RAB = 1, PARTIAL_WRITE = 2 structure /address/
            union
                map
                    integer*4 long
                end map
                map
                    integer*2 low, high
                end map
            end union
        end structure record /address/ current, new_position

ASSIGN 1000 TO ABORT_CLEANUP
```

```
call sys$gettim (start_time)
drvsts.activity = READ       ! activity = read
drvsts.phase = 0 ! phase 0 = initialization
drvsts.file_request_id = req_pkt.oas_request_id
cleanup_flags = 0
errcode = %loc (DRV$_SUCCESS)

! get/verify vms info, preload reply_pkt
! access verification of output file should wait until its opened
call get_vms_descriptor (req_pkt, reply_pkt, vmsentry, errcode)
if (.not. errcode) RETURN       ! o.w., redundant error msg drvsts.fid = vmsentry.fid
drvsts.phase = 1

! read oas header in (and load it into an appropriate data structure)
call get_oas_descriptor (req_pkt, reply_pkt, oasheader, vmsentry, num_headers, errcode)
if (.not. errcode) RETURN       ! o.w., redundant error msg ! change to check_access ASAP  (vms4.4+)
call check_protection (req_pkt.owner, req_pkt.privilege, ARM$V_READ, oasheader.vms.owner,
1       oasheader.vms.protection, errcode)
if (.not. errcode) then
    call sys$getmsg (%val (%loc (OAS$_NO_RESTORE)), lmsg2, msg2,,)
    call sys$fao (%descr(msg2(1:lmsg2)), lmsg1, msg1, %val (olength), %ref(oas_file))
    call sys$getmsg (%val(errcode), lmsg2, %descr(msg2), , )
    reply_pkt.reply.status = %loc (OAS$_NO_RESTORE)
    errcode = %loc (OAS$_NO_RESTORE)
    lmsg = lmsg1+lmsg2
    msg(1:lmsg) = msg1(1:lmsg1) // msg2(1:lmsg2)
    reply_pkt.reply.message_pos = reply_pkt.reply.first_free
    lmsg = min (lmsg, REP$_HEAP_LENGTH-reply_pkt.reply.first_free+1)
    reply_pkt.reply.message_len = lmsg
    reply_pkt.reply.first_free = reply_pkt.reply.first_free + lmsg
    reply_pkt.reply.heap(reply_pkt.reply.message_pos : reply_pkt.reply.first_free - 1) = msg (1:lmsg)
    goto ABORT_CLEANUP
end if
drvsts.phase = 2

! create vms file
call create_vms_file (req_pkt, reply_pkt, vmsentry, oasheader, fab, rab, errcode)
if (.not. errcode) RETURN       ! o.w. redundant error msg
cleanup_flags = ibset (ibset(cleanup_flags, VMS_FAB), VMS_RAB)

drvsts.phase = 3

! loop reading optical disk and writing to file  WATCH OUT FOR STARTING REQUESTS ON EVEN BLOCK BOUNDARIES
start_block = max(1, req_pkt.starting_block)      !!!** loop through bad block list to find physical starting addresss
if (req_pkt.number_blocks .eq. 0) then
    end_block = oasheader.vms.blocks
else
    end_block = min (req_pkt.number_blocks + start_block - 1,
1       oasheader.vms.blocks)
end if current.high = oasheader.oas.starting_high_word
current.low = oasheader.oas.starting_low_word current_buffer = 1
buffer_optical = %loc (buffer)
buffer_rms = %loc (auxbuffer)
errcode = sys$setef (%val(rms_io_ef))

do i=start_block, end_block, BUFFER_BYTE_SIZE/512 drvsts.phase =4
    num_sectors = min (BUFFER_BYTE_SIZE/1024, (end_block-i+2)/2)

drvsts.vbn = i
    drvsts.current_sector = current.long
    call f0rd (req_pkt.oas_request_id, %val (buffer_optical), BUFFER_WORD_SIZE, num_sectors,
1       current.high, current.low, drvsts.status, errcode)

!! check for skips -- match skips against known flaws
    if (.not. errcode) then       ! one retry
        call f0rd (req_pkt.oas_request_id, %val (buffer_optical), BUFFER_WORD_SIZE, num_sectors,
1           current.high, current.low, drvsts.status, errcode)
    end if
    if (errcode) then
        !! attempt to salvage if possible --
        !! recover for slvg'd data -- leave ecc data in file --
        !!   leave none ecc data + vbn in separate file
        if ((drvsts.status.transfer_residue .ne. 0) .or.
1           ((drvsts.status.status .and. CMS$M_CHCKEND) .eq. CMS$M_CHCKEND)) then
            call complete_read (current, num_sectors, oasheader, %val(buffer_optical), reply_pkt, errcode)
            if (.not. errcode) goto ABORT_CLEANUP
        end if
```

```
!! read flaw table, if flaw table entries > 100, log it and then clear flaw table
current.high = drvsts.status.current_high_word
current.low = drvsts.status.current_low_word
current.long = current.long + 1
new_position.high = drvsts.status.current_high_word
new_position.low = drvsts.status.current_low_word
if (current.long+num_sectors - 1 .ne. new_position.long) then   ! new errors or old?
    !! check bad sector should update current.long to start of next read
        call check_bad_sector_list (current.long, num_sectors, oasheader, reply_pkt, errcode)
        if (.not. errcode) goto ABORT_CLEANUP
    else
        current.long = current.long+num_sectors
    end if
else
    reply_pkt.reply.status = %loc (OAS$_NO_RESTORE)
    call sys$getmsg (%val(%loc (OAS$_NO_RESTORE)), lmsg2, msg2,,)
    call sys$fao (%descr(msg2(1:lmsg2)), lmsg1, msg1, %val (olength), %ref(oas_file))
    lmsg2 = len (' Lost drive during restore')
    msg2 (1:lmsg2) = ' Lost drive during restore'
    reply_pkt.reply.message_pos = reply_pkt.reply.first_free
    lmsg = min (REP$_HEAP_LENGTH-reply_pkt.reply.first_free+1, lmsg1+lmsg2)
    msg(1:lmsg) = msg1(1:lmsg1) // msg2(1:lmsg2)
    reply_pkt.reply.message_len = lmsg
    reply_pkt.reply.first_free = reply_pkt.reply.first_free + lmsg
    reply_pkt.reply.heap (reply_pkt.reply.message_pos : reply_pkt.reply.first_free - 1) = msg(1:lmsg)

! ***** LOG DRIVE STATUS INITIALLY TO RECOVER
    error_array(1) = len ('restore')
    error_array(2) = %loc ('restore')
    error_array(3) = drvsts.cid
    error_array(4) = platter_length
    error_array(5) = %loc (platter_string)
    error_array(6) = olength
    error_array(7) = %loc (oas_file)
    error_array(8) = drvsts.vbn
    error_array(9) = num_sectors
    error_array(10) = 12
    error_array(11) = %loc (req_pkt.username)
    call error (%loc(DRV$_ABORT_TRNSFR), error_array, 11, 'RESTORE: lost drive during restore')
    error_array(1) = len ('RESTORE: aborting transfer')
    error_array(2) = %loc ('RESTORE: aborting transfer')
    do j=1, 24
        error_array(j+2) = zext(drvsts.status.array(j))
    end do
    call error (%loc(DRV$_DEV_STS), error_array, 26, ' ')
    goto ABORT_CLEANUP
end if drvsts.phase = 5 rab.rab$l_bkt = i
rab.rab$l_rbf = buffer_optical
! if (last block) then
if (i+BUFFER_BYTE_SIZE/512-1 .ge. end_block) then
    temp.long = (num_sectors-1)*1024+oasheader.oas.last_byte
    rab.rab$w_rsz = temp.low_word
else
    rab.rab$w_rsz = BUFFER_BYTE_SIZE
end if
temp.low_word = rab.rab$w_rsz
errcode = sys$waitfr (%val(rms_io_ef))
if (.not. errcode) call lib$signal (%val (errcode))
errcode = sys$clref (%val (rms_io_ef))
if (.not. errcode) call lib$signal (%val (errcode))
errcode = sys$write (rab, rms_io_completion, rms_io_completion)
if (current_buffer .eq. 1) then
    current_buffer = 0
    buffer_optical = %loc (auxbuffer)
else
    current_buffer = 1
    buffer_optical = %loc (buffer)
end if
if (.not. errcode ) then !.ne. RMS$_SUC) then
    reply_pkt.reply.status = %loc (OAS$_NO_RESTORE)
    call sys$getmsg (%val(%loc (OAS$_NO_RESTORE)), lmsg2, msg2,,)
    call sys$fao (%descr(msg2(1:lmsg2)), lmsg1, msg1, %val (olength), %ref(oas_file))
    call sys$getmsg (%val(errcode), lmsg2, msg2,,)
    reply_pkt.reply.message_pos = reply_pkt.reply.first_free
    lmsg = min (REP$_HEAP_LENGTH-reply_pkt.reply.first_free+1, lmsg1+lmsg2)
    msg(1:lmsg) = msg1(1:lmsg1) // msg2(1:lmsg2)
    reply_pkt.reply.message_len = lmsg
    reply_pkt.reply.first_free = reply_pkt.reply.first_free + lmsg
    reply_pkt.reply.heap (reply_pkt.reply.message_pos : reply_pkt.reply.first_free - 1) = msg(1:lmsg)
    ! after a bit of use, remove error call — since only [sic] errors
    ! will be from users' bad name specifications.
    call error (%loc (DRV$_USER_ERROR_TRACE), errcode, 0,
```

```
1            'RESTORE-error writing vms file for restore '
1             // msg2(1:lmsg2) // ' ' // vms_file(1 : vlength))
        goto ABORT_CLEANUP
    end if drvsts.sectors_transferred = drvsts.sectors_transferred+num_sectors
    cleanup_flags = ibset (cleanup_flags, PARTIAL_WRITE)

end do errcode = sys$waitfr (%val(rms_io_ef))
if (.not. errcode) call lib$signal (%val (errcode))
errcode = sys$clref (%val (rms_io_ef))
if (.not. errcode) call lib$signal (%val (errcode))

errcode = sys$disconnect (rab, , )
if (.not. errcode) then
    cleanup_flags = ibclr (cleanup_flags, VMS_RAB)
end if errcode = sys$close (fab, , )
if (.not. errcode) then
    cleanup_flags = ibclr (cleanup_flags, VMS_FAB)
end if cleanup_flags = ibclr (cleanup_flags, PARTIAL_WRITE)
call flush_flaw_table (errcode) ! and ignore error return ...

! update drvsts
drvsts.activity = 0
drvsts.phase = 0 errcode = %loc (OAS$_RESTORED)
reply_pkt.reply.status = errcode
call sys$getmsg (%val (errcode), lmsg2, msg2,,)
call sys$fao (%descr(msg2(1:lmsg2)), lmsg, msg, %val(olength), %ref (oas_file), %val(vlength), %ref (vms_file))
lmsg = min (REP$_HEAP_LENGTH-reply_pkt.reply.first_free+1, lmsg)
reply_pkt.reply.message_pos = reply_pkt.reply.first_free
reply_pkt.reply.message_len = lmsg
reply_pkt.reply.first_free = reply_pkt.reply.first_free + lmsg
reply_pkt.reply.heap (reply_pkt.reply.message_pos : reply_pkt.reply.first_free - 1) = msg(1:lmsg)

if (oasheader.oas.description_len .gt. 0) then
    i = min (oasheader.oas.description_len, REP$_HEAP_LENGTH - reply_pkt.reply.first_free + 1)
    reply_pkt.reply.description_len = i
    reply_pkt.reply.description_pos = reply_pkt.reply.first_free
    reply_pkt.reply.first_free = reply_pkt.reply.first_free + i
    reply_pkt.reply.heap (reply_pkt.reply.description_pos : reply_pkt.reply.first_free - 1) =
1       oasheader.heap(oasheader.oas.description_pos : oasheader.oas.description_pos + i - 1)
else
    reply_pkt.reply.description_len = 0
    reply_pkt.reply.description_pos = 0
end if ! update stats
call stats (reply_pkt)
! update accounting
call sys$gettim (stop_time)
access_code = 2 ! restore
if (.not. (bitest (req_pkt.internal_flags, REQ$V_PUBLIC))) access_code = 8      ! private restore
call accounting (req_pkt.username(1:12), req_pkt.owner, req_pkt.account(1:8), 'RESTORE', access_code, start_time,
1       stop_time, vmsentry.used_sectors, req_pkt.heap(req_pkt.vms_node_pos : req_pkt.vms_node_pos + req_pkt.vms_node_len -1) )
drvsts.transactions = drvsts.transactions+1
RETURN ! ABORT_CLEANUP
! presumes reply_pkt loaded already with appropriate message
1000 drvsts.phase = 6
if (btest (cleanup_flags, VMS_RAB)) then
    errcode = sys$disconnect (rab, , )
    if (errcode) cleanup_flags = ibclr (cleanup_flags, VMS_RAB)
end if
if (btest (cleanup_flags, VMS_FAB)) then ! *** what does RMS do if rab still connected? (tsfn== tough luck for now)
    fab.fab$l_fop = ibset (0, FAB$V_DLT)
    errcode = sys$close (fab, , )
    if (errcode) cleanup_flags = ibclr (cleanup_flags, VMS_FAB)
end if
if (btest (cleanup_flags, PARTIAL_WRITE)) then
    if ((btest (cleanup_flags, VMS_FAB)) .or.
1       (btest (cleanup_flags, VMS_RAB))) then
        reply_pkt.vms_status = errcode
    else
        reply_pkt.vms_status = FILE_PARTIALLY_RESTORED
    end if
end if
```

```
        call stats (reply_pkt)
        call accounting (reply_pkt)

drvsts.activity = 0
        drvsts.phase = 0 return
        end
```

Copyright 1987, University of Wisconsin Physical Sciences Laboratory. This
software contains valuable and proprietary information and cannot be dis-
closed, copied or used by others without prior written permission.

```
    retire.for
            read vms_db file
            modify optical and magnetic headers
            delete vms_db file(s)

on error: log message — use manual intervention for fixing
```

```
        subroutine retire (req_pkt, reply_pkt, errcode)

implicit none
        integer*4 i, j, k include 'OAS_FILE_STRUCT: packet.inc'
        include 'OAS_FILE_STRUCT: drvsts.inc'
        include 'OAS_FILE_STRUCT: strmap.inc'
        include 'OAS_FILE_STRUCT: vms_header.inc'
        include 'OAS_FILE_STRUCT: oas_header.inc'
        include 'OAS_FILE_STRUCT: data.inc'
        include 'OAS_FILE_STRUCT: file_names.inc'
        include 'OAS_FILE_STRUCT: storage_names.inc' record /oas_request_block/ req_pkt
        record /reply_packet/ reply_pkt
        record /vms_header_block/ vmsentry
        record /oas_header_block/ oasheader integer*4 errcode, ERROR_RETURN, error_array(26), start_time(2), stop_time(2), old_headers, new_headers,
       1        starting_sector, ending_sector, ioerr, UPDATE_STORAGE, access_code integer*4 OAS$_NO_RETIRE, DRV$_SUCCESS, OAS$_RETIRED, DRV$_INTERNAL_ERROR, lib$delete_file
        external OAS$_NO_RETIRE, DRV$_SUCCESS, OAS$_RETIRED, DRV$_INTERNAL_ERROR, lib$delete_file
        integer*4 vslength, oslength
        character vs_file*512, os_file*512 structure /address/
            union
                map
                    integer*4 long
                end map
                map
                    integer*2 low, high
                end map
            end union
        end structure record /address/ current, new_position character*(*) CRLF
        parameter (CRLF=char('0d'x)//char('0a'x))

ASSIGN 100 TO UPDATE_STORAGE
        ASSIGN 1000 TO ERROR_RETURN call sys$gettim (start_time)
        drvsts.activity = DRV$_RETIRE    ! activity = RETIRE
        drvsts.phase = 0                 ! phase 0 = initialization
        drvsts.file_request_id = req_pkt.oas_request_id
        errcode = %loc (DRV$_SUCCESS)

! get vms info, preload reply_pkt
        call get_vms_descriptor (req_pkt, reply_pkt, vmsentry, errcode)
        if (.not. errcode) RETURN drvsts.fid = vmsentry.fid
        drvsts.phase = 1

! read oas header in (and load it into an appropriate data structure)
        call get_oas_descriptor (req_pkt, reply_pkt, oasheader, vmsentry, old_headers, errcode)
        if (.not. errcode) RETURN
        drvsts.phase = 2 oasheader.oas.state = DRV$_RETIRE
        oasheader.oas.seq = oasheader.oas.seq+1
        ! repacking bumps storage.current_fid in memory (errcode is irrelevant)
```

```
call repack_old_headers (oasheader, old_headers, new_headers, errcode)
drvsts.phase = 3

! write out to magnetic disk
write (indexu'oasheader.fid, err=300, iostat=ioerr) oasheader
do i=1, max(new_headers, old_headers)-1
    if (i .lt. new_headers) buffer.sector(i).word(EXT$W_SEQ) = oasheader.oas.seq
    write (indexu'buffer.sector(i).long(EXT$L_FID), err=300, iostat=ioerr) buffer.sector(i)
end do
call flush_index (errcode)
if (.not. errcode) then
    lmsg2 = len (CRLF // 'Error writing new optical headers')
    msg2(1:lmsg2) = CRLF // 'Error writing new optical headers'
    goto ERROR_RETURN
end if
drvsts.phase = 4

! write out optical headers
starting_sector = storage.current_fid_addr+1
call write_optical_log (req_pkt.oas_request_id, oasheader.array, 1, starting_sector, ending_sector, drvsts.status, errcode)
if (.not. errcode) then
    lmsg2 = len (CRLF // 'Error writing new optical headers')
    msg2(1:lmsg2) = CRLF // 'Error writing new optical headers'
    goto UPDATE_STORAGE
end if vmsentry.fid_addr = ending_sector if (max(new_headers,old_headers) .gt. 1) then
    starting_sector = ending_sector+1
    call write_optical_log (req_pkt.oas_request_id, buffer.word, max(new_headers,old_headers)-1,
1       starting_sector, ending_sector, drvsts.status, errcode)
    if (.not. errcode) then
        lmsg2 = len (CRLF // 'Error writing new optical headers')
        msg2(1:lmsg2) = CRLF // 'Error writing new optical headers'
        goto UPDATE_STORAGE
    end if
end if drvsts.phase = 5

! UPDATE_STORAGE: write storage structure to storage file
100  storage.current_fid_addr = max (ending_sector, storage.current_fid_addr) ! check for underflow....
     storage.last_fid_addr = max (ending_sector, storage.last_fid_addr)
     storage.retired_count = storage.retired_count + oasheader.oas.used_sectors + oasheader.oas.bad_sector_count
     open (unit=25, file= strname(1:strlength), err=400, iostat=ioerr, status='old', access='direct', shared,
1       form='unformatted', recordtype='fixed', recordsize=128)
     write (25'1, err=500, iostat=ioerr) storage
     close (unit=25, err=600, iostat=ioerr)
     if (.not. errcode) GOTO ERROR_RETURN    ! errcode was set by write_optical_log errcode = lib$delete_file (oas_file(1:olength), , , , , , ,)
if (.not. errcode) then
    call sys$getmsg (%val (errcode), lmsg2, %descr(msg2), ,)
    call error ( %loc (DRVS_INTERNAL_ERROR), errcode, 0, 'RETIRE: error deleting ' // oas_file(1:olength) //
1       CRLF // msg2(1:lmsg2))
    lmsg2 = len (CRLF // 'Error removing database file')
    msg2(1:lmsg2) = CRLF // 'Error removing database file'
    goto ERROR_RETURN
end if
drvsts.phase = 6

! update stats
! call stats (reply_pkt)
! update accounting
call sys$gettim (stop_time)
access_code = 5 ! retire
if (.not. (bitest (req_pkt.internal_flags, REQ$V_PUBLIC))) access_code = 11    ! private retire
call accounting (req_pkt.username(1:12), req_pkt.owner, req_pkt.account(1:8), 'RETIRE', access_code, start_time, stop_time,
1   vmsentry.used_sectors, req_pkt.heap(req_pkt.vms_node_pos : req_pkt.vms_node_pos+req_pkt.vms_node_len-1) )

! update drvsts
drvsts.activity = 0
drvsts.phase = 0 errcode = %loc (OAS$_RETIRED)
reply_pkt.reply.status = errcode
call sys$getmsg (%val (errcode), lmsg2, msg2,,)
call sys$fao (%descr(msg2(1:lmsg2)), lmsg, msg, %val(olength), %ref (oas_file))
lmsg = min (REP$_HEAP_LENGTH-reply_pkt.reply.first_free+1, lmsg)
reply_pkt.reply.message_pos = reply_pkt.reply.first_free
reply_pkt.reply.message_len = lmsg
reply_pkt.reply.first_free = reply_pkt.reply.first_free + lmsg
reply_pkt.reply.heap (reply_pkt.reply.message_pos : reply_pkt.reply.first_free - 1) = msg(1:lmsg)
RETURN
```

```
        ! WRITE INDEX ERROR
300     call errsns (,,,,ioerr)
        call sys$getmsg (%val(ioerr), lmsg2, %descr(msg2), , )
        call error (%loc(DRV$_INTERNAL_ERROR), errcode, 0, 'RETIRE: error writing index file ' // indname(1:indlength)
     1      //CRLF//msg2(1:lmsg2))
        GOTO ERROR_RETURN ! OPEN STORAGE ERROR
400     call errsns (,,,,ioerr)
        call sys$getmsg (%val(ioerr), lmsg1, %descr(msg1), , )
        call error (%loc (DRV$_INTERNAL_ERROR), errcode, 0, 'RETIRE: error opening storage file '
     1      //strname(:strlength)//CRLF//msg1(1:lmsg1))
        if (.not. errcode) GOTO ERROR_RETURN    ! original failure was in writing optical log errcode = %loc (DRV$_INTERNAL_ERROR)
        lmsg2 = len (' Lost drive updating storage file')
        msg2 (1:lmsg2) = ' Lost drive updating storage file'
        GOTO ERROR_RETURN ! WRITE STORAGE ERROR
500     call errsns (,,,,ioerr)
        call sys$getmsg (%val(ioerr), lmsg1, %descr(msg1), , )
        call error (%loc (DRV$_INTERNAL_ERROR), errcode, 0, 'RETIRE: error writing storage file '
     1      //strname(:strlength)//CRLF//msg1(1:lmsg1))
        if (.not. errcode) GOTO ERROR_RETURN    ! original failure was in writing optical log errcode = %loc (DRV$_INTERNAL_ERROR)
        lmsg2 = len (' Lost drive updating storage file')
        msg2 (1:lmsg2) = ' Lost drive updating storage file'
        close (unit=25, err=400, iostat=ioerr)
        GOTO ERROR_RETURN ! CLOSE STORAGE ERROR
600     call errsns (,,,,ioerr)
        call sys$getmsg (%val(ioerr), lmsg1, %descr(msg1), , )
        call error (%loc (DRV$_INTERNAL_ERROR), errcode, 0, 'RETIRE: error closing storage file '
     1      //strname(:strlength)//CRLF//msg1(1:lmsg1))
        if (.not. errcode) GOTO ERROR_RETURN    ! original failure was in writing optical log errcode = %loc (DRV$_INTERNAL_ERROR)
        lmsg2 = len (' Lost drive updating storage file')
        msg2 (1:lmsg2) = ' Lost drive updating storage file'
        GOTO ERROR_RETURN ! ERROR_RETURN: package up error messages
1000    call sys$getmsg (%val (%loc (OAS$_NO_RETIRE)), lmsg1, msg1,,)
        call sys$fao (%descr(msg1(1:lmsg1)), lmsg, msg, %val (olength), %ref(oas_file))

reply_pkt.reply.status = %loc (OAS$_NO_RETIRE)
        errcode = %loc (OAS$_NO_RETIRE)

msg(lmsg+1:lmsg+lmsg2) = msg2(1:lmsg2)
        lmsg = lmsg+lmsg2 reply_pkt.reply.message_pos = reply_pkt.reply.first_free
        lmsg = min (lmsg, REP$_HEAP_LENGTH-reply_pkt.reply.first_free+1)
        reply_pkt.reply.message_len = lmsg
        reply_pkt.reply.first_free = reply_pkt.reply.first_free + lmsg
        reply_pkt.reply.heap(reply_pkt.reply.message_pos : reply_pkt.reply.first_free - 1) = msg (1:lmsg)
        RETURN end Copyright 1987, University of Wisconsin Physical Sciences Laboratory. This
software contains valuable and proprietary information and cannot be dis-
closed, copied or used by others without prior written permission.
```

--- update_vms_header
           write out final vmsheader entry to the database directory

---

```
        subroutine update_vms_header (req_pkt, reply_pkt, oasheader, vmsentry, errcode)

implicit none include 'OAS_FILE_STRUCT: packet.inc'
        include 'OAS_FILE_STRUCT: oas_header.inc'
        include 'OAS_FILE_STRUCT: vms_header.inc'
        include 'OAS_FILE_STRUCT: file_names.inc'
        include 'OAS_FILE_STRUCT: storage_names.inc' include '($FABDEF)'
        include '($RABDEF)'
```

```
include '($XABDEF)'
include '($XABRDTDEF)'
include '($XABPRODEF)'
include '($SYSSRVNAM)'
include '($RMSDEF)' record /oas_request_block/ req_pkt
record /reply_packet/ reply_pkt
record /oas_header_block/ oasheader
record /vms_header_block/ vmsentry
record /fabdef/ fab
record /rabdef/ rab
record /xabdef/ xabrdt    ! note: the rdt fields are actually contained in xabdef, rather than xabrdtdef
record /xabprodef1/ xabpro integer*4 errcode, tlength, DRV$_SUCCESS, DRV$_INTERNAL_ERROR, OAS$_NO_ARCHIVE
external DRV$_SUCCESS, DRV$_INTERNAL_ERROR, OAS$_NO_ARCHIVE
integer*2 word
byte     bytes(2)
equivalence (word, bytes(1))
character*255 tmp_file character*(*) CRLF
parameter (CRLF=char('0d'x)//char('0a'x))

! unpack vms-db-file name from request packet
! ignore store information for now -- avoid using decnet access if (req_pkt.request_code .eq. REQ$_RENAME) then
    tmp_file(1:vlength) = vms_file(1:vlength)
    tlength = vlength
else
    tmp_file(1:olength) = oas_file(1:olength)
    tlength = olength
end if fab.fab$b_bid = FAB$C_BID
fab.fab$b_bln = FAB$C_BLN
fab.fab$l_alq = 1
fab.fab$b_bks = 0
! word = ibset (ibset (0, FAB$V_GET), FAB$V_PUT)
word = FAB$M_GET + FAB$M_PUT + FAB$M_UPD + FAB$M_TRN
fab.fab$b_fac = bytes(1)
fab.fab$l_fna = %loc (tmp_file) ! now, it should exist!!!
fab.fab$b_fns = tlength
! fab.fab$l_fop = ibset (ibset (0, FAB$V_MXV), FAB$V_SUP)
fab.fab$l_fop = 0
fab.fab$b_fsz = 0
fab.fab$w_gbc = 0
fab.fab$w_ifi = 0
fab.fab$l_mrn = 0
fab.fab$w_mrs = 512
fab.fab$l_nam = 0
fab.fab$b_org = FAB$C_SEQ
fab.fab$b_rat = FAB$M_CR
fab.fab$b_rfm = FAB$C_VAR
fab.fab$b_rtv = 0
word = ibset (0, FAB$V_SHRGET)
fab.fab$b_shr = bytes(1)
fab.fab$b_fsz = 0
fab.fab$l_xab = %loc (xabrdt)

! set up xab 'rdt' block to receive rdt...
xabrdt.xab$b_cod = xab$c_rdt
xabrdt.xab$b_bln = xab$c_rdtlen
xabrdt.xab$l_nxt = %loc (xabpro)

! set up xab protection block
xabpro.xabprodef$$_fill_1 = xab$c_pro
xabpro.xabprodef$$_fill_2 = xab$c_prolen
xabpro.xab$l_aclbuf = 0          ! no acl's for now !!!!!!
xabpro.xabprodef$$_fill_4 = 0 errcode = sys$open (fab, , )
if (.not. errcode) then
    call sys$getmsg (%val(errcode), lmsg, %descr(msg), , )
    lmsg2 = len ('UPDATE_VMS_HEADER error opening vms db directory file '//tmp_file (1:tlength)//CRLF// msg(1:lmsg))
    msg2(1:lmsg2) = 'UPDATE_VMS_HEADER error opening vms db directory file '//tmp_file (1:tlength)//CRLF// msg(1:lmsg)
    goto 400
end if rab.rab$l_fab = %loc (fab)
rab.rab$b_bid = RAB$C_BID
rab.rab$b_bln = RAB$C_BLN
rab.rab$w_isi = 0
rab.rab$b_krf = 0
rab.rab$b_mbc = 1
```

```
    rab.rab$b_mbf = 0
    rab.rab$l_rop = RAB$M_RAH+RAB$M_WBH+RAB$M_TPT errcode = sys$connect (rab, , )
    if (.not. errcode) then
        call sys$getmsg (%val(errcode), lmsg, %descr(msg), , )
        lmsg2 = len ('UPDATE_VMS_HEADER error connecting to vms db directory file '//tmp_file (1:tlength)//CRLF// msg(1:lmsg))
        msg2(1:lmsg2) = 'UPDATE_VMS_HEADER error connecting to vms db directory file '//
1       tmp_file (1:tlength)//CRLF// msg(1:lmsg)
        ! on archive remove any traces
        if (req_pkt.request_code .eq. REQ$_ARCHIVE) fab.fab$l_fop = ibset (0, FAB$V_DLT)
        call sys$close (fab, , )
        goto 400
    end if rab.rab$l_bkt = 0
    rab.rab$b_rac = RAB$C_SEQ
    rab.rab$l_rop = RAB$M_RAH+RAB$M_WBH+RAB$M_TPT rab.rab$l_ubf = %loc (msg1)
    rab.rab$w_usz = len(msg1)        !1024 bytes
    errcode = sys$get (rab, , )
    if (.not. errcode) goto 200

! skip serial_string, get next record with fids!

rab.rab$l_ubf = %loc (msg1)
    rab.rab$w_usz = len(msg1)        !1024 bytes
    errcode = sys$get (rab, , )
    if (.not. errcode) goto 200 write (msg1, '(''FID='', z8.8, '', FID ADDR='', z8.8)') vmsentry.fid, vmsentry.fid_addr
    rab.rab$l_rbf = %loc (msg1)
    rab.rab$w_rsz = 31
    errcode = sys$update (rab, , )
    if (.not. errcode) goto 200 rab.rab$l_ubf = %loc (msg1)
    rab.rab$w_usz = len(msg1)        !1024 bytes
    errcode = sys$get (rab, , )
    if (.not. errcode) goto 200 write (msg1, '(i10.10, '' blocks written'')') vmsentry.used_sectors*2
    rab.rab$l_rbf = %loc (msg1)
    rab.rab$w_rsz = 25
    errcode = sys$update (rab, , )
    if (.not. errcode) goto 200 if ( (req_pkt.request_code .ne. REQ$_ARCHIVE) .and. (btest(req_pkt.qualifier_flags, REQ$V_DESCRIPTION)) ) then
        rab.rab$l_ubf = %loc (msg1)
        rab.rab$w_usz = len(msg1)    !1024 bytes
        errcode = sys$get (rab, , )
        if (.not. errcode) goto 200
        if (oasheader.oas.description_len .le. 0) then
            lmsg1 = 1
            msg1 = ' '
        else
            lmsg1 = oasheader.oas.description_len
            msg1(1:lmsg1) = oasheader.heap(oasheader.oas.description_pos:oasheader.oas.description_pos+lmsg1-1)
        end if
        rab.rab$l_rbf = %loc (msg1)
        rab.rab$w_rsz = lmsg1
        errcode = sys$put (rab, , )
    end if 200 if (.not. errcode) then
        call sys$getmsg (%val(errcode), lmsg, %descr(msg), , )
        lmsg2 = len ('UPDATE_VMS_HEADER error writing to vms db directory file '//tmp_file (1:tlength)//CRLF// msg(1:lmsg))
        msg2(1:lmsg2) = 'UPDATE_VMS_HEADER error writing to vms db directory file '//tmp_file (1:tlength)//CRLF// msg(1:lmsg)
        call sys$disconnect (rab, , )
        ! on archive remove any traces
        if (req_pkt.request_code .eq. REQ$_ARCHIVE) fab.fab$l_fop = ibset (0, FAB$V_DLT)
        call sys$close (fab, , )
        goto 400
    end if errcode = sys$disconnect (rab, , )
    if (.not. errcode) then
        call sys$getmsg (%val(errcode), lmsg, %descr(msg), , )
        lmsg2 = len ('UPDATE_VMS_HEADER error disconnecting vms db directory file '//tmp_file (1:tlength)//CRLF// msg(1:lmsg))
        msg2(1:lmsg2) = 'UPDATE_VMS_HEADER error disconnecting vms db directory file '//
1       tmp_file (1:tlength)//CRLF// msg(1:lmsg)
        ! on archive remove any traces
        if (req_pkt.request_code .eq. REQ$_ARCHIVE) fab.fab$l_fop = ibset (0, FAB$V_DLT)
        call sys$close (fab, , )
        goto 400
    end if
```

```
! use xabs to set file characteristics on close:  for archive, maintain revision history with rdt; for change and rename,
!    set protection and owner information but avoid masking revision information if (req_pkt.request_code .eq. REQ$_ARCHIVE) then
    xabrdt.xab$l_nxt = 0 ! lop off protection xab
else    ! what else is there but change and rename...
    fab.fab$l_xab = %loc (xabpro)        ! skip over rdt—close will update revision history
    if (btest (req_pkt.qualifier_flags, REQ$V_OWNER_UIC)) then
        xabpro.xab$w_mbm = req_pkt.member
        xabpro.xab$w_grp = req_pkt.group
    end if
    if (btest (req_pkt.qualifier_flags, REQ$V_PROTECTION)) xabpro.xab$w_pro = req_pkt.protection
end if errcode = sys$close (fab, , )
if (.not. errcode) then
    call sys$getmsg (%val(errcode), lmsg, %descr(msg), , )
    lmsg2  = len ('UPDATE_VMS_HEADER error closing vms db directory file '//tmp_file (1:tlength)//CRLF// msg(1:lmsg))
    msg2(1:lmsg2)  = 'UPDATE_VMS_HEADER error closing vms db directory file '//tmp_file (1:tlength)//CRLF// msg(1:lmsg)
    goto 400
end if errcode = %loc (DRV$_SUCCESS)
return ! ERROR EXIT
400  call error (%loc(DRV$_INTERNAL_ERROR), errcode, 0, msg2(1:lmsg2))
reply_pkt.reply.status = %loc (OAS$_NO_ARCHIVE)
errcode = %loc (OAS$_NO_ARCHIVE)
call sys$getmsg (%val(errcode), lmsg, %descr(msg), , )
call sys$fao (%descr(msg(1:lmsg)), lmsg1, msg1, %val (vlength), %ref(vms_file))
msg(1:lmsg1+lmsg2) = msg1(1:lmsg1) // msg2(1:lmsg2)
lmsg = min (lmsg1+lmsg2, REP$_HEAP_LENGTH - reply_pkt.reply.first_free + 1)
reply_pkt.reply.message_pos = reply_pkt.reply.first_free
reply_pkt.reply.message_len = lmsg
reply_pkt.reply.first_free = reply_pkt.reply.first_free + lmsg
reply_pkt.reply.heap (reply_pkt.reply.message_pos : reply_pkt.reply.first_free - 1) = msg (1:lmsg)
return end
```

Copyright 1987, University of Wisconsin Physical Sciences Laboratory. This
software contains valuable and proprietary information and cannot be dis-
closed, copied or used by others without prior written permission.

--- write_vms_header
    write out a vmsheader entry to the database directory

---

```
subroutine write_vms_header (req_pkt, reply_pkt, oasheader, vmsentry, errcode)

implicit none include 'OAS_FILE_STRUCT: packet.inc'
include 'OAS_FILE_STRUCT: oas_header.inc'
include 'OAS_FILE_STRUCT: vms_header.inc'
include 'OAS_FILE_STRUCT: file_names.inc'
include 'OAS_FILE_STRUCT: storage_names.inc'
include 'OAS_FILE_STRUCT: xab_blocks.inc'
include 'OAS_FILE_STRUCT: protection.inc' include '($FABDEF)'
include '($RABDEF)'
include '($NAMDEF)'
include '($SYSSRVNAM)'
include '($PMSDEF)' record /oas_request_block/ req_pkt
record /reply_packet/ reply_pkt
record /oas_header_block/ oasheader
record /vms_header_block/ vmsentry
record /fabdef/ fab
record /rabdef/ rab
record /namdef/ nam integer*4 errcode, flength, DRV$_SUCCESS, DRV$_INTERNAL_ERROR, OAS$_NO_ARCHIVE, str$position, lib$delete_file,
1        dlength, long
external DRV$_SUCCESS, DRV$_INTERNAL_ERROR, OAS$_NO_ARCHIVE, str$position, lib$delete_file
character*255 fname
integer*2 word
byte    bytes(2)
equivalence (word, bytes(1), long)
character*(*) CRLF
parameter (CRLF=char('0d'x)//char('0a'x))

fab.fab$b_bid = FAB$C_BID
fab.fab$b_bln = FAB$C_BLN
```

```
fab.fab$l_alq = 1
fab.fab$b_bks = 0
word = ibset (ibset (0, FAB$V_GET), FAB$V_PUT)
fab.fab$b_fac = bytes(1)
fab.fab$l_fna = %loc (oas_file)
fab.fab$b_fns = olength
fab.fab$l_fop = ibset (ibset (0, FAB$V_MXV), FAB$V_SUP)
fab.fab$b_fsz = 0
fab.fab$w_gbc = 0
fab.fab$w_ifi = 0
fab.fab$l_mrn = 0
fab.fab$w_mrs = 512
fab.fab$l_nam = %loc (nam)
fab.fab$b_org = FAB$C_SEQ
fab.fab$b_rat = FAB$M_CR
fab.fab$b_rfm = FAB$C_VAR
fab.fab$b_rtv = 0
word = ibset (0, FAB$V_SHRGET)
fab.fab$b_shr = bytes(1)
fab.fab$b_fsz = 0 nam.nam$b_bid = NAM$C_BID
nam.nam$b_bln = NAM$C_BLN
nam.nam$b_name = fab.fab$b_fns
nam.nam$l_name = fab.fab$l_fna
nam.nam$w_did(1) = 0
nam.nam$w_did(2) = 0
nam.nam$w_did(3) = 0
nam.nam$t_dvi(1:16) = ' '
nam.nam$b_rss = 255
nam.nam$l_rsa = %loc (fname)
nam.nam$b_rsl = 0
nam.nam$l_esa = 0
nam.nam$b_ess = 0
if (btest(req_pkt.qualifier_flags, REQ$V_PROTECTION) .or. btest(req_pkt.qualifier_flags, REQ$V_OWNER_UIC)) then
    fab.fab$l_xab = %loc (prol)
    prol.xab.xab$b_cod = XAB$C_PRO
    prol.xab.xab$b_bln = XAB$C_PROLEN
    prol.xab.xab$l_nxt = 0
    if (btest(req_pkt.qualifier_flags, REQ$V_OWNER_UIC)) then
        prol.prol.xab$l_uic = req_pkt.owner
    else
        prol.prol.xab$l_uic = 0
    end if
    if (btest(req_pkt.qualifier_flags, REQ$V_PROTECTION)) then
        prol.prol.xab$w_pro = req_pkt.protection
    else
        prol.prol.xab$w_pro = 'FFFF'x
    end if
else
    fab.fab$l_xab = 0
end if
call sys$setdfprot (req_pkt.protection, )

errcode = sys$create (fab, , )
call sys$setdfprot (oas_protection, )
if (.not. errcode) then
    call sys$getmsg (%val(errcode), lmsg, %descr(msg), , )
    lmsg2 = len ('WRITE_VMS_HEADER error creating vms db directory file '//oas_file (1:olength)//CRLF// msg(1:lmsg))
    msg2(1:lmsg2) = 'WRITE_VMS_HEADER error creating vms db directory file '//oas_file (1:olength)//CRLF// msg(1:lmsg)
    goto 400
end if if (.not. (btest(req_pkt.qualifier_flags, REQ$V_PROTECTION) .or. btest(req_pkt.qualifier_flags, REQ$V_OWNER_UIC))) then
might as well find out what they ended up as
    fab.fab$l_xab = %loc (prol)
    prol.xab.xab$b_cod = XAB$C_PRO
    prol.xab.xab$b_bln = XAB$C_PROLEN
    prol.xab.xab$l_nxt = 0
    errcode = sys$display (fab, , )
    if (.not. errcode) then
        call sys$getmsg (%val(errcode), lmsg, %descr(msg), , )
        lmsg2 = len ('WRITE_VMS_HEADER error accessing vms db directory file '//oas_file (1:olength)//CRLF// msg(1:lmsg))
        msg2(1:lmsg2) = 'WRITE_VMS_HEADER error accessing vms db directory file '//oas_file (1:olength)//CRLF// msg(1:lmsg)
        fab.fab$l_fop = ibset (0, FAB$V_DLT)
        call sys$close (fab, , )
        goto 400
    end if
    oasheader.vms.owner = prol.prol.xab$l_uic
    oasheader.vms.protection = prol.prol.xab$w_pro        ! interesting algorithm
else
    oasheader.vms.owner = req_pkt.owner
    oasheader.vms.protection = req_pkt.protection
end if word = 0
bytes(1) = nam.nam$b_rsl ! watch   'or zero length names
```

```
            if (word .gt. 0) then
                olength = word
                oas_file (1:olength) = fname (1:olength)
            end if rab.rab$l_fab = %loc (fab)
            rab.rab$b_bid = RAB$C_BID
            rab.rab$b_bln = RAB$C_BLN
            rab.rab$w_isi = 0
            rab.rab$b_krf = 0
            rab.rab$b_mbc = 1
            rab.rab$b_mbf = 0
            rab.rab$l_rop = ibset (0, RAB$V_WBH)

errcode = sys$connect (rab, , )
            if (.not. errcode) then
                call sys$getmsg (%val(errcode), lmsg, %descr(msg), , )
                lmsg2 = len ('WRITE_VMS_HEADER error connecting to vms db directory file '//oas_file (1:olength)//CRLF// msg(1:lmsg))
                msg2(1:lmsg2) = 'WRITE_VMS_HEADER error connecting to vms db directory file '//
      1         oas_file (1:olength)//CRLF// msg(1:lmsg)
                fab.fab$l_fop = ibset (0, FAB$V_DLT)
                call sys$close (fab, , )
                goto 400
            end if ! how ugly!!!!!
            rab.rab$l_bkt = 0
            rab.rab$b_rac = RAB$C_SEQ
            rab.rab$l_rbf = %loc (serial_string)
            rab.rab$w_rsz = serial_length
            errcode = sys$put (rab, , )
            if (.not. errcode) goto 200 write (msg1, '(''FID='', z8.8, '', FID ADDR='', z8.8)') vmsentry.fid, vmsentry.fid_addr
            rab.rab$l_rbf = %loc (msg1)
            rab.rab$w_rsz = 31
            errcode = sys$put (rab, , )
            if (.not. errcode) goto 200 write (msg1, '(i10.10, '' blocks written'')') vmsentry.used_sectors*2
            rab.rab$l_rbf = %loc (msg1)
            rab.rab$w_rsz = 25
            errcode = sys$put (rab, , )
            if (.not. errcode) goto 200 lmsg1 = len ('This file was archived from '//vms_file(1:vlength))
            msg1(1:lmsg1) = 'This file was archived from '//vms_file(1:vlength)
            rab.rab$l_rbf = %loc (msg1)
            rab.rab$w_rsz = lmsg1
            errcode = sys$put (rab, , )
            if (.not. errcode) goto 200 if (req_pkt.description_len .gt. 0) then
                msg1(1:req_pkt.description_len) = req_pkt.heap(req_pkt.description_pos:req_pkt.description_pos+req_pkt.description_len-1)
                rab.rab$w_rsz = req_pkt.description_len
            else
                msg1(1:1) = ' '
                rab.rab$w_rsz = 1
            end if
            rab.rab$l_rbf = %loc (msg1)
            errcode = sys$put (rab, , )

200         if (.not. errcode) then
                call sys$getmsg (%val(errcode), lmsg, %descr(msg), , )
                lmsg2 = len ('WRITE_VMS_HEADER error writing to vms db directory file '//oas_file (1:olength)//CRLF// msg(1:lmsg))
                msg2(1:lmsg2) = 'WRITE_VMS_HEADER error writing to vms db directory file '//oas_file (1:olength)//CRLF// msg(1:lmsg)
                fab.fab$l_fop = ibset (0, FAB$V_DLT)
                call sys$disconnect (rab, , )
                call sys$close (fab, , )
                goto 400
            end if errcode = sys$disconnect (rab, , )
            if (.not. errcode) then
                call sys$getmsg (%val(errcode), lmsg, %descr(msg), , )
                lmsg2 = len ('WRITE_VMS_HEADER error disconnecting vms db directory file '//oas_file (1:olength)//CRLF// msg(1:lmsg))
                msg2(1:lmsg2) = 'WRITE_VMS_HEADER error disconnecting vms db directory file '//
      1         oas_file (1:olength)//CRLF// msg(1:lmsg)
                fab.fab$l_fop = ibset (0, FAB$V_DLT)
                call sys$close (fab, , )
                goto 400
            end if errcode = sys$close (fab, , )
            if (.not. errcode) then
                call sys$getmsg (%val(errcode), lmsg, %descr(msg), , )
                lmsg2 = len ('WRITE_VMS_HEADER error closing vms db directory file '//oas_file (1:olength)//CRLF// msg(1:lmsg))
```

```
            msg2(1:lmsg2) = 'WRITE_VMS_HEADER error closing vms db directory file '//oas_file (1:olength)//CRLF// msg(1:lmsg)
            goto 400
        end if errcode = %loc (DRV$_SUCCESS)
        return ! ERROR EXIT
400 call error (%loc(DRV$_INTERNAL_ERROR), errcode, 0, msg2(1:lmsg2))
    reply_pkt.reply.status = %loc (OAS$_NO_ARCHIVE)
    errcode = %loc (OAS$_NO_ARCHIVE)
    call sys$getmsg (%val(errcode), lmsg, %descr(msg), , )
    call sys$fao (%descr(msg(1:lmsg)), lmsg1, msg1, %val (vlength), %ref(vms_file))
    msg(1:lmsg1+lmsg2) = msg1(1:lmsg1) // msg2(1:lmsg2)
    lmsg = min (lmsg1+lmsg2, REPS_HEAP_LENGTH - reply_pkt.reply.first_free + 1)
    reply_pkt.reply.message_pos = reply_pkt.reply.first_free
    reply_pkt.reply.message_len = lmsg
    reply_pkt.reply.first_free = reply_pkt.reply.first_free + lmsg
    reply_pkt.reply.heap (reply_pkt.reply.message_pos : reply_pkt.reply.first_free - 1) = msg (1:lmsg)
    return Copyright 1987, University of Wisconsin Physical Sciences Laboratory. This
software contains valuable and proprietary information and cannot be dis-
closed, copied or used by others without prior written permission.
```

---

```
change.for -- uses request packet to:
    1) extract vms database entry (for fid)
    2) read oas_header
    3) rewrite oas_header
returns finishing information in reply packet recovery points:
    1) after writing magnetic headers -- recover by selectively rebuilding magnetic index
    2) during write of optical logs -- recover by retry
        (both of these are best implemented by hand)
```

---

```
    subroutine change (req_pkt, reply_pkt, errcode)

implicit none
    integer*4 i, j, k include 'OAS_FILE_STRUCT: packet.inc'
    include 'OAS_FILE_STRUCT: drvsts.inc'
    include 'OAS_FILE_STRUCT: strmap.inc'
    include 'OAS_FILE_STRUCT: vms_header.inc'
    include 'OAS_FILE_STRUCT: oas_header.inc'
    include 'OAS_FILE_STRUCT: data.inc'
    include 'OAS_FILE_STRUCT: file_names.inc'
    include 'OAS_FILE_STRUCT: storage_names.inc' include '($ARMDEF)' record /oas_request_block/ req_pkt
    record /reply_packet/ reply_pkt
    record /vms_header_block/ vmsentry
    record /oas_header_block/ oasheader integer*4 errcode, ERROR_RETURN, error_array(26), start_time(2), stop_time(2), old_headers, new_headers,
1           starting_sector, ending_sector, ioerr, UPDATE_STORAGE, access_code integer*4 OAS$_NO_CHANGE, DRV$_SUCCESS, OAS$_CHANGED, DRV$_INTERNAL_ERROR
    external OAS$_NO_CHANGE, DRV$_SUCCESS, OAS$_CHANGED, DRV$_INTERNAL_ERROR
    integer*4 vslength, oslength
    character vs_file*512, os_file*512 structure /address/
        union
            map
                integer*4 long
            end map
            map
                integer*2 low, high
            end map
        end union
    end structure record /address/ current, new_position character*(*) CRLF
    parameter (CRLF=char('0d'x)//char('0a'x))

ASSIGN 100 TO UPDATE_STORAGE
    ASSIGN 1000 TO ERROR_RETURN
```

```
        call sys$gettim (start_time)
        drvsts.activity = DRV$_CHANGE      ! activity = CHANGE
        drvsts.phase = 0                   ! phase 0 = initialization
        drvsts.file_request_id = req_pkt.oas_request_id
        errcode = %loc (DRV$_SUCCESS)

! get vms info, preload reply_pkt
        call get_vms_descriptor (req_pkt, reply_pkt, vmsentry, errcode)
        if (.not. errcode) RETURN drvsts.fid = vmsentry.fid
        drvsts.phase = 1

! read oas header in (and load it into an appropriate data structure)
        call get_oas_descriptor (req_pkt, reply_pkt, oasheader, vmsentry, old_headers, errcode)

if (.not. errcode) RETURN
        drvsts.phase = 2 if (btest (req_pkt.qualifier_flags, req$v_account)) oasheader.vms.account = req_pkt.account
        if (btest (req_pkt.qualifier_flags, req$v_username)) oasheader.vms.username = req_pkt.username
        if (btest (req_pkt.qualifier_flags, req$v_owner_uic)) oasheader.vms.owner = req_pkt.owner
        if (btest (req_pkt.qualifier_flags, req$v_protection)) oasheader.vms.protection = req_pkt.protection
        if (btest (req_pkt.qualifier_flags, req$v_description)) then
            vslength = oasheader.vms.name_length
            vs_file(1:vslength) = oasheader.heap(oasheader.vms.name:oasheader.vms.name+vslength-1)
            oslength = oasheader.oas.name_length
            os_file(1:oslength) = oasheader.heap(oasheader.oas.name:oasheader.oas.name+oslength-1)
            oasheader.vms.name = 1     ! for change, vms & oas name_length are remain the same
            oasheader.oas.name = vslength+1
            oasheader.oas.description_len = req_pkt.description_len
            if (req_pkt.description_len .gt. 0) then
                oasheader.heap(1:vslength+oslength+req_pkt.description_len)=vs_file(1:vslength) // os_file(1:oslength) //
     1          req_pkt.heap(req_pkt.description_pos:req_pkt.description_pos+req_pkt.description_len-1)
                oasheader.first_free = vslength+oslength+req_pkt.description_len+1
            else
                oasheader.oas.description_pos = vslength+oslength+1
                oasheader.heap(1:vslength+oslength) = vs_file(1:vslength) // os_file(1:oslength)
                oasheader.first_free = vslength+oslength+1
                oasheader.oas.description_pos = 0
            end if
        end if oasheader.oas.seq = oasheader.oas.seq+1
        ! repacking bumps storage.current_fid in memory (errcode is irrelevant)
        call repack_old_headers (oasheader, old_headers, new_headers, errcode)
        drvsts.phase = 3

! write out to magnetic disk
        write (indexu'oasheader.fid, err=300, iostat=ioerr) oasheader
        do i=1, max(new_headers, old_headers)-1
            if (i .lt. new_headers) buffer.sector(i).word(EXT$W_SEQ) = oasheader.oas.seq
            write (indexu'buffer.sector(i).long(EXT$L_FID), err=300, iostat=ioerr) buffer.sector(i)
        end do
        call flush_index (errcode)
        if (.not. errcode) then
            lmsg2 = len (CRLF // 'Error writing new optical headers')
            msg2(1:lmsg2) = CRLF // 'Error writing new optical headers'
            goto ERROR_RETURN
        end if
        drvsts.phase = 4

! write out optical headers
        starting_sector = storage.current_fid_addr+1
        call write_optical_log (req_pkt.oas_request_id, oasheader.array, 1, starting_sector, ending_sector, drvsts.status, errcode)
        if (.not. errcode) then
            lmsg2 = len (CRLF // 'Error writing new optical headers')
            msg2(1:lmsg2) = CRLF // 'Error writing new optical headers'
            goto UPDATE_STORAGE
        end if vmsentry.fid_addr = ending_sector if (max(new_headers,old_headers) .gt. 1) then
            starting_sector = ending_sector+1
            call write_optical_log (req_pkt.oas_request_id, buffer.word, max(new_headers,old_headers)-1,
     1          starting_sector, ending_sector, drvsts.status, errcode)
            if (.not. errcode) then
                lmsg2 = len (CRLF // 'Error writing new optical headers')
                msg2(1:lmsg2) = CRLF // 'Error writing new optical headers'
                goto UPDATE_STORAGE
            end if
        end if
        drvsts.phase = 5

! UPDATE_STORAGE: write storage structure to storage file
100     storage.current_fid_addr = max (ending_sector, storage.current_fid_addr) ! check for underflow....
```

```
storage.last_fid_addr = max (ending_sector, storage.last_fid_addr)
open (unit=25, file= strname(1:strlength), err=400, iostat=ioerr, status='old', access='direct', shared,
1       form='unformatted', recordtype='fixed', recordsize=128)
write (25'1, err=500, iostat=ioerr) storage
close (unit=25, err=600, iostat=ioerr)
if (.not. errcode) GOTO ERROR_RETURN        ! errcode was set by write_optical_log ! update vms entry
if (btest (req_pkt.qualifier_flags, req$v_description)) then
    call update_vms_header (req_pkt, reply_pkt, oasheader, vmsentry, errcode)
else
    call update_vms_header (req_pkt, reply_pkt, oasheader, vmsentry, errcode)
end if
if (.not. errcode) then
    lmsg2 = len (CRLF // 'Error modifying database file')
    msg2(1:lmsg2) = CRLF // 'Error modifying database file'
    goto ERROR_RETURN
end if
drvsts.phase = 6

! update stats
! call stats (reply_pkt)
! update accounting
call sys$gettim (stop_time)
access_code = 3 ! change
if (.not. (bitest (req_pkt.internal_flags, REQ$V_PUBLIC))) access_code = 9    ! private change
call accounting (req_pkt.username(1:12), req_pkt.owner, req_pkt.account(1:8), 'CHANGE', access_code, start_time, stop_time,
1   vmsentry.used_sectors, req_pkt.heap(req_pkt.vms_node_pos : req_pkt.vms_node_pos+req_pkt.vms_node_len-1) )

! update drvsts
drvsts.activity = 0
drvsts.phase = 0 errcode = %loc (OAS$_CHANGED)
reply_pkt.reply.status = errcode
call sys$getmsg (%val (errcode), lmsg2, msg2,,)
call sys$fao (%descr(msg2(1:lmsg2)), lmsg, msg, %val(olength), %ref (oas_file))
lmsg = min (REP$_HEAP_LENGTH-reply_pkt.reply.first_free+1, lmsg)
reply_pkt.reply.message_pos = reply_pkt.reply.first_free
reply_pkt.reply.message_len = lmsg
reply_pkt.reply.first_free = reply_pkt.reply.first_free + lmsg
reply_pkt.reply.heap (reply_pkt.reply.message_pos : reply_pkt.reply.first_free - 1) = msg(1:lmsg)
RETURN ! WRITE INDEX ERROR
300 call errsns (,,,,ioerr)
    call sys$getmsg (%val(ioerr), lmsg2, %descr(msg2), , )
    call error (%loc(DRV$_INTERNAL_ERROR), errcode, 0, 'CHANGE: error writing index file ' // indname(1:indlength)
1       //CRLF//msg2(1:lmsg2))
    GOTO ERROR_RETURN ! OPEN STORAGE ERROR
400 call errsns (,,,,ioerr)
    call sys$getmsg (%val(ioerr), lmsg1, %descr(msg1), , )
    call error (%loc (DRV$_INTERNAL_ERROR), errcode, 0, 'CHANGE: error opening storage file '
1       //strname(:strlength)//CRLF//msg1(1:lmsg1))
    if (.not. errcode) GOTO ERROR_RETURN    ! original failure was in writing optical log errcode = %loc (DRV$_INTERNAL_ERROR)
    lmsg2 = len (' Lost drive updating storage file')
    msg2 (1:lmsg2) = ' Lost drive updating storage file'
    GOTO ERROR_RETURN ! WRITE STORAGE ERROR
500 call errsns (,,,,ioerr)
    call sys$getmsg (%val(ioerr), lmsg1, %descr(msg1), , )
    call error (%loc (DRV$_INTERNAL_ERROR), errcode, 0, 'CHANGE: error writing storage file '
1       //strname(:strlength)//CRLF//msg1(1:lmsg1))
    if (.not. errcode) GOTO ERROR_RETURN    ! original failure was in writing optical log errcode = %loc (DRV$_INTERNAL_ERROR)
    lmsg2 = len (' Lost drive updating storage file')
    msg2 (1:lmsg2) = ' Lost drive updating storage file'
    close (unit=25, err=400, iostat=ioerr)
    GOTO ERROR_RETURN ! CLOSE STORAGE ERROR
600 call errsns (,,,,ioerr)
    call sys$getmsg (%val(ioerr), lmsg1, %descr(msg1), , )
    call error (%loc (DRV$_INTERNAL_ERROR), errcode, 0, 'CHANGE: error closing storage file '
1       //strname(:strlength)//CRLF//msg1(1:lmsg1))
    if (.not. errcode) GOTO ERROR_RETURN    ! original failure was in writing optical log errcode = %loc (DRV$_INTERNAL_ERROR)
    lmsg2 = len (' Lost drive updating storage file')
    msg2 (1:lmsg2) = ' Lost drive updating storage file'
    GOTO ERROR_RETURN
```

! ERROR_RETURN: package up error messages
1000  call sys$getmsg (%val (%loc (OAS$_NO_CHANGE)), lmsg1, msg1,,)
      call sys$fao (%descr(msg1(1:lmsg1)), lmsg, msg, %val (olength), %ref(oas_file))

reply_pkt.reply.status = %loc (OAS$_NO_CHANGE)
      errcode = %loc (OAS$_NO_CHANGE)

msg(lmsg+1:lmsg+lmsg2) = msg2(1:lmsg2)
      lmsg = lmsg+lmsg2 reply_pkt.reply.message_pos = reply_pkt.reply.first_free
      lmsg = min (lmsg, REP$_HEAP_LENGTH-reply_pkt.reply.first_free+1)
      reply_pkt.reply.message_len = lmsg
      reply_pkt.reply.first_free = reply_pkt.reply.first_free + lmsg
      reply_pkt.reply.heap(reply_pkt.reply.message_pos : reply_pkt.reply.first_free - 1) = msg (1:lmsg)
      RETURN end Copyright 1987, University of Wisconsin Physical Sciences Laboratory. This
software contains valuable and proprietary information and cannot be dis-
closed, copied or used by others without prior written permission.

--- create_vms_file.for
        creates vms output file for read/restore, returns a connected
        rab ready for io

--- subroutine create_vms_file (req_pkt, reply_pkt, vmsentry, oasheader, fab, rab, errcode)

implicit none include 'OAS_FILE_STRUCT: packet.inc'
      include 'OAS_FILE_STRUCT: oas_header.inc'
      include 'OAS_FILE_STRUCT: vms_header.inc'
      include 'OAS_FILE_STRUCT: file_names.inc'
      include 'OAS_FILE_STRUCT: data.inc'
      include 'OAS_FILE_STRUCT: xab_blocks.inc'
      include 'OAS_FILE_STRUCT: protection.inc'
      include 'OAS_FILE_STRUCT: rms_io_sync.inc' include '($FABDEF)'
      include '($RABDEF)'
      include '($NAMDEF)'
      include '($RMSDEF)'
      include '($SYSSRVNAM)' record /oas_request_block/ req_pkt
      record /reply_packet/ reply_pkt
      record /oas_header_block/ oasheader
      record /vms_header_block/ vmsentry
      record /fabdef/ fab
      record /rabdef/ rab
      record /namdef/ nam integer*4 errcode, long
      integer*2 word(2)
      byte    bytes(4)
      equivalence (long, word(1), bytes(1))
      integer*4 DRV$_SUCCESS, OAS$_NO_RESTORE, DRV$_USER_ERROR_TRACE, rms_io_completion
      external DRV$_SUCCESS, OAS$_NO_RESTORE, DRV$_USER_ERROR_TRACE, rms_io_completion
      character*255 fname character*(*) CRLF
      parameter (CRLF=char('0d'x)//char('0a'x))

fab.fab$b_bid = fab$c_bid
      fab.fab$b_bln = fab$c_bln
      fab.fab$l_alq = oasheader.vms.blocks
      fab.fab$b_bks = 0
      word(1) = ibset (ibset (0, fab$v_bio), fab$v_put)
      fab.fab$b_fac = bytes(1)
      fab.fab$l_fna = %loc (vms_file)
      fab.fab$b_fns = vlength
      fab.fab$l_fop = ibset (oasheader.vms.fop, fab$v_mxv)
      fab.fab$b_fsz = 0
      fab.fab$w_gbc = 0
      fab.fab$w_ifi = 0
      fab.fab$l_mrn = 0
      fab.fab$w_mrs = oasheader.vms.mrs
      fab.fab$l_nam = %loc (nam)
      fab.fab$b_org = oasheader.vms.org
      fab.fab$b_rat = oasheader.vms.rat
      fab.fab$b_rfm = oasheader.vms.rfm
      fab.fab$b_rtv = 0

```
word(1) = ibset (0, fab$v_nil)
fab.fab$b_shr = bytes(1)
fab.fab$b_fsz = oasheader.vms.fsz
fab.fab$l_xab = %loc (fhc)

fhc.xab.xab$b_cod = xab$c_fhc
fhc.xab.xab$b_bln = xab$c_fhclen
fhc.xab.xab$l_nxt = %loc (dat)
fhc.fhc.xab$w_lrl = oasheader.vms.lrl ! oasheader.vms.rfm  .or.  oasheader.vms.org
word(1) = 0
word(2) = 0
bytes(1) = oasheader.vms.rfm
bytes(3) = oasheader.vms.org
word (1) = iior (word(1), word(2))
fhc.fhc.xab$b_rfo = bytes(1)

fhc.fhc.xab$b_atr = oasheader.vms.rat
fhc.fhc.xab$b_hsz = oasheader.vms.fsz
fhc.fhc.xab$w_mrz = oasheader.vms.mrs
fhc.fhc.xab$l_ebk = oasheader.vms.blocks
fhc.fhc.xab$l_hbk = oasheader.vms.blocks dat.xab.xab$b_cod = xab$c_dat
dat.xab.xab$b_bln = xab$c_datlen
dat.xab.xab$l_nxt = %loc (rdt)
dat.dat.xab$q_cdt(1) = oasheader.vms.vms_cdt(1)
dat.dat.xab$q_cdt(2) = oasheader.vms.vms_cdt(2)

rdt.xab.xab$b_cod = xab$c_rdt
rdt.xab.xab$b_bln = xab$c_rdtlen
rdt.xab.xab$q_rdt(1) = oasheader.vms.vms_rdt(1)
rdt.xab.xab$q_rdt(2) = oasheader.vms.vms_rdt(2)
rdt.xab.xab$w_rvn = oasheader.vms.vms_rvn nam.nam$b_bid = NAM$C_BID
nam.nam$b_bln = NAM$C_BLN
nam.nam$b_name = fab.fab$b_fns
nam.nam$l_name = fab.fab$l_fna
nam.nam$w_did(1) = 0
nam.nam$w_did(2) = 0
nam.nam$w_did(3) = 0
nam.nam$t_dvi(1:16) = ' '
nam.nam$b_rss = 255
nam.nam$l_rsa = %loc (fname)
nam.nam$b_rsl = 0
nam.nam$l_esa = 0
nam.nam$b_ess = 0

! if protection or owner are explicitly requested, then an xabpro block is required. the 'default' value for
! protection is -1, the 'default' value for owner is 0
if (btest(req_pkt.qualifier_flags, REQ$V_PROTECTION) .or. btest(req_pkt.qualifier_flags, REQ$V_OWNER_UIC)) then
    pro1.xab.xab$b_cod = xab$c_pro
    pro1.xab.xab$b_bln = xab$c_prolen
    pro1.xab.xab$l_nxt = 0
    rdt.xab.xab$l_nxt = %loc (pro1)
    if (btest(req_pkt.qualifier_flags, REQ$V_OWNER_UIC)) then
        pro1.pro1.xab$l_uic = req_pkt.owner
    else
        pro1.pro1.xab$l_uic = 0
    end if
    if (btest(req_pkt.qualifier_flags, REQ$V_PROTECTION)) then
        pro1.pro1.xab$w_pro = req_pkt.protection
    else
        pro1.pro1.xab$w_pro = 'FFFF'x
    end if
else
    rdt.xab.xab$l_nxt = 0
end if
call sys$setdfprot (req_pkt.protection, )
errcode = sys$create (fab, , )
call sys$setdfprot (oas_protection, )

if (.not. errcode) then
    reply_pkt.reply.status = %loc (OAS$_NO_RESTORE)
    call sys$getmsg (%val(%loc (OAS$_NO_RESTORE)), lmsg2, msg2,,)
    call sys$fao (%descr(msg2(1:lmsg2)), lmsg1, msg1, %val (olength), %ref(oas_file))
    call sys$getmsg (%val(errcode), lmsg2, msg2,,)
    msg(1:lmsg1+lmsg2) = msg1(1:lmsg1) // msg2(1:lmsg2)
    lmsg = min (REP$_HEAP_LENGTH-reply_pkt.reply.first_free+1, lmsg1+lmsg2)
    reply_pkt.reply.message_pos = reply_pkt.reply.first_free
    reply_pkt.reply.message_len = lmsg
    reply_pkt.reply.first_free = reply_pkt.reply.first_free + lmsg
    reply_pkt.reply.heap (reply_pkt.reply.message_pos : reply_pkt.reply.first_free - 1) = msg(1:lmsg)
```

```
              ! after a bit of use, remove error call -- since only [sic] errors
              ! will be from users' bad name specifications.
              call error (%loc (DRV$_USER_ERROR_TRACE), errcode, 0,
     1            'CREATE_VMS_FILE  error creating vms file for restore '// ' ' // vms_file(1 : vlength) // CRLF // msg2(1:lmsg2))
              RETURN
          end if long = 0
          bytes(1) = nam.nam$b_rsl
          if (long .gt. 0) then
              vlength = long
              vms_file(1:vlength) = fname(1:vlength)
          end if rab.rab$l_fab = %loc (fab)
          rab.rab$b_bid = rab$c_bid
          rab.rab$b_bln = rab$c_bln
          rab.rab$w_isi = 0
          rab.rab$b_krf = 0
          rab.rab$b_mbc = BUFFER_BYTE_SIZE/512    ! blocks per buffer
          rab.rab$b_mbf = 2
          rab.rab$l_rop = ibset (ibset (0, rab$v_bio), rab$v_wbh)
          rab.rab$l_rop = ibset (0, rab$v_bio)
          rab.rab$l_rop = RAB$M_BIO + RAB$M_ASY errcode = sys$connect (rab, rms_io_completion, rms_io_completion)
          errcode = sys$waitfr (%val (rms_io_ef))

if (.not. errcode) then
              reply_pkt.reply.status = %loc (OAS$_NO_RESTORE)
              call sys$getmsg (%val(%loc (OAS$_NO_RESTORE)), lmsg2, msg2,,)
              call sys$fao (%descr(msg2(1:lmsg2)), lmsg1, msg1, %val (vlength), %ref(vms_file))
              call sys$getmsg (%val(errcode), lmsg2, msg2,,)
              msg(1:lmsg1+lmsg2) = msg1(1:lmsg1) // msg2(1:lmsg2)
              lmsg = min (REP$_HEAP_LENGTH-reply_pkt.reply.first_free+1, lmsg1+lmsg2)
              reply_pkt.reply.message_pos = reply_pkt.reply.first_free
              reply_pkt.reply.message_len = lmsg
              reply_pkt.reply.first_free = reply_pkt.reply.first_free + lmsg
              reply_pkt.reply.heap (reply_pkt.reply.message_pos : reply_pkt.reply.first_free - 1) = msg(1:lmsg)
              ! after a bit of use, remove error call -- since only [sic] errors
              ! will be from users' bad name specifications.
              call error (%loc (DRV$_USER_ERROR_TRACE), errcode, 0,
     1            'CREATE_VMS_FILE  error connecting to vms file for restore '
     1            // ' ' // vms_file(1 : vlength) // CRLF // msg2(1:lmsg2))
              RETURN
          end if errcode = %loc (DRV$_SUCCESS)
          return
          end
```

Copyright 1987, University of Wisconsin Physical Sciences Laboratory. This software contains valuable and proprietary information and cannot be disclosed, copied or used by others without prior written permission.

--- delete_vms_header
     remove vmsheader entry from the database directory

---

```
          subroutine delete_vms_header (req_pkt, reply_pkt, vmsentry, errcode)

implicit none include 'OAS_FILE_STRUCT: packet.inc'
          include 'OAS_FILE_STRUCT: vms_header.inc'
          include 'OAS_FILE_STRUCT: file_names.inc'
          include 'OAS_FILE_STRUCT: storage_names.inc' record /oas_request_block/ req_pkt
          record /reply_packet/ reply_pkt
          record /vms_header_block/ vmsentry integer*4 errcode, i, DRV$_SUCCESS, DRV$_INTERNAL_ERROR, OAS$_NO_ARCHIVE, lib$delete_file
          external DRV$_SUCCESS, DRV$_INTERNAL_ERROR, OAS$_NO_ARCHIVE, lib$delete_file character*(*) CRLF
          parameter (CRLF=char('0d'x)//char('0a'x))

! call lib$delete_file to delete file represented by oas_file
          errcode = lib$delete_file (oas_file(1:olength),,,,,,,,)
          if (.not. errcode) then
              call sys$getmsg (%val(errcode), lmsg1, %descr(msg1), , )
              call error (%loc(DRV$_INTERNAL_ERROR), errcode, 0,
     1            'DELETE_VMS_HEADER err   deleting vms db file '
```

```
1         //oas_file (1:olength)//CRLF// msg1(1:lmsg1))
    lmsg2 = len (' DELETE_VMS_HEADER: error deleting vms db file ')
    msg2(1:lmsg2) = ' DELETE_VMS_HEADER: error deleting vms db file '
    goto 400
end if errcode = %loc (DRV$_SUCCESS)
return ! ERROR EXIT
400  call error (%loc(DRV$_INTERNAL_ERROR), errcode, 0, msg2(1:lmsg2))
    reply_pkt.reply.status = %loc (OAS$_NO_ARCHIVE)
    errcode = %loc (OAS$_NO_ARCHIVE)
    if (reply_pkt.reply.message_pos .eq. 0) then     ! (don't clobber existing error message — this is ancillary)
        call sys$getmsg (%val(errcode), lmsg, %descr(msg), , )
        call sys$fao (%descr(msg(1:lmsg)), lmsg1, msg, %val (vlength), %ref(vms_file))
        msg(1:lmsg1+lmsg2) = msg(1:lmsg1) // msg2(1:lmsg2)
        lmsg = min (lmsg1+lmsg2, REP$_HEAP_LENGTH - reply_pkt.reply.first_free + 1)
        reply_pkt.reply.message_pos = reply_pkt.reply.first_free
        reply_pkt.reply.message_len = lmsg
        reply_pkt.reply.first_free = reply_pkt.reply.first_free + lmsg
        reply_pkt.reply.heap (reply_pkt.reply.message_pos : reply_pkt.reply.first_free - 1) = msg (1:lmsg)
    end if
    return end Copyright 1987, University of Wisconsin Physical Sciences Laboratory. This
software contains valuable and proprietary information and cannot be dis-
closed, copied or used by others without prior written permission.
```

---

```
get_oas_descriptor
         simply reads in oasheader — later, should read and parse
         header into appropriate data structure (fab's and rab's?)

loads bad sector list from oas header(s). note: leaves 'buffer'
    loaded with extension headers
```

---

```
    subroutine get_oas_descriptor (req_pkt, reply_pkt, oasheader, vmsentry, num_headers, errcode)

implicit none include 'OAS_FILE_STRUCT: packet.inc'
    include 'OAS_FILE_STRUCT: vms_header.inc'
    include 'OAS_FILE_STRUCT: oas_header.inc'
    include 'OAS_FILE_STRUCT: strmap.inc'
    include 'OAS_FILE_STRUCT: storage_names.inc'
    include 'OAS_FILE_STRUCT: file_names.inc'
    include 'OAS_FILE_STRUCT: bad_sector_list.inc'
    include 'OAS_FILE_STRUCT: data.inc' record /oas_request_block/ req_pkt
    record /reply_packet/ reply_pkt
    record /vms_header_block/ vmsentry
    record /oas_header_block/ oasheader integer*4 errcode, ioerr, extension_fid, i, count, start, first_header, num_headers, k, fail_code
    integer*4 DRV$_SUCCESS, OAS$_NO_RESTORE, OAS$_NO_CHANGE, OAS$_NO_RENAME, OAS$_NO_RETIRE, DRV$_INTERNAL_ERROR
    external DRV$_SUCCESS, OAS$_NO_RESTORE, OAS$_NO_CHANGE, OAS$_NO_RENAME, OAS$_NO_RETIRE, DRV$_INTERNAL_ERROR character*(*) CRLF
    parameter (CRLF=char('0d'x)//char('0a'x))

if (req_pkt.request_code .eq. REQ$_RESTORE) then
        fail_code = %loc (OAS$_NO_RESTORE)
    else if (req_pkt.request_code .eq. REQ$_CHANGE) then
        fail_code = %loc (OAS$_NO_CHANGE)
    else if (req_pkt.request_code .eq. REQ$_RENAME) then
        fail_code = %loc (OAS$_NO_RENAME)
    else     ! if (req_pkt.request_code .eq. REQ$_RETIRE) then
        fail_code = %loc (OAS$_NO_RETIRE)
    end if ! fid should be within range, o.w. the database is corrupted, so recover after read....

read (index='vmsentry.fid, err=100, iostat=ioerr) oasheader.array
    ! match serial number and used sectors from vmsentry against oasheader
    ! if more information were stored in vmsentry, then more could be matched .... (future enhancement)
    if ( ( vmsentry.heap(vmsentry.serial_pos:vmsentry.serial_pos+vmsentry.serial_len-1) .ne.
1        serial_string(:serial_length) ) .or. (oasheader.oas_used_sectors .ne. vmsentry.used_sectors)) then
        errcode = %loc(DRV$_INTERNAL_ERROR)
        call error (errcode, errcode, 0, 'GET_OAS_DESCRP mismatch in header for ' // oas_file(1:olength) )
        goto 150
    end if
    num_headers = 1
    errcode = %loc (DRV$_SUCCESS)
```

```
! load up bad_sector_list from oas header -- limit exposure to extension header complexities
bad_sector_count = oasheader.oas.bad_sector_count
count = 0
do i = oasheader.oas.bad_sector_list, min (OAS_HEADER_LONG_LENGTH, oasheader.oas.bad_sector_list+bad_sector_count-1)
    count = count+1
    bad_sector_list(count) = oasheader.long_array(i)
end do extension_fid = oasheader.oas.extension_fid
if (extension_fid .eq. 0) RETURN        ! an avoid thinking about extension headers ! now, roll up your sleeves:
!   first -- read in all extension headers into buffer.header(x)
!   second -- rip through these headers loading up the bad_sector_list
!   (shudder at the thought that descriptions could intermingle with bad sector lists...)
!   finally -- discretely leave the buffer loaded with extension headers so that change, rename, and
!       retire can easily manipulate them (actually, only retire will need them)
num_headers = 1
do while (extension_fid .ne. 0)
    read (indexu'extension_fid, err=100, iostat=ioerr) buffer.header(num_headers)
    extension_fid = buffer.header(num_headers).extension_fid
    num_headers = num_headers+1         ! trick!!! -- num_headers is actually one more than those read in this loop
end do if (count .ge. bad_sector_count) RETURN         ! something else is filling up those extensions....
if (oasheader.oas.bad_sector_list .le. OAS_HEADER_LONG_LENGTH) then
    start = EXTENSION_HDR_STORAGE_OFFSET
    first_header = 1
else
    first_header = oasheader.oas.bad_sector_list/OAS_HEADER_LONG_LENGTH
    start = mod (oasheader.oas.bad_sector_list, OAS_HEADER_LONG_LENGTH) + 1
end if do k = first_header, num_headers
    do i = start, min (OAS_HEADER_LONG_LENGTH, start + (bad_sector_count - count) - 1)
        count = count+1
        bad_sector_list (count) = buffer.header(k).long_array (i)
    end do
    start = EXTENSION_HDR_STORAGE_OFFSET
end do errcode = %loc (DRV$_SUCCESS)
return 100 call errsns (,,,,ioerr)
    call sys$getmsg (%val(ioerr), lmsg1, %descr(msg1), , )
    call error (%loc(DRV$_INTERNAL_ERROR), errcode, 0, 'GET_OAS_DESCRP error reading index ' //oas_file(1:olength)
1       //CRLF//msg1(1:lmsg1))

150 reply_pkt.reply.status = fail_code
    errcode = fail_code
    call sys$getmsg (%val (fail_code), lmsg2, msg2,,)
    call sys$fao (%descr(msg2(1:lmsg2)), lmsg1, msg1, %val (olength), %ref(oas_file))
    lmsg2 = len (' Error reading optical index file header ')
    msg2(1:lmsg2) = ' Error reading optical index file header '
    msg1(1:lmsg1+lmsg2) = msg1(1:lmsg1) // msg2(1:lmsg2)
    lmsg = min (lmsg1+lmsg2, REP$_HEAP_LENGTH - reply_pkt.reply.first_free + 1)
    reply_pkt.reply.message_pos = reply_pkt.reply.first_free
    reply_pkt.reply.message_len = lmsg
    reply_pkt.reply.first_free = reply_pkt.reply.first_free + lmsg
    reply_pkt.reply.heap (reply_pkt.reply.message_pos : reply_pkt.reply.first_free - 1) = msg (1:lmsg)
RETURN end Copyright 1987, University of Wisconsin Physical Sciences Laboratory. This
software contains valuable and proprietary information and cannot be dis-
closed, copied or used by others without prior written permission.
```

---

```
get_vms_descriptor.for
        load up reply packet
        load vmsentry with info from vms db
```

---

```
subroutine get_vms_descriptor (req_pkt, reply_pkt, vmsentry, errcode)

implicit none
integer*4 i, j, k include 'OAS_FILE_STRUCT: packet.inc'
include 'OAS_FILE_STRUCT: vms_header.inc'
include 'OAS_FILE_STRUCT: drvsts.inc'
include 'OAS_FILE_STRUCT: storage_names.inc'
include 'OAS_FILE_STRUCT: file_names.inc'
```

```
record /oas_request_block/ req_pkt
record /reply_packet/ reply_pkt
record /vms_header_block/ vmsentry integer*4 errcode, ioerr, fail_code, serial_number, error_array(10), flags
integer*2 length
integer*4 DRV$_SUCCESS, OAS$_NO_RESTORE, OAS$_NO_CHANGE, OAS$_NO_RENAME, OAS$_NO_RETIRE, DRV$_INTERNAL_ERROR,
1       DRV$_WRONG_PLATTER
external DRV$_SUCCESS, OAS$_NO_RESTORE, OAS$_NO_CHANGE, OAS$_NO_RENAME, OAS$_NO_RETIRE, DRV$_INTERNAL_ERROR,
1       DRV$_WRONG_PLATTER character*(*) CRLF
parameter (CRLF=char('0d'x)//char('0a'x))

if (req_pkt.request_code .eq. REQ$_RESTORE) then
    fail_code = %loc (OAS$_NO_RESTORE)
else if (req_pkt.request_code .eq. REQ$_CHANGE) then
    fail_code = %loc (OAS$_NO_CHANGE)
else if (req_pkt.request_code .eq. REQ$_RENAME) then
    fail_code = %loc (OAS$_NO_RENAME)
else    T if (req_pkt.request_code .eq. REQ$_RETIRE) then
    fail_code = %loc (OAS$_NO_RETIRE)
end if vmsentry.first_free = 1

! open read-only vms-db-file
open (unit=55, err=100, iostat=ioerr, file=oas_file(1:olength), defaultfile='.;',
1       READONLY, access='SEQUENTIAL', carriagecontrol = 'LIST', form='FORMATTED',
1       recordtype='VARIABLE', SHARED, status='OLD')

! read vmsentry record from vms-db-file
read (unit=55, err=200, iostat=ioerr, fmt='(q, a)') vmsentry.serial_len, msg1
if (vmsentry.serial_len .gt. 0) then
    vmsentry.serial_pos = vmsentry.first_free
    vmsentry.first_free = vmsentry.first_free + vmsentry.serial_len
    vmsentry.heap (vmsentry.serial_pos : vmsentry.first_free-1) = msg1(1:vmsentry.serial_len)
end if read (unit=55, err=200, iostat=ioerr, fmt='(4x, z8.8, 11x, z8.8)') vmsentry.fid, vmsentry.fid_addr
read (unit=55, err=200, iostat=ioerr, fmt='(i10.10)') vmsentry.used_sectors
vmsentry.used_sectors = vmsentry.used_sectors/2 msg1=' '
inquire (unit=55, name=msg1)
call str$trim (msg2, msg1, length)
if (length .gt. 0) then
    olength = length
    oas_file(1:olength) = msg2(1:olength)
end if ! close vms-db-file
close (unit=55, err=300, iostat=ioerr)

if (vmsentry.serial_len .le. 0) goto 400 read (vmsentry.heap(vmsentry.serial_pos : vmsentry.serial_pos+vmsentry.serial_len-1),
1    '(z)', err=400, iostat=ioerr) serial_number if (serial_number .ne. drvsts.cid) then         ! load a filer packet with the requested platter information
    reply_pkt.filer.packet_code = FILER$_PLATTER
    reply_pkt.filer.packet_length = FILER$_PLATTER_LENGTH
    reply_pkt.filer.status = FILER$_NEW_PLATTER reply_pkt.filer.seriallen = min (FILER$_MAX_SERIAL_STRING, vmsentry.serial_len)
    reply_pkt.filer.serial = vmsentry.heap (vmsentry.serial_pos :
1       vmsentry.serial_pos + reply_pkt.filer.seriallen - 1)

call get_platter_slot_info (serial_number, msg(1:lmsg), reply_pkt.filer.slot_number, flags, errcode)
    reply_pkt.filer.platterlen = min (FILER$_MAX_PLATTER_STRING, lmsg)
    reply_pkt.filer.platter = msg (1 : reply_pkt.filer.platterlen)

errcode = %loc (DRV$_WRONG_PLATTER)
    error_array(1) = zext (reply_pkt.filer.slot_number)
    error_array(2) = zext (vmsentry.serial_len)
    msg1 (1 : vmsentry.serial_len) = vmsentry.heap (vmsentry.serial_pos : vmsentry.serial_pos + vmsentry.serial_len - 1)
    error_array(3) = %loc (msg1)
    error_array(4) = zext (reply_pkt.filer.platterlen)
    msg2 (1 : reply_pkt.filer.platterlen) = reply_pkt.filer.platter (1 : reply_pkt.filer.platterlen)
    error_array(5) = %loc (msg2)
    error_array(6) = zext (slot)
    error_array(7) = zext (serial_length)
    error_array(8) = %loc (serial_string)
    error_array(9) = zext (platter_length)
    error_array(10) = %loc (platter_string)
    call error (errcode, error_array, 10, ' Get_vms_descriptor: ')
    RETURN
end if
```

```
             errcode = %loc (DRV$_SUCCESS)
             return

! OPEN_ERROR
     100     reply_pkt.reply.status = fail_code
             errcode = fail_code call errsns (,,,,ioerr)
             call sys$getmsg (%val(ioerr), lmsg1, %descr(msg1), , )
             call error (%loc(DRV$_INTERNAL_ERROR), errcode, 0, 'GET_VMS_DESCRP error opening vms-db file ' // oas_file(1:olength)
         1         //CRLF//msg1(1:lmsg1))

call sys$getmsg (%val (fail_code), lmsg2, msg2,,)
             call sys$fao (%descr(msg2(1:lmsg2)), lmsg1, msg1, %val (olength), %ref(oas_file))
             lmsg2 = len (' Error finding oas file header ')
             msg2 (1:lmsg2) = ' Error finding oas file header '
             msg(1:lmsg1+lmsg2) = msg1(1:lmsg1) // msg2(1:lmsg2)
             lmsg = min (lmsg1+lmsg2, REP$_HEAP_LENGTH - reply_pkt.reply.first_free + 1)
             reply_pkt.reply.message_pos = reply_pkt.reply.first_free
             reply_pkt.reply.message_len = lmsg
             reply_pkt.reply.first_free = reply_pkt.reply.first_free + lmsg
             reply_pkt.reply.heap (reply_pkt.reply.message_pos : reply_pkt.reply.first_free - 1) = msg (1:lmsg)
             RETURN ! READ_ERROR
     200     reply_pkt.reply.status = fail_code
             errcode = fail_code call errsns (,,,,ioerr)
             call sys$getmsg (%val(ioerr), lmsg1, %descr(msg1), , )
             call error (%loc(DRV$_INTERNAL_ERROR), errcode, 0, 'GET_VMS_DESCRP error reading vms-db file ' //oas_file(1:olength)
         1         //CRLF//msg1(1:lmsg1))

call sys$getmsg (%val (fail_code), lmsg2, msg2,,)
             call sys$fao (%descr(msg2(1:lmsg2)), lmsg1, msg1, %val (olength), %ref(oas_file))
             lmsg2 = len (' Error reading oas file header ')
             msg2 (1:lmsg2) = ' Error reading oas file header '
             msg(1:lmsg1+lmsg2) = msg1(1:lmsg1) // msg2(1:lmsg2)
             lmsg = min (lmsg1+lmsg2, REP$_HEAP_LENGTH - reply_pkt.reply.first_free + 1)
             reply_pkt.reply.message_pos = reply_pkt.reply.first_free
             reply_pkt.reply.message_len = lmsg
             reply_pkt.reply.first_free = reply_pkt.reply.first_free + lmsg
             reply_pkt.reply.heap (reply_pkt.reply.message_pos : reply_pkt.reply.first_free - 1) = msg (1:lmsg)
             close (unit=55, err=300, iostat=ioerr)
             RETURN ! CLOSE_ERROR
     300     reply_pkt.reply.status = fail_code
             errcode = fail_code call errsns (,,,,ioerr)
             call sys$getmsg (%val(ioerr), lmsg1, %descr(msg1), , )
             call error (%loc(DRV$_INTERNAL_ERROR), errcode, 0, 'GET_VMS_DESCRP error closing vms-db file ' // oas_file(1:olength)
         1         //CRLF//msg1(1:lmsg1))

call sys$getmsg (%val (fail_code), lmsg2, msg2,,)
             call sys$fao (%descr(msg2(1:lmsg2)), lmsg1, msg1, %val (olength), %ref(oas_file))
             lmsg2 = len (' Error closing oas file header ')
             msg2 (1:lmsg2) = ' Error closing oas file header '
             msg(1:lmsg1+lmsg2) = msg1(1:lmsg1) // msg2(1:lmsg2)
             lmsg = min (lmsg1+lmsg2, REP$_HEAP_LENGTH - reply_pkt.reply.first_free + 1)
             reply_pkt.reply.message_pos = reply_pkt.reply.first_free
             reply_pkt.reply.message_len = lmsg
             reply_pkt.reply.first_free = reply_pkt.reply.first_free + lmsg
             reply_pkt.reply.heap (reply_pkt.reply.message_pos : reply_pkt.reply.first_free - 1) = msg (1:lmsg)
             RETURN ! invalid serial number
     400     reply_pkt.reply.status = fail_code
             errcode = fail_code
             call error (%loc(DRV$_INTERNAL_ERROR), errcode, 0, 'GET_VMS_DESCRP error reading vms-db file serial number '
         1         // oas_file(1:olength) )
             call sys$getmsg (%val (fail_code), lmsg2, msg2,,)
             call sys$fao (%descr(msg2(1:lmsg2)), lmsg1, msg1, %val (olength), %ref(oas_file))
             lmsg2 = len (' Error reading oas file header ')
             msg2 (1:lmsg2) = ' Error reading oas file header '
             msg(1:lmsg1+lmsg2) = msg1(1:lmsg1) // msg2(1:lmsg2)
             lmsg = min (lmsg1+lmsg2, REP$_HEAP_LENGTH - reply_pkt.reply.first_free + 1)
             reply_pkt.reply.message_pos = reply_pkt.reply.first_free
             reply_pkt.reply.message_len = lmsg
             reply_pkt.reply.first_free = reply_pkt.reply.first_free + lmsg
             reply_pkt.reply.heap (reply_pkt.reply.message_pos : reply_pkt.reply.first_free - 1) = msg (1:lmsg)
             RETURN end
```

Copyright 1987, University of Wisconsin Physical Sciences Laboratory. This
software contains valuable and proprietary information and cannot be dis-
closed, copied or used by others without prior written permission.

---

```
rename.for -- uses request packet to:
        1) extract vms database entry  (for fid)
        2) read oas_header
        3) rewrite oas_header
        4) rename actual database files
returns finishing information in reply packet recovery points:
        1) after writing magnetic headers -- recover by selectively rebuilding magnetic index
        2) during write of optical logs -- recover by retry
                (both of these are best implemented by hand)

problems:
        1) preserving/returning version information in rename (explicit version information passed?)
           race condition between two users, same directory
        2) guaranteeing subdirectory creation as appropriate
```

---

```
        subroutine rename (req_pkt, reply_pkt, errcode)

implicit none
        integer*4 i, j, k include 'OAS_FILE_STRUCT: packet.inc'
        include 'OAS_FILE_STRUCT: drvsts.inc'
        include 'OAS_FILE_STRUCT: strmap.inc'
        include 'OAS_FILE_STRUCT: vms_header.inc'
        include 'OAS_FILE_STRUCT: oas_header.inc'
        include 'OAS_FILE_STRUCT: data.inc'
        include 'OAS_FILE_STRUCT: file_names.inc'
        include 'OAS_FILE_STRUCT: storage_names.inc' include '($ARMDEF)' record /oas_request_block/ req_pkt
        record /reply_packet/ reply_pkt
        record /vms_header_block/ vmsentry
        record /oas_header_block/ oasheader integer*4 errcode, ERROR_RETURN, error_array(26), start_time(2), stop_time(2), old_headers, new_headers,
     1       starting_sector, ending_sector, ioerr, UPDATE_STORAGE, access_code integer*4 OAS$_NO_RENAME, DRV$_SUCCESS, OAS$_RENAMED, DRV$_INTERNAL_ERROR, str$position
        external  OAS$_NO_RENAME, DRV$_SUCCESS, OAS$_RENAMED, DRV$_INTERNAL_ERROR, str$position
        integer*4 vslength, oslength
        character vs_file*512, os_file*512 structure /address/
            union
                map
                    integer*4 long
                end map
                map
                    integer*2 low, high
                end map
            end union
        end structure record /address/ current, new_position character*(*) CRLF
        parameter (CRLF=char('0d'x)//char('0a'x))

ASSIGN 100 TO UPDATE_STORAGE
        ASSIGN 1000 TO ERROR_RETURN call sys$gettim (start_time)
        drvsts.activity = DRV$_RENAME    ! activity = RENAME
        drvsts.phase = 0                 ! phase 0 = initialization
        drvsts.file_request_id = req_pkt.oas_request_id
        errcode = %loc (DRV$_SUCCESS)

! get vms info, preload reply_pkt
        call get_vms_descriptor (req_pkt, reply_pkt, vmsentry, errcode)
        if (.not. errcode) RETURN
        drvsts.fid = vmsentry.fid
        drvsts.phase = 1

! read oas header in (and load it into an appropriate data structure)
        call get_oas_descriptor (req_p   reply_pkt, oasheader, vmsentry, old_headers, errcode)
        if (.not. errcode) RETURN
        drvsts.phase = 2
```

```
! perform actual rename of files
call rename_file (oas_file, olength, vms_file, vlength, errcode) ! vms_file should be updated to new version
if (.not. errcode) then
    lmsg2 = len (CRLF // 'Error renaming database file')
    msg2(1:lmsg2) = CRLF // 'Error renaming database file'
    goto ERROR_RETURN
end if ! save source file name:
vslength = oasheader.vms.name_length
vs_file(1:vslength) = oasheader.heap(oasheader.vms.name:oasheader.vms.name+vslength-1)

! check qualifier flags
if (btest (req_pkt.qualifier_flags, req$v_account)) oasheader.vms.account = req_pkt.account
if (btest (req_pkt.qualifier_flags, req$v_username)) oasheader.vms.username = req_pkt.username
if (btest (req_pkt.qualifier_flags, req$v_owner_uic)) oasheader.vms.owner = req_pkt.owner
if (btest (req_pkt.qualifier_flags, req$v_protection)) oasheader.vms.protection = req_pkt.protection
oasheader.first_free = 1
if (btest (req_pkt.qualifier_flags, req$v_description)) then
    if (req_pkt.description_len .gt. 0) then
        oasheader.heap(1:req_pkt.description_len) =
1           req_pkt.heap(req_pkt.description_pos:req_pkt.description_pos+req_pkt.description_len-1)
        oasheader.first_free = req_pkt.description_len+1
        oasheader.oas.description_pos = 1
        oasheader.oas.description_len = req_pkt.description_len
    else
        oasheader.oas.description_pos = 0
        oasheader.oas.description_len = 0
    end if
else if ((oasheader.oas.description_len .gt. 0) .and. (oasheader.oas.description_pos .gt. 1)) then
    oasheader.heap(1:oasheader.oas.description_len) = oasheader.heap (oasheader.oas.description_pos :
1       oasheader.oas.description_pos+oasheader.oas.description_len-1)
    oasheader.oas.description_pos = 1
    oasheader.first_free = oasheader.oas.description_len + 1
else    ! either it's still 1, or unchanged
    oasheader.first_free = oasheader.oas.description_len + 1
end if ! replace file names in oasheader
i = str$position (vms_file(1:vlength), '[', 1)
if ((i .le. 0) .or. (i .ge. vlength)) i = 1
oslength = vlength - i + 1
os_file (1:oslength) = vms_file (i : vlength)

oasheader.vms.name = oasheader.first_free
oasheader.oas.name = oasheader.first_free + vslength
oasheader.first_free = oasheader.first_free + vslength + oslength
oasheader.heap (oasheader.vms.name:oasheader.first_free-1) = vs_file(1:vslength) // os_file(1:oslength)

oasheader.oas.seq = oasheader.oas.seq+1
! repacking bumps storage.current_fid in memory (errcode is irrelevant)
call repack_old_headers (oasheader, old_headers, new_headers, errcode)
drvsts.phase = 3

! write out to magnetic disk
write (indexu'oasheader.fid, err=300, iostat=ioerr) oasheader
do i=1, max(new_headers, old_headers)-1
    if (i .lt. new_headers) buffer.sector(i).word(EXT$W_SEQ) = oasheader.oas.seq
    write (indexu'buffer.sector(i).long(EXT$L_FID), err=300, iostat=ioerr) buffer.sector(i)
end do
call flush_index (errcode)
if (.not. errcode) then
    lmsg2 = len (CRLF // 'Error writing new optical headers')
    msg2(1:lmsg2) = CRLF // 'Error writing new optical headers'
    goto ERROR_RETURN
end if
drvsts.phase = 4

! write out optical headers
starting_sector = storage.current_fid_addr+1
call write_optical_log (req_pkt.oas_request_id, oasheader.array, 1, starting_sector, ending_sector, drvsts.status, errcode)
if (.not. errcode) then
    lmsg2 = len (CRLF // 'Error writing new optical headers')
    msg2(1:lmsg2) = CRLF // 'Error writing new optical headers'
    goto UPDATE_STORAGE
end if vmsentry.fid_addr = ending_sector if (max(new_headers,old_headers) .gt. 1) then
    starting_sector = ending_sector+1
    call write_optical_log (req_pkt.oas_request_id, buffer.word, max(new_headers,old_headers)-1,
1       starting_sector, ending_sector, drvsts.status, errcode)
    if (.not. errcode) then
        lmsg2 = len (CRLF // 'Error writing new optical headers')
```

```
            msg2(1:lmsg2) = CRLF // 'Error writing new optical headers'
            goto UPDATE_STORAGE
         end if
      end if
      drvsts.phase = 5

! UPDATE_STORAGE: write storage structure to storage file
100   storage.current_fid_addr = max (ending_sector, storage.current_fid_addr) ! check for underflow....
      storage.last_fid_addr = max (ending_sector, storage.last_fid_addr)
      open (unit=25, file= strname(1:strlength), err=400, iostat=ioerr, status='old', access='direct', shared,
     1      form='unformatted', recordtype='fixed', recordsize=128)
      write (25'1, err=500, iostat=ioerr) storage
      close (unit=25, err=600, iostat=ioerr)
      if (.not. errcode) GOTO ERROR_RETURN      ! errcode was set by write_optical_log ! update vms entry
      call update_vms_header (req_pkt, reply_pkt, oasheader, vmsentry, errcode)
      if (.not. errcode) then
          lmsg2 = len (CRLF // 'Error modifying database file')
          msg2(1:lmsg2) = CRLF // 'Error modifying database file'
          goto ERROR_RETURN
      end if
      drvsts.phase = 6

! update stats
      ! call stats (reply_pkt)
      ! update accounting
      call sys$gettim (stop_time)
      access_code = 4 ! rename
      if (.not. (bitest (req_pkt.internal_flags, REQ$V_PUBLIC))) access_code = 10   ! private rename
      call accounting (req_pkt.username(1:12), req_pkt.owner, req_pkt.account(1:8), 'RENAME', access_code, start_time, stop_time,
     1   vmsentry.used_sectors, req_pkt.heap(req_pkt.vms_node_pos : req_pkt.vms_node_pos+req_pkt.vms_node_len-1) )

! update drvsts
      drvsts.activity = 0
      drvsts.phase = 0 errcode = %loc (OAS$_RENAMED)
      reply_pkt.reply.status = errcode
      call sys$getmsg (%val (errcode), lmsg2, msg2,,)
      call sys$fao (%descr(msg2(1:lmsg2)), lmsg, msg, %val(olength), %ref (oas_file), %val(vlength), %ref (vms_file))
      lmsg = min (REP$_HEAP_LENGTH-reply_pkt.reply.first_free+1, lmsg)
      reply_pkt.reply.message_pos = reply_pkt.reply.first_free
      reply_pkt.reply.message_len = lmsg
      reply_pkt.reply.first_free = reply_pkt.reply.first_free + lmsg
      reply_pkt.reply.heap (reply_pkt.reply.message_pos : reply_pkt.reply.first_free - 1) = msg(1:lmsg)
      RETURN ! WRITE INDEX ERROR
300   call errsns (,,,,ioerr)
      call sys$getmsg (%val(ioerr), lmsg2, %descr(msg2), , )
      call error (%loc(DRV$_INTERNAL_ERROR), errcode, 0, 'RENAME: error writing index file ' // indname(1:indlength)
     1      //CRLF//msg2(1:lmsg2))
      GOTO ERROR_RETURN ! OPEN STORAGE ERROR
400   call errsns (,,,,ioerr)
      call sys$getmsg (%val(ioerr), lmsg1, %descr(msg1), , )
      call error (%loc (DRV$_INTERNAL_ERROR), errcode, 0, 'RENAME: error opening storage file '
     1      //strname(:strlength)//CRLF//msg1(1:lmsg1))
      if (.not. errcode) GOTO ERROR_RETURN      ! original failure was in writing optical log errcode = %loc (DRV$_INTERNAL_ERROR)
      lmsg2 = len (' Lost drive updating storage file')
      msg2 (1:lmsg2) = ' Lost drive updating storage file'
      GOTO ERROR_RETURN ! WRITE STORAGE ERROR
500   call errsns (,,,,ioerr)
      call sys$getmsg (%val(ioerr), lmsg1, %descr(msg1), , )
      call error (%loc (DRV$_INTERNAL_ERROR), errcode, 0, 'RENAME: error writing storage file '
     1      //strname(:strlength)//CRLF//msg1(1:lmsg1))
      if (.not. errcode) GOTO ERROR_RETURN      ! original failure was in writing optical log errcode = %loc (DRV$_INTERNAL_ERROR)
      lmsg2 = len (' Lost drive updating storage file')
      msg2 (1:lmsg2) = ' Lost drive updating storage file'
      close (unit=25, err=400, iostat=ioerr)
      GOTO ERROR_RETURN ! CLOSE STORAGE ERROR
600   call errsns (,,,,ioerr)
      call sys$getmsg (%val(ioerr), lmsg1, %descr(msg1), , )
```

```
        call error (%loc (DRV$_INTERNAL_ERROR), errcode, 0, 'RENAME: error closing storage file '
   1       //strname(:strlength)//CRLF//msg1(1:lmsg1))
        if (.not. errcode) GOTO ERROR_RETURN    ! original failure was in writing optical log errcode = %loc (DRV$_INTERNAL_ERROR)
        lmsg2 = len (' Lost drive updating storage file')
        msg2 (1:lmsg2) = ' Lost drive updating storage file'
        GOTO ERROR_RETURN ! ERROR_RETURN: package up error messages
1000    call sys$getmsg (%val (%loc (OAS$_NO_RENAME)), lmsg1, msg1,,)
        call sys$fao (%descr(msg1(1:lmsg1)), lmsg, msg, %val (olength), %ref(oas_file))

reply_pkt.reply.status = %loc (OAS$_NO_RENAME)
        errcode = %loc (OAS$_NO_RENAME)

msg(lmsg+1:lmsg+lmsg2) = msg2(1:lmsg2)
        lmsg = lmsg+lmsg2 reply_pkt.reply.message_pos = reply_pkt.reply.first_free
        lmsg = min (lmsg, REP$_HEAP_LENGTH-reply_pkt.reply.first_free+1)
        reply_pkt.reply.message_len = lmsg
        reply_pkt.reply.first_free = reply_pkt.reply.first_free + lmsg
        reply_pkt.reply.heap(reply_pkt.reply.message_pos : reply_pkt.reply.first_free - 1) = msg (1:lmsg)
        RETURN end
```

--- rename_file: renames oas_file to vms_file and returns errcode appropriately set. oas_file and vms_file are contained in the common block defined by OAS_FILE_STRUCT: file_names.inc

```
        subroutine rename_file (oldfile, olength, newfile, nlength, errcode)

implicit none include '($FABDEF)'
        include '($NAMDEF)'
        include '($SYSSRVNAM)' integer*4 errcode, olength, nlength, lmsg, DRV$_SUCCESS, DRV$_INTERNAL_ERROR, I
        external DRV$_SUCCESS, DRV$_INTERNAL_ERROR
        character*255 oldfile, newfile, oldesnam, newesnam, oldrsnam, newrsnam, msg record /fabdef/ oldfab, newfab
        record /namdef/ oldnam, newnam character*(*) CRLF
        parameter (CRLF=char('0d'x)//char('0a'x))

oldfab.fab$b_bid = FAB$C_BID
        oldfab.fab$b_bln = FAB$C_BLN
        oldfab.fab$l_dna = 0
        oldfab.fab$b_dns = 0
        oldfab.fab$l_fna = %loc (oldfile)
        oldfab.fab$b_fns = olength
        oldfab.fab$w_ifi = 0
        oldfab.fab$l_xab = 0
        oldfab.fab$l_nam = %loc (oldnam)

newfab.fab$b_bid = FAB$C_BID
        newfab.fab$b_bln = FAB$C_BLN
        newfab.fab$l_dna = 0
        newfab.fab$b_dns = 0
        newfab.fab$l_fna = %loc (newfile)
        newfab.fab$b_fns = nlength
        newfab.fab$w_ifi = 0
        newfab.fab$l_xab = 0
        newfab.fab$l_nam = %loc (newnam)

oldnam.nam$b_bid = NAM$C_BID
        oldnam.nam$b_bln = NAM$C_BLN
        oldnam.nam$l_esa = %loc (oldesnam)
        oldnam.nam$b_ess = 255
        oldnam.nam$l_rsa = %loc (oldrsnam)
        oldnam.nam$b_rss = 255
        oldnam.nam$l_rlf = 0
        do i=1,3
            oldnam.nam$w_did(i) = 0
            oldnam.nam$w_fid(i) = 0
        end do newnam.nam$b_bid = NAM$C_BID
        newnam.nam$b_bln = NAM$C_BLN
```

```
        newnam.nam$l_esa = %loc (newesnam)
        newnam.nam$b_ess = 255
        newnam.nam$l_rsa = %loc (newrsnam)
        newnam.nam$b_rss = 255
        newnam.nam$l_rlf = 0
        do i=1,3
            newnam.nam$w_did(i) = 0
            newnam.nam$w_fid(i) = 0
        end do errcode = sys$rename (oldfab, , , newfab)
        if (.not. errcode) then
            call sys$getmsg (%val (errcode), lmsg, msg, , )
            call error (%loc (DRV$_INTERNAL_ERROR), errcode, 0, 'RENAME: error renaming '//oldfile(1:olength)//' to '//
     1           newfile(1:nlength)//CRLF//msg(1:lmsg) )
            RETURN
        end if if (newnam.nam$b_rsl .gt. 0) then
            nlength = zext(newnam.nam$b_rsl)
            newfile = newrsnam(1:nlength)
        end if errcode = %loc (DRV$_SUCCESS)

RETURN end

ALLOCATE_OPTICAL_FILE_SPACE.FOR;52
        ARCHIVE.FOR;134
        CHANGE.FOR;31
        CREATE_VMS_FILE.FOR;38
        DELETE_VMS_HEADER.FOR;14
        GET_OAS_DESCRIPTOR.FOR;27
        GET_VMS_DESCRIPTOR.FOR;50
        RENAME.FOR;17
        RESTORE.FOR;77
        RETIRE.FOR;14
        UPDATE_VMS_HEADER.FOR;24
        WRITE_VMS_HEADER.FOR;60
```

APPENDIX A

Copyright 1987, University of Wisconsin Physical Sciences Laboratory. This software contains valuable and proprietary information and cannot be disclosed, copied or used by others without prior written permission.

```
        allocate_optical_file_space
            attempt to allocate space from memory -- if possible
            create STRMAP.DUAL with new allocation information
            load vmsentry, adds fid, block info to oasheader, reply_pkt subroutine allocate_optical_file_space (req_pkt, reply_pkt, vmsentry, oasheader, errcode)

implicit none
        integer*4 i, j, k include 'OAS_FILE_STRUCT: packet.inc'
        include 'OAS_FILE_STRUCT: drvsts.inc'
        include 'OAS_FILE_STRUCT: strmap.inc'
        include 'OAS_FILE_STRUCT: storage_names.inc'
        include 'OAS_FILE_STRUCT: vms_header.inc'
        include 'OAS_FILE_STRUCT: oas_header.inc'
        include 'OAS_FILE_STRUCT: file_names.inc' record /oas_request_block/ req_pkt
        record /reply_packet/ reply_pkt
        record /vms_header_block/ vmsentry
        record /oas_header_block/ oasheader integer*4 errcode, ioerr, flength, DRV$_SUCCESS, DRV$_INTERNAL_ERROR, OAS$_NO_ARCHIVE
        external DRV$_SUCCESS, DRV$_INTERNAL_ERROR, OAS$_NO_ARCHIVE
        character fname*256 character*(*) CRLF
        parameter (CRLF=char('0d'x)//char('0a'x))
```

```
        storage_in_progress = storage        ! in order to back out later, work on copy
        storage_in_progress.current_fid = storage_in_progress.current_fid+1
        storage_in_progress.current_fid_addr = storage_in_progress.current_fid_addr+1

! *** later, add code to wrap index file back before start, ... fixed algorithm?

oasheader.fid = storage_in_progress.current_fid
        oasheader.oas.starting_sector = storage_in_progress.last_user_sector+1
        vmsentry.fid = oasheader.fid
        vmsentry.fid_addr = storage_in_progress.current_fid_addr
        vmsentry.used_sectors = oasheader.oas.used_sectors
        vmsentry.phase = OPEN
        vmsentry.first_free = 1
        vmsentry.serial_len = serial_length
        vmsentry.serial_pos = vmsentry.first_free
        vmsentry.heap(vmsentry.serial_pos : vmsentry.serial_pos + serial_length - 1)
       1        = serial_string (1:serial_length)
        vmsentry.first_free = vmsentry.first_free + serial_length storage_in_progress.last_user_sector = storage_in_progress.last_user_sector
       1        + oasheader.oas.used_sectors ! + OSI_ERROR_RATE * oasheader.oas.used_sectors if (storage_in_progress.last_user_sector .ge. storage_in_progress.index_start) then
                ! not enough room on this platter
            if (bitest (req_pkt.internal_flags, REQ$V_BOUND)) then
                call find_next_platter (req_pkt, reply_pkt, oasheader, errcode)
                RETURN ! can't complete request on this platter....
            else! private, so no implicit extension for now
                reply_pkt.reply.status = %loc (OAS$_NO_ARCHIVE)
                errcode = %loc (OAS$_NO_ARCHIVE)
                call sys$getmsg (%val (%loc (OAS$_NO_ARCHIVE)), lmsg2, msg2,,)
                call sys$fao (%descr(msg2(1:lmsg2)), lmsg1, msg1, %val (vlength), %ref(vms_file))
                ! let user know how many blocks are left...
                reply_pkt.reply.message_len = min (lmsg1+34, REP$_HEAP_LENGTH-reply_pkt.reply.first_free+1)
                reply_pkt.reply.message_pos = reply_pkt.reply.first_free
                reply_pkt.reply.first_free = reply_pkt.reply.first_free + reply_pkt.reply.message_len
                write (msg2, 10) msg1(1:lmsg1), (storage.index_start - storage.last_user_sector) * 2
10              format (<lmsg1>a1, 1x, 'Only ', i7, ' blocks left on platter')
                reply_pkt.reply.heap(reply_pkt.reply.message_pos : reply_pkt.reply.message_pos+reply_pkt.reply.message_len-1) =
       1            msg2 (1:reply_pkt.reply.message_len)
            end if
            return
        end if flength = strlength+5
        fname(1:flength) = strname(:strlength)//'_dual'
        open (unit=25, file=fname(1:flength),
       1        err=200, iostat=ioerr, status='new', access='direct',
       1        form='unformatted', recordtype='fixed', recordsize=128)

write (25'1, err=300, iostat=ioerr) storage_in_progress
        close (unit=25, err=400, iostat=ioerr)

errcode = %loc (DRV$_SUCCESS)
        return

! OPEN_ERROR
200     reply_pkt.reply.status = %loc (OAS$_NO_ARCHIVE)
        errcode = %loc (OAS$_NO_ARCHIVE)
        call errsns (,,,,ioerr)
        call sys$getmsg (%val(ioerr), lmsg1, %descr(msg1), , )
        call error (%loc(DRV$_INTERNAL_ERROR), errcode, 0, 'ALLOC_SPACE: error opening dual storage file '
       1        //strname(:strlength)//'_dual '//CRLF//msg1(1:lmsg1))
        call sys$getmsg (%val (%loc (OAS$_NO_ARCHIVE)), lmsg2, msg2,,)
        call sys$fao (%descr(msg2(1:lmsg2)), lmsg1, msg1, %val (vlength), %ref(vms_file))
        lmsg2 = len (' Error accessing storage file')
        msg2(1:lmsg2) = ' Error accessing storage file'
        msg(1:lmsg1+lmsg2) = msg1(1:lmsg1) // msg2(1:lmsg2)
        lmsg = min (lmsg1+lmsg2, REP$_HEAP_LENGTH - reply_pkt.reply.first_free + 1)
        reply_pkt.reply.message_pos = reply_pkt.reply.first_free
        reply_pkt.reply.message_len = lmsg
        reply_pkt.reply.first_free = reply_pkt.reply.first_free + lmsg
        reply_pkt.reply.heap (reply_pkt.reply.message_pos : reply_pkt.reply.first_free - 1) = msg (1:lmsg)
        return ! WRITE_ERROR
300     reply_pkt.reply.status = %loc (OAS$_NO_ARCHIVE)
        errcode = %loc (OAS$_NO_ARCHIVE)
        call errsns (,,,,ioerr)
        call sys$getmsg (%val(ioerr), lmsg1, %descr(msg1), , )
        call error (%loc(DRV$_INTERNAL_ERROR), errcode, 0, 'ALLOC_SPACE: error writing dual storage file '
       1        //strname(:strlength)//'_dual '//CRLF//msg1(1:lmsg1))
        call sys$getmsg (%val (%loc (OAS$_NO_ARCHIVE)), lmsg2, msg2,,)
        call sys$fao (%descr(msg2(1:lmsg2)), lmsg1, msg1, %val (vlength), %ref(vms_file))
        lmsg2 = len (' Error accessing storage file')
        msg2(1:lmsg2) = ' Error accessing storage file'
        msg(1:lmsg1+lmsg2) = msg1(1:lmsg1) // msg2(1:lmsg2)
```

```
        lmsg = min (lmsg1+lmsg2, REP$_HEAP_LENGTH - reply_pkt.reply.first_free + 1)
        reply_pkt.reply.message_pos = reply_pkt.reply.first_free
        reply_pkt.reply.message_len = lmsg
        reply_pkt.reply.first_free = reply_pkt.reply.first_free + lmsg
        reply_pkt.reply.heap (reply_pkt.reply.message_pos : reply_pkt.reply.first_free - 1) = msg (1:lmsg)
        close (unit=25, err=400, iostat=ioerr)
        return ! CLOSE ERROR
400     reply_pkt.reply.status = %loc (OAS$_NO_ARCHIVE)
        errcode = %loc (OAS$_NO_ARCHIVE)
        call errsns (,,,,ioerr)
        call sys$getmsg (%val(ioerr), lmsg1, %descr(msg1), , )
        call error (%loc(DRV$_INTERNAL_ERROR), errcode, 0, 'ALLOC_SPACE: error closing dual storage file '
     1      //strname(:strlength)//'_dual '//CRLF//msg1(1:lmsg1))
        call sys$getmsg (%val (%loc (OAS$_NO_ARCHIVE)), lmsg2, msg2,,)
        call sys$fao (%descr(msg2(1:lmsg2)), lmsg1, msg1, %val(vlength), %ref(vms_file))
        lmsg2 = len (' Error accessing storage file')
        msg2(1:lmsg2) = ' Error accessing storage file'
        msg(1:lmsg1+lmsg2) = msg1(1:lmsg1) // msg2(1:lmsg2)
        lmsg = min (lmsg1+lmsg2, REP$_HEAP_LENGTH - reply_pkt.reply.first_free + 1)
        reply_pkt.reply.message_pos = reply_pkt.reply.first_free
        reply_pkt.reply.message_len = lmsg
        reply_pkt.reply.first_free = reply_pkt.reply.first_free + lmsg
        reply_pkt.reply.heap (reply_pkt.reply.message_pos : reply_pkt.reply.first_free - 1) = msg (1:lmsg)
        return end Copyright 1987, University of Wisconsin Physical Sciences Laboratory. This
        software contains valuable and proprietary information and cannot be dis-
        closed, copied or used by others without prior written permission.
```

---

```
        archive.for -- adapt storage.last_fid_addr,stop_fid_addr, etc.

subroutine archive (req_pkt, reply_pkt, errcode)

implicit none
        integer*4 i, j, k include 'OAS_FILE_STRUCT: packet.inc'
        include 'OAS_FILE_STRUCT: drvsts.inc'
        include 'OAS_FILE_STRUCT: strmap.inc'
        include 'OAS_FILE_STRUCT: storage_names.inc'
        include 'OAS_FILE_STRUCT: vms_header.inc'
        include 'OAS_FILE_STRUCT: oas_header.inc'
        include 'OAS_FILE_STRUCT: data.inc'
        include 'OAS_FILE_STRUCT: xab_blocks.inc'
        include 'OAS_FILE_STRUCT: file_names.inc'
        include 'OAS_FILE_STRUCT: rms_io_sync.inc' include '($FABDEF)'
        include '($RABDEF)'
        include '($RMSDEF)'
        include '($SSDEF)'
        include '($SYSSRVNAM)' record /oas_request_block/ req_pkt
        record /reply_packet/ reply_pkt
        record /vms_header_block/ vmsentry
        record /oas_header_block/ oasheader record /fabdef/ fab
        record /rabdef/ rab integer*4 errcode, ioerr, ABORT_CLEANUP, start_block, end_block, num_sectors, xend_sector,
     1      used_sectors, residue, num_headers, cleanup_flags, bytes_read, str$position, error_array(26),
     1      start_time(2), stop_time(2), rms_io_completion, buffer_optical, buffer_rms, current_buffer, efn_state,
     1      access_code integer*4 DRV$_SUCCESS, OAS$_NO_ARCHIVE, OAS$_ARCHIVED, DRV$_USER_ERROR_TRACE, DRV$_ABORT_TRNSFR, DRV$_INTERNAL_ERROR,
     1      DRV$_DEV_STS
        external DRV$_SUCCESS, OAS$_NO_ARCHIVE, OAS$_ARCHIVED, DRV$_USER_ERROR_TRACE, DRV$_ABORT_TRNSFR, DRV$_INTERNAL_ERROR,
     1      DRV$_DEV_STS, str$position, rms_io_completion parameter VMS_FAB = 0, VMS_RAB = 1, STORAGE_DUAL = 2,
     1      LOG_FILE = 3, VMS_HEADER = 4, OAS_HEADER = 5,
     1      PARTIAL_WRITE = 6, DRIVE_LOST = 7
```

```
structure /address/
    union
        map
            integer*4 long
        end map
        map
            integer*2 low, high
        end map
    end union
end structure record /address/ current, new_position character*(*) CRLF
parameter (CRLF=char('0d'x)//char('0a'x))

ASSIGN 100 TO ABORT_CLEANUP call sys$gettim (start_time)
drvsts.activity = WRITE   ! activity = write
drvsts.phase = 0  ! phase 0 = initialization
drvsts.file_request_id = req_pkt.oas_request_id
cleanup_flags = 0
errcode = %loc(DRV$_SUCCESS)

! get/verify vms source/oas archive info
call build_oas_descriptor (req_pkt, reply_pkt, oasheader, fab, errcode)
if (.not. errcode) RETURN
cleanup_flags = ibset (cleanup_flags, VMS_FAB)

drvsts.phase = 1

! allocate storage information and update strmap if possible
! if insufficient space, allocate_optical_file_space forms a filer$_packet for scheduler and returns an error message
call allocate_optical_file_space (req_pkt, reply_pkt, vmsentry, oasheader, errcode)
if (.not. errcode) goto ABORT_CLEANUP
cleanup_flags = ibset (cleanup_flags, STORAGE_DUAL)   ! index header will be overwritten next archive
xend_sector = storage_in_progress.last_user_sector drvsts.fid = oasheader.fid
drvsts.phase = 2

! write/flush vmsentry to database
! NOTE: write vms header loads common string oas_file(1:olength) with the file's full optical name (it's only after
!       the header is written that the actual version number of the file is known)
call write_vms_header (req_pkt, reply_pkt, oasheader, vmsentry, errcode)
if (.not. errcode) goto ABORT_CLEANUP
cleanup_flags = ibset (cleanup_flags, VMS_HEADER)
drvsts.phase = 3

! now that the file's real name is known, load it into the oasheader. since this is the last variable length information
!       loaded into the heap, it is now safe to point the bad sector list to begin after the end of the heap
i = str$position (oas_file(1:olength), '[', 1)
if ((i .le. 0) .or. (i .ge. olength)) i = 1
oasheader.oas.name = oasheader.first_free
oasheader.oas.name_length = olength - i + 1
oasheader.first_free = oasheader.first_free + olength - i + 1
oasheader.heap (oasheader.oas.name:oasheader.first_free-1) = oas_file (i : olength)

! calculate start of bad sector list. the bad sector list will actually be an index into the oasheader interpreted as a
!       array of longwords
oasheader.oas.bad_sector_list = OAS_FIXED_SIZE + (oasheader.first_free+3)/4 + 1

! write the oas header out to magnetic disk -- save writing optical disk until end
call write_oas_header (req_pkt, reply_pkt, oasheader, num_headers, errcode)
if (.not. errcode) goto ABORT_CLEANUP
cleanup_flags = ibset (cleanup_flags, OAS_HEADER)        ! actually, unnecessary drvsts.phase = 4

! connect a record stream to the vms file
rab.rab$l_fab = %loc (fab)
rab.rab$b_bid = rab$c_bid
rab.rab$b_bln = rab$c_bln
rab.rab$w_isi = 0
rab.rab$b_krf = 0       ! no indexed files
rab.rab$b_mbc = BUFFER_BYTE_SIZE/512    !? number of blocks per buffer
rab.rab$b_mbf = 2
rab.rab$l_rop = RAB$M_BIO + RAB$M_ASY
errcode = sys$clref (%val(rms_io_ef))   ! make sure it's clear...
errcode = sys$connect (rab, rms_io_completion, rms_io_completion)
errcode = sys$waitfr (%val(rms_io_ef))
if (.not. errcode) then
    reply_pkt.reply.status = %loc (OAS$_NO_ARCHIVE)
    call sys$getmsg (%val(%loc ( AS$_NO_ARCHIVE)), lmsg2, msg2,,)
```

```
        call sys$fao (%descr(msg2(1:lmsg2)), lmsg1, msg1, %val (vlength), %ref(vms_file))
        call sys$getmsg (%val(errcode), lmsg2, msg2,,)
        msg (1:lmsg1+lmsg2) = msg1(1:lmsg1) // msg2(1:lmsg2)
        lmsg = min (lmsg1+lmsg2, REPS_HEAP_LENGTH-reply_pkt.reply.first_free+1)
        reply_pkt.reply.message_pos = reply_pkt.reply.first_free
        reply_pkt.reply.message_len = lmsg
        reply_pkt.reply.first_free = reply_pkt.reply.first_free + lmsg
        reply_pkt.reply.heap (reply_pkt.reply.message_pos : reply_pkt.reply.first_free - 1) = msg(1:lmsg)

! after a bit of use, remove error call -- since only [sic] errors will be from users' bad name specifications.
        call error (%loc (DRV$_USER_ERROR_TRACE), errcode, 0,
1           'ARCHIVE-error connecting to vms input stream for archive '
1           // ' ' // vms_file(1 : vlength) // CRLF // msg2(1:lmsg2) )
        goto ABORT_CLEANUP
    end if ! start up an rms io before completing setup....
    errcode = sys$clref (%val(rms_io_ef))    ! make sure it's clear...
    current_buffer = 0
    rab.rab$l_bkt = 0          ! (i) 0 indicates next vbn
    rab.rab$l_ubf = %loc (buffer.word)     ! start out with buffer, next up is auxbuffer
    rab.rab$w_usz = BUFFER_BYTE_SIZE errcode = sys$read (rab, rms_io_completion, rms_io_completion)
    cleanup_flags = ibset (cleanup_flags, VMS_RAB)

!! CHECK DRIVE FOR READY????

! loop reading file and writing to optical disk
    used_sectors = 0
    ! since when will an archive be only partial?????
    start_block = max (1, req_pkt.starting_block)
    if (req_pkt.number_blocks .eq. 0) then
        end_block = oasheader.vms.blocks + start_block - 1
    else
        end_block = req_pkt.number_blocks + start_block - 1
    end if ! when implementing starting_block > 1, then modify current address: note, watch out for even starting blocks!
    current.high = oasheader.oas.starting_high_word
    current.low = oasheader.oas.starting_low_word do i=start_block, end_block, BUFFER_BYTE_SIZE/512  ! blocks/buffer drvsts.vbn = i
        drvsts.phase = 5
        num_sectors = BUFFER_BYTE_SIZE/1024
        drvsts.current_sector = current.long errcode = sys$waitfr (%val (rms_io_ef))
        if (.not. errcode) then
            reply_pkt.reply.status = %loc (OAS$_NO_ARCHIVE)
            call sys$getmsg (%val(%loc (OAS$_NO_ARCHIVE)), lmsg2, msg2,,)
            call sys$fao (%descr(msg2(1:lmsg2)), lmsg1, msg1, %val (vlength), %ref(vms_file))
            call sys$getmsg (%val(errcode), lmsg2, msg2,,)
            msg (1:lmsg1+lmsg2) = msg1(1:lmsg1) // msg2(1:lmsg2)
            lmsg = min (lmsg1+lmsg2, REPS_HEAP_LENGTH-reply_pkt.reply.first_free+1)
            reply_pkt.reply.message_pos = reply_pkt.reply.first_free
            reply_pkt.reply.message_len = lmsg
            reply_pkt.reply.first_free = reply_pkt.reply.first_free + lmsg
            reply_pkt.reply.heap (reply_pkt.reply.message_pos : reply_pkt.reply.first_free - 1) = msg(1:lmsg)

! after a bit of use, remove error call -- since only [sic] errors
            ! will be from users' bad name specifications.
            call error (%loc (DRV$_USER_ERROR_TRACE), errcode, 0,
1               'ARCHIVE-error reading vms file for archive '
1               // ' ' // vms_file(1 : vlength) // CRLF // msg2(1:lmsg2) )
            GOTO ABORT_CLEANUP
        end if errcode = sys$clref (%val (rms_io_ef))
        if (.not. errcode) then
            reply_pkt.reply.status = %loc (OAS$_NO_ARCHIVE)
            call sys$getmsg (%val(%loc (OAS$_NO_ARCHIVE)), lmsg2, msg2,,)
            call sys$fao (%descr(msg2(1:lmsg2)), lmsg1, msg1, %val (vlength), %ref(vms_file))
            call sys$getmsg (%val(errcode), lmsg2, msg2,,)
            msg (1:lmsg1+lmsg2) = msg1(1:lmsg1) // msg2(1:lmsg2)
            lmsg = min (lmsg1+lmsg2, REPS_HEAP_LENGTH-reply_pkt.reply.first_free+1)
            reply_pkt.reply.message_pos = reply_pkt.reply.first_free
            reply_pkt.reply.message_len = lmsg
            reply_pkt.reply.first_free = reply_pkt.reply.first_free + lmsg
            reply_pkt.reply.heap (reply_pkt.reply.message_pos : reply_pkt.reply.first_free - 1) = msg(1:lmsg)

! after a bit of use, remove error call -- since only [sic] errors
            ! will be from users' bad name specifications.
            call error (%loc (DRV$_USER_ERROR_TRACE), errcode, 0,
1               'ARCHIVE-error reading vms file for archive '
```

```
            //  ' ' // vms_file(1 : vlength) // CRLF // msg2(1:lmsg2) )
        GOTO ABORT_CLEANUP
    end if if (current_buffer .eq. 0) then
        current_buffer = 1
        buffer_optical = %loc (buffer)
        buffer_rms = %loc (auxbuffer)
    else
        current_buffer = 0
        buffer_optical = %loc (auxbuffer)
        buffer_rms = %loc (buffer)
    end if ! extract useful info from rab before sending it off again
    errcode = rab.rab$l_sts
    bytes_read = zext (rab.rab$w_rsz)
    ! set up rab for next io
    rab.rab$l_bkt = 0    ! (i) 0 indicates next vbn
    rab.rab$l_ubf = buffer_rms
    rab.rab$w_usz = BUFFER_BYTE_SIZE
    call sys$read (rab, rms_io_completion, rms_io_completion)

! rms isn't returning EOF until next read
    if ((errcode .eq. RMS$_EOF) .or. (bytes_read .lt. BUFFER_BYTE_SIZE)) then
        oasheader.oas.last_byte = mod (bytes_read, 1024)
        if (oasheader.oas.last_byte .eq. 0) oasheader.oas.last_byte=1024
        call zerofill (%val (buffer_optical), num_sectors, bytes_read)
    else if (errcode .ne. RMS$_SUC) then
        reply_pkt.reply.status = %loc (OAS$_NO_ARCHIVE)
        call sys$getmsg (%val(%loc (OAS$_NO_ARCHIVE)), lmsg2, msg2,,)
        call sys$fao (%descr(msg2(1:lmsg2)), lmsg1, msg1, %val (vlength), %ref(vms_file))
        call sys$getmsg (%val(errcode), lmsg2, msg2,,)
        msg (1:lmsg1+lmsg2) = msg1(1:lmsg1) // msg2(1:lmsg2)
        lmsg = min (lmsg1+lmsg2, REP$_HEAP_LENGTH-reply_pkt.reply.first_free+1)
        reply_pkt.reply.message_pos = reply_pkt.reply.first_free
        reply_pkt.reply.message_len = lmsg
        reply_pkt.reply.first_free = reply_pkt.reply.first_free + lmsg
        reply_pkt.reply.heap (reply_pkt.reply.message_pos : reply_pkt.reply.first_free - 1) = msg(1:lmsg)

! after a bit of use, remove error call -- since only [sic] errors
        ! will be from users' bad name specifications.
        call error (%loc (DRV$_USER_ERROR_TRACE), errcode, 0,
            'ARCHIVE-error reading vms file for archive '
            //  ' ' // vms_file(1 : vlength) // CRLF // msg2(1:lmsg2) )
        goto ABORT_CLEANUP
    end if drvsts.phase = 6 residue = num_sectors+1
    call fOwrt (req_pkt.oas_request_id, %val(buffer_optical), BUFFER_WORD_SIZE, num_sectors,
        current.high, current.low, drvsts.status, errcode)
    cleanup_flags = ibset (cleanup_flags, PARTIAL_WRITE)
    if (errcode) then    ! SUCCESS, WARNING, or INFO ok
        drvsts.sectors_transferred = drvsts.sectors_transferred+num_sectors
        new_position.high = drvsts.status.current_high_word
        new_position.low = drvsts.status.current_low_word
        storage_in_progress.last_user_sector = new_position.long
        used_sectors = used_sectors+num_sectors
        drvsts.current_sector = new_position.long if (bitest (drvsts.status.characteristics, DSB$V_ERR)) then
            ! check flaw table
            call update_bad_sector_list (current, oasheader, reply_pkt, errcode)
            if (.not. errcode) goto ABORT_CLEANUP
        end if ! transfer_residue > 0 ==> the four automatic retries fails. since this RARELY occurs, it is much simpler
        ! to abort the archive. If all the retries fail, program directed reads must be performed -- which greatly
        ! delays ALL subsequent restores
        if (drvsts.status.transfer_residue .ne. 0) then
            drvsts.total_nonrecvr = drvsts.total_nonrecvr+1
            drvsts.mount_nonrecvr = drvsts.mount_nonrecvr+1
            reply_pkt.reply.status = errcode
            reply_pkt.reply.status = %loc (OAS$_NO_ARCHIVE)
            call sys$getmsg (%val(%loc (OAS$_NO_ARCHIVE)), lmsg2, msg2,,)
            call sys$fao (%descr(msg2(1:lmsg2)), lmsg1, msg1, %val (vlength), %ref(vms_file))
            lmsg2 = len (CRLF // 'Encountered a large media flaw, please retry archive')
            msg2 (1:lmsg2) = CRLF // 'Encountered a large media flaw, please retry archive'
            msg (1:lmsg1+lmsg2) = msg1(1:lmsg1) // msg2(1:lmsg2)
            lmsg = min (lmsg1+lmsg2, REP$_HEAP_LENGTH-reply_pkt.reply.first_free+1)
            reply_pkt.reply.message_pos = reply_pkt.reply.first_free
            reply_pkt.reply.message_len = lmsg
            reply_pkt.reply.first_free = reply_pkt.reply.first_free + lmsg
            reply_pkt.reply.heap (reply_pkt.reply.message_pos : repl   kt.reply.first_free - 1) = msg(1:lmsg)
```

```
! ***** LOG DRIVE STATUS
error_array(1) = len ('archive')
error_array(2) = %loc ('archive')
error_array(3) = drvsts.cid
error_array(4) = platter_length
error_array(5) = %loc (platter_string)
error_array(6) = vlength
error_array(7) = %loc (vms_file)
error_array(8) = drvsts.vbn
error_array(9) = num_sectors-1
error_array(10) = 12
error_array(11) = %loc (req_pkt.username)
        call error (%loc(DRV$_ABORT_TRNSFR), error_array, 11, 'ARCHIVE: lost drive during archive, media flaw')
        error_array(1) = len ('ARCHIVE: aborting transfer')
        error_array(2) = %loc ('ARCHIVE: aborting transfer')
        do j=1, 24
            error_array(j+2) = zext(drvsts.status.array(j))
        end do
        call error (%loc(DRV$_DEV_STS), error_array, 26, ' ')
        goto ABORT_CLEANUP
    end if drvsts.sectors_transferred = drvsts.sectors_transferred+num_sectors
    current.high = drvsts.status.current_high_word   !! *** damn osi if this ever fails!!!
    current.low = drvsts.status.current_low_word
    current.long = current.long+1 else! f0wrt returned a failure errcode
    drvsts.total_nonrecvr = drvsts.total_nonrecvr+1
    drvsts.mount_nonrecvr = drvsts.mount_nonrecvr+1
    reply_pkt.reply.status = %loc (OAS$_NO_ARCHIVE)
    call sys$getmsg (%val(%loc (OAS$_NO_ARCHIVE)), lmsg2, msg2,,)
    call sys$fao (%descr(msg2(1:lmsg2)), lmsg1, msg1, %val (vlength), %ref(vms_file))
    lmsg2 = len (' Lost drive during archive - f0wrt returned an error')
    msg2 (1:lmsg2) = ' Lost drive during archive - f0wrt returned an error'
    msg (1:lmsg1+lmsg2) = msg1(1:lmsg1) // msg2(1:lmsg2)
    lmsg = min (lmsg1+lmsg2, REP$_HEAP_LENGTH-reply_pkt.reply.first_free+1)
    reply_pkt.reply.message_pos = reply_pkt.reply.first_free
    reply_pkt.reply.message_len = lmsg
    reply_pkt.reply.first_free = reply_pkt.reply.first_free + lmsg
    reply_pkt.reply.heap (reply_pkt.reply.message_pos : reply_pkt.reply.first_free - 1) = msg(1:lmsg)

! ***** LOG DRIVE STATUS
    error_array(1) = len ('archive')
    error_array(2) = %loc ('archive')
    error_array(3) = drvsts.cid
    error_array(4) = platter_length
    error_array(5) = %loc (platter_string)
    error_array(6) = vlength
    error_array(7) = %loc (vms_file)
    error_array(8) = drvsts.vbn
    error_array(9) = num_sectors-1
    error_array(10) = 12
    error_array(11) = %loc (req_pkt.username)
    call error (%loc(DRV$_ABORT_TRNSFR), error_array, 11, 'ARCHIVE: lost drive during archive, f0wrt failed')
    error_array(1) = len ('ARCHIVE: aborting transfer')
    error_array(2) = %loc ('ARCHIVE: aborting transfer')
    do j=1, 24
        error_array(j+2) = zext(drvsts.status.array(j))
    end do
    call error (%loc(DRV$_DEV_STS), error_array, 26, ' ')
    cleanup_flags = ibset (cleanup_flags, DRIVE_LOST)
    goto ABORT_CLEANUP
end if end do drvsts.phase = 7
errcode = sys$disconnect (rab)
if (errcode .eq. RMS$_SUC) then
    cleanup_flags = ibclr (cleanup_flags, VMS_RAB)
end if
errcode = sys$close (fab)
if (errcode .eq. RMS$_SUC) then
    cleanup_flags = ibclr (cleanup_flags, VMS_FAB)
end if vmsentry.phase=CLOSE
oasheader.oas.state=CLOSE ! update oas index on magnetic and then optical disk
call write_oas_header (req_pkt, reply_pkt, oasheader, num_headers, errcode)
if (.not. errcode) goto ABORT_CLEANUP
```

```
current.long = storage_in_progress.current_fid_addr     ! it's already been bumped
call write_optical_log (req_pkt.oas_request_id, buffer.word, num_headers, current.long, new_position.long,
1   drvsts.status, errcode)

! update current_fid_addr to indicate last written index sector, including errors
vmsentry.fid_addr = current.long
if (new_position.long .gt. storage_in_progress.current_fid_addr) storage_in_progress.current_fid_addr = new_position.long if (.not. errcode) then
    storage.current_fid_addr = storage_in_progress.current_fid_addr
    drvsts.total_nonrecvr = drvsts.total_nonrecvr+1
    drvsts.mount_nonrecvr = drvsts.mount_nonrecvr+1
    reply_pkt.reply.status = errcode
    reply_pkt.reply.status = %loc (OAS$_NO_ARCHIVE)
    call sys$getmsg (%val(%loc (OAS$_NO_ARCHIVE)), lmsg2, msg2,,)
    call sys$fao (%descr(msg2(1:lmsg2)), lmsg1, msg1, %val (vlength), %ref(vms_file))
    lmsg2 = len (' Lost drive writing optical file header')
    msg2 (1:lmsg2) = ' Lost drive writing optical file header'
    msg (1:lmsg1+lmsg2) = msg1(1:lmsg1) // msg2(1:lmsg2)
    lmsg = min (lmsg1+lmsg2, REPS_HEAP_LENGTH-reply_pkt.reply.first_free+1)
    reply_pkt.reply.message_pos = reply_pkt.reply.first_free
    reply_pkt.reply.message_len = lmsg
    reply_pkt.reply.first_free = reply_pkt.reply.first_free + lmsg
    reply_pkt.reply.heap (reply_pkt.reply.message_pos : reply_pkt.reply.first_free - 1) = msg(1:lmsg)
    error_array(1) = len ('archive')
    error_array(2) = %loc ('archive')
    error_array(3) = drvsts.cid
    error_array(4) = platter_length
    error_array(5) = %loc (platter_string)
    error_array(6) = vlength
    error_array(7) = %loc (vms_file)
    error_array(8) = 0
    error_array(9) = num_sectors-1
    error_array(10) = 12
    error_array(11) = %loc (req_pkt.username)
    call error (%loc(DRV$_ABORT_TRNSFR), error_array, 11, 'ARCHIVE: lost drive writing optical header')
    error_array(1) = len ('ARCHIVE: aborting transfer')
    error_array(2) = %loc ('ARCHIVE: aborting transfer')
    do j=1, 24
        error_array(j+2) = zext(drvsts.status.array(j))
    end do
    call error (%loc(DRV$_DEV_STS), error_array, 26, ' ')
    goto ABORT_CLEANUP
end if ! update vmsentry to include actual fid address, and then write it out
vmsentry.fid_addr = current.long
call update_vms_header (req_pkt, reply_pkt, oasheader, vmsentry, errcode)
if (.not. errcode) goto ABORT_CLEANUP ! write storage_in_progress to storage file
storage = storage_in_progress    ! *** just wait until storage exceeds 1kB !!
storage.last_fid_addr = max (storage.current_fid_addr, storage.last_fid_addr)
open (unit=25, file= strname(1:strlength), shared,
1     err=200, iostat=ioerr, status='old', access='direct',
1     form='unformatted', recordtype='fixed', recordsize=128)
write (25'1, err=300, iostat=ioerr) storage
close (unit=25, err=400, iostat=ioerr)

! delete storage file dual
call lib$delete_file (strname(1:strlength)//'_dual',,,,,,,,)
cleanup_flags = ibclr (cleanup_flags, STORAGE_DUAL)

! update drvsts
drvsts.phase=0
drvsts.activity=0 errcode = %loc (OAS$_ARCHIVED)
reply_pkt.reply.status = errcode
call sys$getmsg (%val (errcode), lmsg2, msg2,,)
call sys$fao (%descr(msg2(1:lmsg2)), lmsg, msg, %val(vlength), %ref (vms_file), %val(olength), %ref (oas_file))
lmsg = min (REPS_HEAP_LENGTH-reply_pkt.reply.first_free+1, lmsg)
reply_pkt.reply.message_pos = reply_pkt.reply.first_free
reply_pkt.reply.message_len = lmsg
reply_pkt.reply.first_free = reply_pkt.reply.first_free + lmsg
reply_pkt.reply.heap (reply_pkt.reply.message_pos : reply_pkt.reply.first_free - 1) = msg(1:lmsg)
drvsts.transactions = drvsts.transactions + 1

! update stats
! call stats (reply_pkt)

! update accounting
call sys$gettim (stop_time)
access_code = 1 ! archive
if (.not. (bitest (req_pkt.internal_flags, REQ$V_PUBLIC))) access_code = 7        ! private archive
call accounting (req_pkt.username(1:12), req_pkt.owner, req_pkt.account(1:8), 'ARCHIVE', access_code, sta   time,
1   stop_time, vmsentry.used_sectors, req_pkt.heap(req_pkt.vms_node_pos : req_pkt.vms_node_pos + req_pkt.    de_len -1) )
```

```
       drvsts.transactions = drvsts.transactions+1
       RETURN

! ABORT_CLEANUP
100    drvsts.phase = 7 if (btest(cleanup_flags, VMS_RAB)) errcode = sys$disconnect (rab)
       if (btest(cleanup_flags, VMS_FAB)) errcode = sys$close (fab)

if (btest(cleanup_flags, PARTIAL_WRITE)) then
           storage_in_progress.current_fid = storage.current_fid
           storage_in_progress.current_fid_addr = storage.current_fid_addr    !? what about lost index file
           current.high = drvsts.status.current_high_word
           current.low = drvsts.status.current_low_word
           if (current.long .eq. 0) then
               storage_in_progress.last_user_sector = xend_sector       ! totally lost, guess at last position
           else if ((current.long .ge. storage_in_progress.last_user_sector) .and.
     1            (current.long .lt. storage_in_progress.index_start)) then
               storage_in_progress.last_user_sector = current.long
           else! strange ...
               storage_in_progress.last_user_sector = xend_sector       ! again, something is really screwed up
           end if
           storage = storage_in_progress        ! *** just wait until storage exceeds 1kB !!
           storage.last_fid_addr = max (storage.current_fid_addr, storage.last_fid_addr)
           open (unit=25, file= strname(1:strlength), shared,
     1          err=200, iostat=ioerr, status='unknown', access='direct',    ! don't create a new one unnecessarily
     1          form='unformatted', recordtype='fixed', recordsize=128)
           write (25'1, err=300, iostat=ioerr) storage
           close (unit=25, err=400, iostat=ioerr)
       end if 150    if (btest(cleanup_flags, VMS_HEADER)) then
           call delete_vms_header (req_pkt, reply_pkt, vmsentry, errcode)
       end if !! if (btest(cleanup_flags, OAS_HEADER)) then ! nothing to do if (btest(cleanup_flags, STORAGE_DUAL))
     1     call lib$delete_file (strname(1:strlength)//'_dual',........)

! update stats
       if (btest(cleanup_flags, STAT) call stats (reply_pkt)
       ! update accounting
       if (btest(cleanup_flags, ACC) call accounting (reply_pkt)

if (btest(cleanup_flags, DRIVE_LOST)) then
           call rstdms
           call select ... etc
       end if errcode = %loc (OAS$_NO_ARCHIVE)
       RETURN ! OPEN_ERROR             ??????????????????????????????????????????????????????????
200    reply_pkt.reply.status = %loc (OAS$_NO_ARCHIVE)
       call sys$getmsg (%val(%loc (OAS$_NO_ARCHIVE)), lmsg2, msg2,,)
       call sys$fao (%descr(msg2(1:lmsg2)), lmsg1, msg1, %val (vlength), %ref(vms_file))

call errsns (,,,,ioerr)
       call sys$getmsg (%val(ioerr), lmsg2, %descr(msg2), , )
       errcode = %loc (DRV$_INTERNAL_ERROR)
       call error (errcode, errcode, 0, 'ARCHIVE: error opening storage file '//strname(:strlength)//CRLF//msg2(1:lmsg2))

lmsg2 = len (' Lost drive updating storage file')
       msg2 (1:lmsg2) = ' Lost drive updating storage file'
       msg (1:lmsg1+lmsg2) = msg1(1:lmsg1) // msg2(1:lmsg2)
       lmsg = min (lmsg1+lmsg2, REPS_HEAP_LENGTH-reply_pkt.reply.first_free+1)
       reply_pkt.reply.message_pos = reply_pkt.reply.first_free
       reply_pkt.reply.message_len = lmsg
       reply_pkt.reply.first_free = reply_pkt.reply.first_free + lmsg
       reply_pkt.reply.heap (reply_pkt.reply.message_pos : reply_pkt.reply.first_free - 1) = msg(1:lmsg)

return

! WRITE_ERROR
300    reply_pkt.reply.status = %loc (OAS$_NO_ARCHIVE)
       call sys$getmsg (%val(%loc (OAS$_NO_ARCHIVE)), lmsg2, msg2,,)
       call sys$fao (%descr(msg2(1:lmsg2)), lmsg1, msg1, %val (vlength), %ref(vms_file))

call errsns (,,,,ioerr)
```

```
call sys$getmsg (%val(ioerr), lmsg2, %descr(msg2), , )
errcode = %loc (DRV$_INTERNAL_ERROR)
call error (errcode, errcode, 0, 'ARCHIVE: error writing storage file '//strname(:strlength)//CRLF//msg2(1:lmsg2))

lmsg2 = len (' Lost drive updating storage file')
msg2 (1:lmsg2) = ' Lost drive updating storage file'
msg (1:lmsg1+lmsg2) = msg1(1:lmsg1) // msg2(1:lmsg2)
lmsg = min (lmsg1+lmsg2, REP$_HEAP_LENGTH-reply_pkt.reply.first_free+1)
reply_pkt.reply.message_pos = reply_pkt.reply.first_free
reply_pkt.reply.message_len = lmsg
reply_pkt.reply.first_free = reply_pkt.reply.first_free + lmsg
reply_pkt.reply.heap (reply_pkt.reply.message_pos : reply_pkt.reply.first_free - 1) = msg(1:lmsg)

close (unit=25, err=400, iostat=ioerr)
return

! CLOSE_ERROR
400   reply_pkt.reply.status = %loc (OAS$_NO_ARCHIVE)
call sys$getmsg (%val(%loc (OAS$_NO_ARCHIVE)), lmsg2, msg2,,)
call sys$fao (%descr(msg2(1:lmsg2)), lmsg1, msg1, %val (vlength), %ref(vms_file))

call errsns (,,,,ioerr)
call sys$getmsg (%val(ioerr), lmsg2, %descr(msg2), , )
errcode = %loc (DRV$_INTERNAL_ERROR)
call error (errcode, errcode, 0, 'ARCHIVE: error closing storage file '//strname(:strlength) //CRLF//msg2(1:lmsg2))

lmsg2 = len (' Lost drive updating storage file')
msg2 (1:lmsg2) = ' Lost drive updating storage file'
msg (1:lmsg1+lmsg2) = msg1(1:lmsg1) // msg2(1:lmsg2)
lmsg = min (lmsg1+lmsg2, REP$_HEAP_LENGTH-reply_pkt.reply.first_free+1)
reply_pkt.reply.message_pos = reply_pkt.reply.first_free
reply_pkt.reply.message_len = lmsg
reply_pkt.reply.first_free = reply_pkt.reply.first_free + lmsg
reply_pkt.reply.heap (reply_pkt.reply.message_pos : reply_pkt.reply.first_free - 1) = msg(1:lmsg)

return end
```

---

```
      call zerofill (%val (buffer_current), num_sectors, bytes_read)
```

---

```
subroutine zerofill (buffer_current, num_sectors, bytes_read)

include 'OAS_FILE_STRUCT: oas_header.inc'
include 'OAS_FILE_STRUCT: data.inc' record /buffer_struct/ buffer_current
integer*4 num_sectors, bytes_read, j num_sectors = (bytes_read + 1023)/1024
! zero fill bytes to next longword boundary
do j=bytes_read+1, min ( ((bytes_read+3)/4)*4, num_sectors*1024)
   buffer_current.byte_array(j) = 0
end do
! finish zero filling buffer as long words
do j = ((bytes_read+3)/4)+1, num_sectors*256    ! zero fill last bytes — can finish longword, then iterate longwords...
   buffer_current.long(j) = 0
end do return end
```

---

I claim:

1. A mass storage system for digital data files comprising:

a plurality of individual storage units each containing at least one data file and an index log containing information about the at least one date file stored therein, each storage unit having an identification associated with it;

at least one reading device which can read the data files and index log of a storage unit placed therein;

automated means for placing a storage unit on the reading device; and a digital computer having an associated magnetic storage device and connected to control the automated means to cause a one of the storage units to be placed on the reader, and connected to the reading device to receive data files therefrom, the computer being provided with an operating system program adapted for the maintenance, retrieval, and control of access to data files stored in the associated magnetic storage device, the computer programmed to maintain on the magnetic storage device a token file for each respective data file on each storage unit, each token file being maintained, retrieved and having access to it controlled by the operating system of the computer in accordance with the normal functioning of the operating system of the computer and each token file having, as its data, the identification of the storage unit on which the data file is placed, the address of the data file on the storage unit, and the size of the respective data file on the storage unit, whereby the file data which the operating system assigns to the token files is used to control access to the data files on the storage units without the need for access to the storage units.

2. A mass storage system as claimed in claim 1 wherein the storage units are optical disks.

3. A mass storage system as claimed in claim 1 wherein the automated means is a robot capable of transporting storage units under the control of the computer.

4. A mass storage system as claimed in claim 1 wherein the token file also includes a location into which a narrative description of the data file may be placed.

5. A mass storage system as claimed in claim 1 wherein the operating system of the computer normally maintains information about ownership, access and protection of data files on the associated magnetic storage device and wherein the computer is further programmed to determine ownership, access and protection of the data files on the storage units by referring only to ownership, access and protection attributes associated with the respective token file on the magnetic storage device for each data file.

6. A mass storage system as claimed in claim 1 wherein the computer is further programmed to create directories of data files by referring only to selected portions of the token files.

7. A mass storage system as claimed in claim 1 wherein the computer is a VAX computer and the token files are maintained by the VMS operating system.

8. An optical archive storage system for storing data files comprising:
 a plurality of write-once, read-many times optical data disks stored off-line;
 a read/write unit to read or write an optical disk mounted thereon;
 a robotic manipulator to transfer optical disks into and out of the read/write unit;
 a digital computer connected to control operation of the read/write unit and the robotic manipulator, the computer including an on-line magnetic disk storage device and containing an operating system adapted for the control of the access to and retrieval of the files on the on-line magnetic disk storage device, the on-line magnetic storage device having therein a token file for each data file on each optical disk, the token file including the identification of the data file, the identification of the optical disk, and identification of the subject matter of the data file so that directories and searches of the data files on the optical disks, and control of access to the files on the optical disks, can be performed using the token files without the need for access to the optical disks.

9. An optical archive storage system as claimed in claim 8 wherein the computer has an operating system and the token files are maintained by the operating system.

10. An optical archive storage system as claimed in claim 9 wherein the operating system assigns ownership, access and protection attributes to each token file and wherein the attributes of the token file are used to determine ownership, access and protection of the data files.

* * * * *